(12) United States Patent
Ström et al.

(10) Patent No.: US 10,602,109 B2
(45) Date of Patent: Mar. 24, 2020

(54) METHOD AND ARRANGEMENTS FOR HDR ENCODING

(71) Applicant: TELEFONAKTIEBOLAGET LM ERICSSON (PUBL), Stockholm (SE)

(72) Inventors: Jacob Ström, Stockholm (SE); Kristofer Dovstam, Hässelby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 33 days.

(21) Appl. No.: 15/743,235

(22) PCT Filed: Jun. 14, 2016

(86) PCT No.: PCT/SE2016/050572
§ 371 (c)(1),
(2) Date: Jan. 9, 2018

(87) PCT Pub. No.: WO2017/010924
PCT Pub. Date: Jan. 19, 2017

(65) Prior Publication Data
US 2019/0373233 A1      Dec. 5, 2019

Related U.S. Application Data

(60) Provisional application No. 62/190,906, filed on Jul. 10, 2015.

(51) Int. Cl.
| | | |
|---|---|---|
| *H04N 9/68* | (2006.01) | |
| *H04N 19/182* | (2014.01) | |
| *H04N 19/186* | (2014.01) | |

(52) U.S. Cl.
CPC .......... *H04N 9/68* (2013.01); *H04N 19/182* (2014.11); *H04N 19/186* (2014.11)

(58) Field of Classification Search
CPC ....... H04N 9/68; H04N 19/182; H04N 19/186
(Continued)

(56) References Cited

U.S. PATENT DOCUMENTS

| | | | |
|---|---|---|---|
| 5,737,032 A | 4/1998 | Stenzel et al. | |
| 6,400,843 B1 * | 6/2002 | Shu ...................... | H04N 1/6058 345/590 |

(Continued)

OTHER PUBLICATIONS

International Search Report and Written Opinion issued in Application No. PCT/SE2016/050572 dated Oct. 20, 2016, 17 pages.

(Continued)

*Primary Examiner* — Jefferey F Harold
*Assistant Examiner* — Mustafizur Rahman
(74) *Attorney, Agent, or Firm* — Rothwell, Figg, Ernst & Manbeck, P.C.

(57) ABSTRACT

A pixel in a picture is pre-processed by determining at least one bound for a luma component value of the pixel in a second color space based on a transfer function of a desired linear luminance value of the pixel in a third color space. A luma component value in the second color space is then selected for the pixel within an interval comprising multiple luma component values in the second color space and bounded by the at least one bound. A color of the pixel is represented by the luma component value and two chroma component values in the second color space. The pre-processing enables selection of a suitable luma component value for the pixel in a computationally efficient way by limiting the number of luma component values that are available for the particular pixel.

20 Claims, 14 Drawing Sheets

(58) Field of Classification Search
USPC ........ 348/234, 645, 624, 631, 663; 382/167, 382/162, 264, 233; 345/154
See application file for complete search history.

(56) References Cited

U.S. PATENT DOCUMENTS

| | | | | |
|---|---|---|---|---|
| 2006/0238655 | A1* | 10/2006 | Chou | H04N 9/643 348/645 |
| 2008/0074510 | A1* | 3/2008 | Chen | H04N 5/2351 348/234 |
| 2009/0034868 | A1* | 2/2009 | Rempel | G09G 3/3426 382/264 |
| 2010/0225806 | A1* | 9/2010 | Hsu | G06T 5/009 348/453 |
| 2011/0085086 | A1* | 4/2011 | Shi | H04N 5/208 348/624 |
| 2012/0050563 | A1* | 3/2012 | Cote | H04N 5/235 348/223.1 |
| 2012/0051635 | A1* | 3/2012 | Kunkel | G06T 5/009 382/165 |
| 2013/0272621 | A1* | 10/2013 | Lasserre | G06T 9/00 382/233 |
| 2014/0363093 | A1* | 12/2014 | Miller | G06F 3/14 382/235 |
| 2015/0221280 | A1* | 8/2015 | Van Der Vleuten | H04N 1/6027 382/167 |
| 2016/0094823 | A1* | 3/2016 | Zhai | H04N 1/646 348/453 |
| 2016/0165243 | A1* | 6/2016 | Nakagami | H04N 19/34 375/240.08 |

OTHER PUBLICATIONS

Rosewarne, C. et al., "AHG 13: Further results for LUT-based luma sample adjustment" 24. JCT-VC meeting; May 26-Jun. 1, 2016; Geneva, CH; (Joint Collaborative Team on Video Coding of ISO/IEC JTC1/SC29/WG11 and ITU-T SG.16), 5 pages.

Pu, F. et al., "AHG 13: on Luma Adjustment" 24. JCT-VC meeting; May 26-Jun. 1, 2016; Geneva, CH; (Joint Collaborative Team on Video Coding of ISO/IEC JTC1/SC29/WG11 and ITU-T SG.16), 10 pages.

Ström, J. et al., "Branches: Modified Linearization of Luma Adjustment", 24. JCT-VC meeting; May 26-Jun. 1, 2016; Geneva, CH; (Joint Collaborative Team on Video Coding of ISO/IEC JTC1/SC29/WG11 and ITU-T SG.16), 10 pages.

Tourapis, A. M. et al., "Enhanced Luma Adjustment Methods", 23. JCT-VC meeting; Feb. 19-26, 2016; San Diego, CA, USA; (Joint Collaborative Team on Video Coding of ISO/IEC JTC1/SC29/WG11 and ITU-T SG.16), 9 pages.

Ström, J. et al., "Luma Adjustment", Telefon AB-LM Ericsson, ITU-T SG 16 meeting; Oct. 12-23, 2015; Geneva, CH, 8 pages.

Ström, J. et al., "Luma Adjustment for Hybrid Log Gamma (HLG)", 113. MPEG meeting; Oct. 19-23, 2015; Geneva, CH; (Motion Picture Expert Group or ISO/IEC JTC1/SC29/WG11), 4 pages.

DVB Organization "TM-AVC0757_Luma-Adjustment.pptx", Digital Video Broadcasting, c/o EBU-17a Ancienne Route-CH-1218 Grand Saconnex, Geneva, CH; Oct. 6, 2015, 33 pages.

Luthra, A. et al., "Test sequences and anchor generation for HDR and Wide Gamut Content Distribution", International Organisation for Standardisation, ISO/IEC JTC1/SC29/WG11 MPEG2014/N14548, Coding of Moving Pictures and Audio; Sapporo, Japan; Jul. 2014; 14 pages.

SMPTE Standard: "High Dynamic Range Electro-Optical Transfer Function of Mastering Reference Displays", SMPTE ST 2084:2014, Copyright by The Society of Motion Picture and Television Engineers, 3 Barker Avenue, White Plains, NY 10601; Downloaded on May 11, 2016, 14 pages.

Luthra, A. et al., "Call for Evidence (CfE) for HDR and WCG Video Coding", International Organisation for Standardisation, ISO/IEC JTC1/SC29/WG11 MPEG2014/N15083, Coding of Moving Pictures and Audio; Geneva, CH; Feb. 2015; 46 pages.

Francois, E. et al., "About using a BT.2020 container for BT.709 content", International Organisation for Standardisation, ISO/IEC JTC1/SC29/WG11 MPEG2013/M35255, Coding of Moving Pictures and Audio; Strasbourg, France; Oct. 2014; 1 page1.

Strom,J., "Investigation of HDR Color Subsampling", International Organisation for Standardisation, ISO/IEC JTC1/SC29/WG11 MPEG2014/M35841, Coding of Moving Pictures and Audio; Geneva, CH; Feb. 2015; 8 pages.

Strom, J, "Luma Adjustment," Input Contribution to TM-AVC, Jul. 21-22, 2015, Rennes, France, 7 pages.

Tourapis, A. M. et al., "HDRTools: A software package for video processing and analysis", International Organisation for Standardisation, Coding of Moving Pictures and Audio, ISO/IEC JTC1/SC29/WG11 MPEG2014/M35156, Oct. 2014, Strasbourg, France, Apple Inc., 4 pages.

Extended European Search Report dated Feb. 4, 2019 issued for European Patent Application No. 16824783.1, 8 pages.

Ström, J. et al., "Ericsson's response to CfE for HDR and WCG", Ericsson, ISO/IEC JTC1/SC29/WG11 MPEG2014, No. m36184, Feb. 2015, Geneva, Switzerland, 11 pages.

Luong, H. et al., "Sharp Image Interpolation by Mapping Level Curves", University of Ghent, Department of Telecommunication and Information Processing, Visual Communications and Image Processing, Jul. 12, 2005, Beijing, 11 pages.

Ström, J. et al., "Luma Adjustment for High Dynamic Range Video", Ericsson Research, 2016 Data Compression Conference (DCC), IEEE, Mar. 30, 2016, Stockholm, Sweden, 10 pages.

Ström, J. et al., "Luma Adjustment", Input contribution to TM-AVC, Jul. 21-22, 2015, Rennes, France, 7 pages.

* cited by examiner

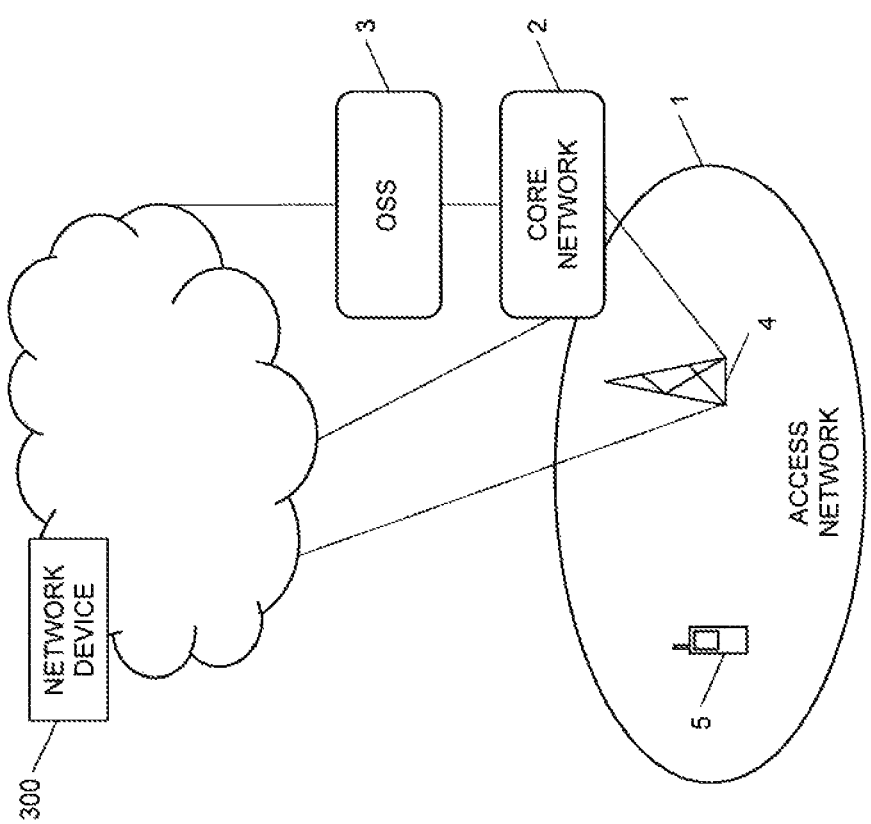

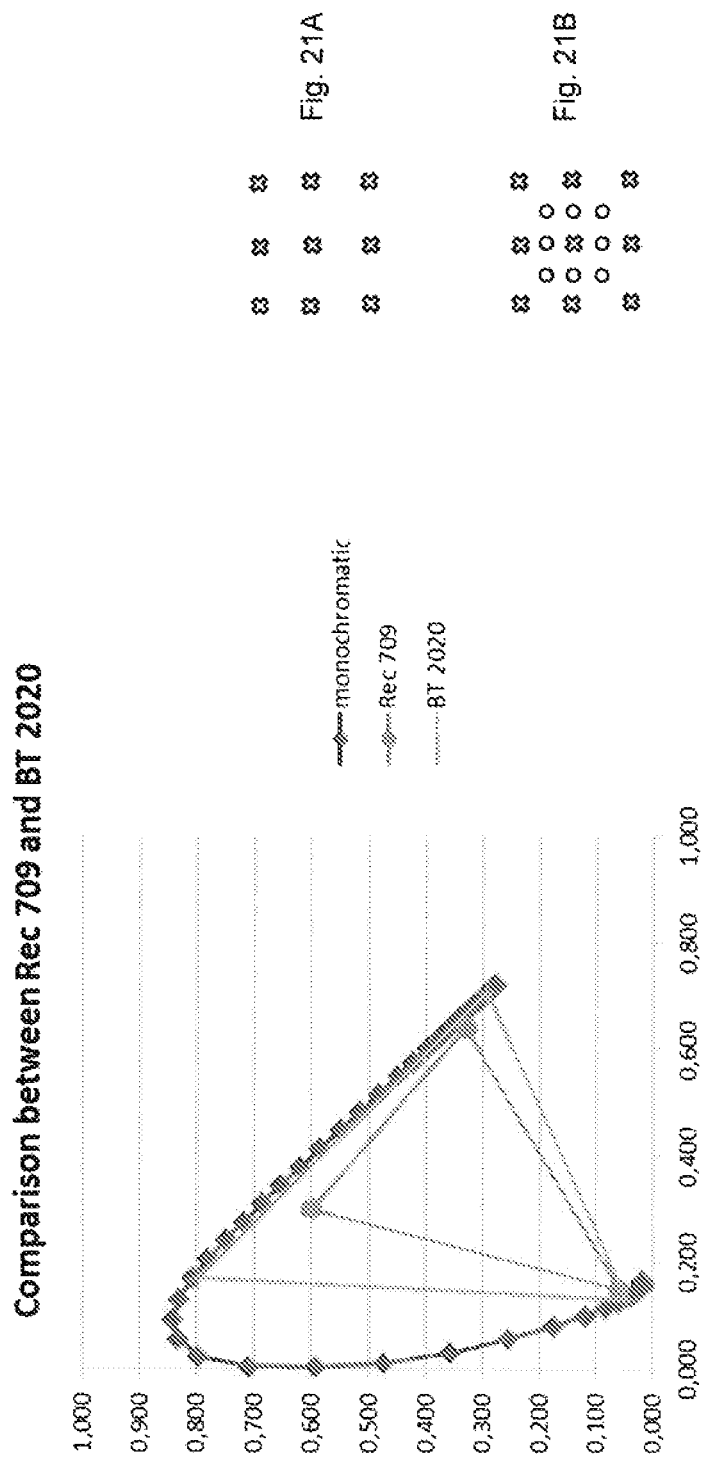

METHOD AND ARRANGEMENTS FOR HDR ENCODING

CROSS REFERENCE TO RELATED APPLICATION(S)

This application is a 35 U.S.C. § 371 National Stage of International Patent Application No. PCT/SE2016/050572, filed Jun. 14, 2016, designating the United States and claiming priority to U.S. provisional application No. 62/190, 906, filed on Jul. 10, 2015. The above identified applications are incorporated by reference.

TECHNICAL FIELD

The present embodiments generally relate to pre-processing and encoding of pixels in a picture, and in particular to such pre-processing and encoding that improves luminance values of pixels in a computational efficient way.

BACKGROUND

Within the art of video coding, a non-linear transfer function converts linear samples to non-linear samples with the purpose to mimic human vision. In coding of HDR (High Dynamic Range) video, it can be advantageous to use a highly non-linear transfer function, since this makes it possible to distribute many codewords to dark regions, and fewer codewords to bright regions, where the relative difference in brightness is anyway small.

Unfortunately, a combination of a highly non-linear transfer function, 4:2:0 subsampling and non-constant luminance ordering gives rise to severe artifacts in saturated colors, if traditional processing is used.

A simple example of a non-linear transfer function is $x^{(1/gamma)}$, wherein gamma is 2.2. One example of another transfer function is the one used in SMPTE specification ST 2084 [1]. Before display the inverse of the non-linear transfer function is used. In the gamma example, $x^{(gamma)}$ is used to go back to linear samples.

One example of traditional processing is the way to carry out conversion from RGB 4:4:4 to Y'CbCr 4:2:0 that is described in [2], which we will refer to as the "anchor" way of processing in this document. In this case RGB 4:4:4 is transferred by a non-linear transfer function to R'G'B' 4:4:4, which then is converted to Y'CbCr 4:4:4 by a linear color transform. Finally, the chroma samples Cb and Cr are subsampled to quarter resolution resulting in Y'CbCr 4:2:0. As described in the input contribution M35841 [3] to MPEG, the anchor way of processing gives rise to situations where changes between two colors of similar luminance can result in a reconstructed image with very different luminances.

SUMMARY

It is a general objective to provide an efficient pre-processing and encoding of pixels in a picture that improves luminance values of the pixels.

This and other objectives are met by embodiments as described herein.

An aspect of the embodiments relates to a method of pre-processing a pixel in a picture. The method comprises determining at least one bound for a luma component value of the pixel in a second color space based on a function of a desired linear luminance value of the pixel in a third color space. The function is preferably a transfer function. The method also comprises selecting a luma component value in the second color space for the pixel within an interval comprising multiple luma component values in the second color space and bounded by the at least one bound. A color of the pixel is then represented by the luma component value, a first chroma component value and a second chroma component value in the second color space.

Another aspect of the embodiments relates to a device for pre-processing a pixel in a picture. The device is configured to determine at least one bound for a luma component value of the pixel in a second color space based on a function of a desired linear luminance value of the pixel in a third color space, wherein the function is a transfer function. The device is also configured to select a luma component value in the second color space for the pixel within an interval comprising multiple luma component values in the second color space and bounded by the at least one bound, wherein a color of the pixel is represented by the luma component value, a first chroma component value and a second chroma component value in the second color space.

A further aspect of the embodiments relates to a device for pre-processing a pixel in a picture. The device comprises a determining unit for determining at least one bound for a luma component value of the pixel in a second color space based on a function of a desired linear luminance value of the pixel in a third color space. The function is a transfer function. The device also comprises a selector for selecting a luma component value in the second color space for the pixel within an interval comprising multiple luma component value sin the second color space and bounded by the at least one bound.

Another aspect of the embodiments relates to a device for encoding a pixel in a picture. The device comprises a processor and a memory comprising instructions executable by the processor. The processor is operative to determine at least one bound for a luma component value of the pixel in a second color space based on a function of a desired linear luminance value of the pixel in a third color space. The function is a transfer function. The processor is also operative to select a luma component value in the second color space for the pixel within an interval comprising multiple luma component value sin the second color space and bounded by the at least one bound. The processor is further operative to encode the luma component value, a subsampled first chroma component value and a subsampled second chroma component value in the second color space.

Yet another aspect of the embodiments relates to a device for encoding a pixel in a picture. The device comprises a determining unit for determining at least one bound for a luma component value of the pixel in a second color space based on a function of a desired linear luminance value of the pixel in a third color space. The function is a transfer function. The device also comprises a selector for selecting a luma component value in the second color space for the pixel within an interval comprising multiple luma component values in the second color space and bounded by the at least one bound. The device further comprises an encoder for encoding the luma component value, a subsampled first chroma component value and a subsampled second chroma component value in the second color space.

A further aspect of the embodiments relates to a computer program comprising instructions, which when executed by a processor, cause the processor to determine at least one bound for a luma component value of the pixel in a second color space based on a function of a desired linear luminance value of the pixel in a third color space. The function is a transfer function. The processor is also caused to select a luma component value in the second color space for the pixel within an interval comprising multiple luma component value sin the second color space and bounded by the at least one bound.

A related aspect of the embodiments defines a carrier comprising a computer program according to above. The carrier is one of an electric signal, an optical signal, an electromagnetic signal, a magnetic signal, an electric signal, a radio signal, a microwave signal, or a computer-readable storage medium.

An additional aspect of the embodiments relates to a signal representing an encoded version of a pixel in a picture. The encoded version comprises an encoded version of two subsampled chroma component values in a second color format and an encoded version of a luma component value in the second color format obtained according to any of the embodiments.

The pre-processing enables selection of a suitable luma component value for the pixel in a computationally efficient way by limiting the number of luma component values that are available for the particular pixel. This implies that the quality of the pixel as assessed by the luminance value for the pixel can be improved in a computationally efficient way.

BRIEF DESCRIPTION OF THE DRAWINGS

The embodiments, together with further objects and advantages thereof, may best be understood by making reference to the following description taken together with the accompanying drawings, in which:

FIG. 13 is a schematic illustration of an example of a wireless communication system with one or more cloud-based network devices according to an embodiment;

FIG. 17 illustrates a comparison between Rec709 and BT.2020 color gamuts;

FIGS. 21A and 21B schematically illustrate performing the Ajusty processing chain in sequential passes;

DETAILED DESCRIPTION

Figure 4:
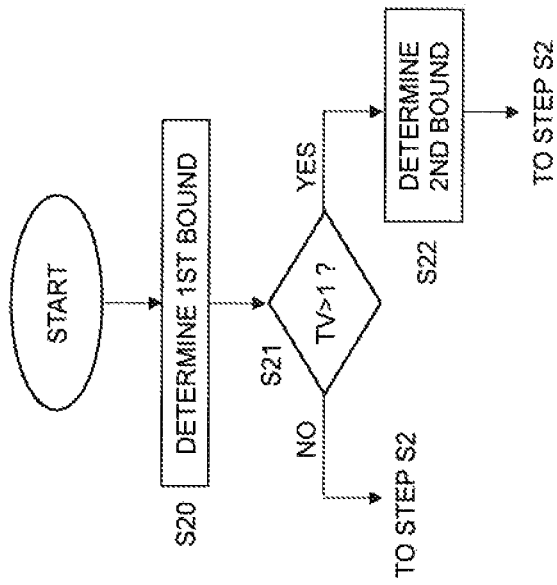
FIG. 4 is a flow chart illustrating an embodiment of the determining step in FIG. 1.

Throughout the drawings, the same reference numbers are used for similar or corresponding elements.

The present embodiments generally relate to pre-processing and encoding of pixels in a picture, and in particular to such pre-processing and encoding that improves luminance values of pixels in a computationally efficient way.

A traditional compression chain involves the anchor way of pre-processing pictures of a video sequence. This pre-processing comprises feeding pixels of incoming linear red, green blue (RGB) light, typically ranging from 0 to 10,000 $cd/m^2$, to an inverse transfer function, which results in new pixel values between 0 and 1. After this, the pixels undergo color transform resulting in a luma component (Y') and two chroma components (Cb, Cr). Then, the two chroma components are subsampled, such as to 4:2:0 or 4:2:2. The luma and subsampled chroma components are then encoded, also referred to as compressed herein. After decoding, also referred to as decompression herein, the 4:2:0 or 4:2:2 sequences are upsampled to 4:4:4, inverse color transformed and finally a transfer function gives back pixels of linear RGB light that can be output on a monitor for display.

A combination of a highly non-linear transfer function, chroma subsampling and non-constant luminance ordering gives rise to severe artifacts to the video data, in particular for saturated colors.

The pre-processing of pixels according to the embodiments can be used to combat or at least reduce the impact of artifacts, thereby resulting in a color that is closer to the incoming "true" color of a pixel.

A color space or color domain is the type and number of colors that originate from the combinations of color components of a color model. A color model is an abstract configuration describing the way colors can be represented as tuples of numbers, i.e. color components. The color components have several distinguishing features such as the component type, e.g. hue, and its unit, e.g. degrees or percentage, or the type of scale, e.g. linear or non-linear, and its intended number of values referred to as the color depth or bit depth.

Non-limiting, but illustrative, color spaces that are commonly used for pixels in pictures and videos include the red, green, blue (RGB) color space, the luma, chroma blue and chroma red (Y'CbCr, sometimes denoted Y'CbCr, Y'Cb'Cr', $YC_BC_R$, $Y'C_BC_R$ $Y'C_B'C_R'$ or YUV, Yuv, or $D'_YD'_{CB}D'_{CR}$ or $E'_YE'_{CB}E'_{CR}$) color space and the luminance and chrominances (XYZ) color space.

In this document, the following terminology will be used.
RGB: Linear RGB values, where each value is proportional to the $cd/m^2$ ("number of photons").

XYZ: Linear XYZ values, where each value is a linear combination of RGB. Y is called "luminance" and loosely speaking reflects well what the eye perceives as "brightness".

R'G'B': Non-linear RGB values. R'=pq(R), G'=pq(G), B'=pq(B), pq(.) being a non-linear function. An example of a non-linear function is the Perceptual Quantizer (PQ) transfer function.

Y'CbCr: A non-linear representation where each value is a linear combination of R', G' and B'. Y' is called "luma", and Cb and Cr are collectively called "chroma". This is to distinguish Y' from luminance, since Y' also contains some chrominance, and Cb and Cr also contain some luminance.

ICtCp: A representation of color designed for HDR and Wide Color Gamut (WCG) imagery and is intended as an alternative to Y'Cb'Cr'. I represents intensity and is a representation of luma information, whereas CtCp carries chroma information.

Figure 1:
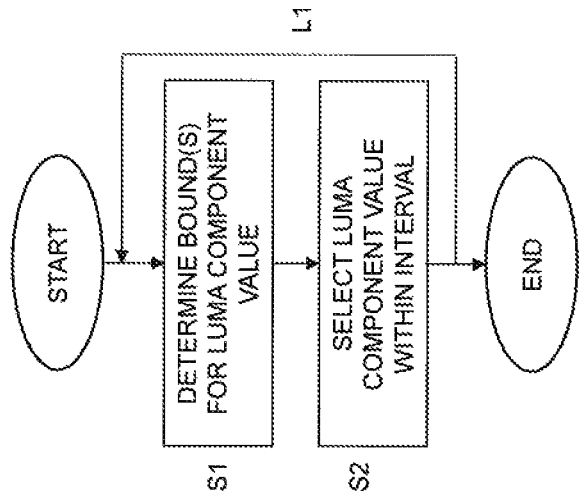
FIG. 1 is a flow chart illustrating a method of pre-processing a pixel in a picture according to an embodiment.

FIG. 1 is a flow chart illustrating a method of pre-processing a pixel in a picture. The method comprises determining, in step S1, at least one bound for a luma component value of the pixel in a second color space based on a function of a desired linear luminance value of the pixel in a third color space. The function is preferably a transfer function. The method then continues to step S2, which comprises selecting a luma component value in the second color space for the pixel within an interval comprising multiple luma component values in the second color space and bounded by the at least one bound. A color of the pixel is then represented by the luma component value as selected in step S2, a first chroma component value and a second chroma component value in the second color space.

The method of pre-processing comprising step S1 and S2 is performed on at least one pixel in a picture comprising multiple pixels. The method could be advantageously be applied to multiple, i.e. at least two, pixels in the picture, such as all pixels within a region of the picture or indeed all pixels in the picture, which is schematically illustrated by the line L1 in FIG. 1. The picture is preferably a picture of a video sequence comprising a plurality of pictures, such as a HDR or WCG video sequence. In such a case, the method could be applied to pixels in multiple different pictures of the video sequence. For instance, the method could be applied to all pictures in the video sequence, or to selected pictures within the video sequence. Such selected pictures could, for instance be, so called random access point (RAP) or intra RAP (IRAP) pictures and/or pictures belonging to a lowest layer in a multi-layer video sequence or a base layer in a multi view video sequence.

Step S1 of FIG. 1 thereby determines at least one bound for the luma component value in the second color space. This at least one bound is, in an embodiment, an upper bound for the luma component value. In this embodiment, the upper bound corresponds to the largest value for the luma component value in the second color space, i.e. luma component value≤upper bound.

In another embodiment, the at least one bound determined in step S1 is a lower bound for the luma component value in the second color space. In this embodiment, the lower bound thereby corresponds to the smallest value for the luma component value in the second color space, i.e. luma component value≥lower bound.

It is also possible, in an embodiment, to determine both a lower bound and an upper bound for the luma component value in the second color space in step S1, i.e. lower bound≤luma component value≤upper bound.

The at least one bound, i.e. lower and/or upper bound, is determined in step S1 based on a transfer function of a desired linear luminance value of the pixel in a third color space, i.e. a color space different from the second color space.

In a particular embodiment, the luma component value in the second color space is a Y' value in the Y'CbCr color space. The first and second chroma component values are, in this particular embodiment, Cb and Cr values. In this particular embodiment, the linear luminance value in the third color space is a Y value in the XYZ color space. Herein, the subscript "o" is used to denote the "original" or desired luminance value in the third color space, e.g. $Y_o$ value in XYZ color space. In such a case, the upper bound $Y'_{highest}=f_1(tf_1(Y_o))$ and/or the lowest bound $Y'_{lowest}=f_2(tf_2(Y_o))$, wherein $tf_1(.)$ and $tf_2(.)$ denote respective transfer functions and $f_1(.)$ and $f_2(.)$ denote respective functions. Note that the inverse $tf^{-1}(.)$ of a transfer function $tf(.)$ is also a transfer function.

The at least one bound determined in step S1 encloses or bounds an interval comprising multiple luma component values in the second color space. In the case of determining an upper bound in step S1, the interval is thereby bounded in its upper end, i.e. ≤$Y'_{highest}$. The luma component in the second color space can, in an embodiment, only assume values equal to or larger than a minimum value or, for instance 0 or 64. Hence, in such an embodiment, the interval is defined as [0, $Y'_{highest}$] or [64, $Y'_{highest}$].

Correspondingly, if step S1 comprises determining a lower bound, the interval is thereby bounded in its lower end, i.e. ≥$Y'_{lowest}$. In an embodiment, a luma component value cannot assume a value higher than a maximum value of, for instance, 1.0, 940 or $2^N-1$, wherein N represents the number of bits available for representing the luma component value. For instance, in the case of HDR video N is preferably 10, i.e. resulting in $2^{10}-1=1023$. Hence, in such an embodiment, the interval is defined as [$Y'_{lowest}$, 1.0], [$Y'_{lowest}$, 940] or [$Y'_{lowest}$, $2^N-1$], such as for instance [$Y'_{lowest}$, 1023].

If both the upper and lower bounds are determined in step S1, then the interval is defined as [$Y'_{lowest}$, $Y'_{highest}$].

It is possible that the calculated value $Y'_{highest}$ will be higher than the maximum value, for instance 1.0, 940 or $2^N-1$, such as 1023. In such a case, the upper bound determined in step S1 is preferably determined to be equal to the maximum value. Correspondingly, it is possible that the calculated value $Y'_{lowest}$ will be lower than the minimum value, for instance 0 or 64. In such a case, the lower bound determined in step S1 is preferably determined to be equal to the minimum value.

Unless $Y'_{highest}$ is equal to or larger than the maximum value and $Y'_{lowest}$ is equal to or lower than the minimum value, the interval bounded by the at least one bound determined in step S1 constitutes a sub-interval of the allowed range of values for the luma component in the second color space, i.e. a sub-interval of [minimum value, maximum value], for instance a sub-interval of [0.0, 1.0], [64, 940] or [0, 1023].

The interval [64, 940] is generally used for representing the luma component value Y' in HDR video as above but it may also be possible to use the interval [0, 1023]. The corresponding interval for standard range video (SDR) is [64, 940] for the luma component value Y'. Thus, in an embodiment directed toward SDR video the interval bounded by the at least one bound determined in step S1 constitutes a sub-interval of the allowed range of value for the luma component in the second color space, i.e. a sub-interval of [64, 940].

This means that the interval from which a luma component value in the second color space is selected for the pixel in step S2 only constitutes a portion of all allowable luma component values. This means that the at least one bound determined in step S1 limits the value the luma component can assume for the current pixel since the luma component value can only be selected from within the interval instead of within the whole allowable range of [minimum value, maximum value].

Figure 2:
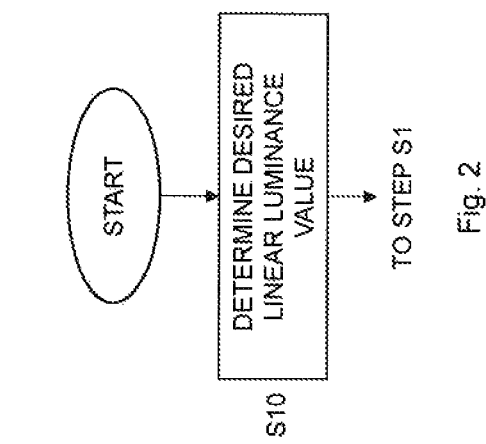
FIG. 2 is a flow chart illustrating an additional, optional step of the method shown in FIG. 1 according to an embodiment.

FIG. 2 is a flow chart illustrating an additional optional step of the method shown in FIG. 1. The method starts in step S10, which comprises determining the desired linear luminance value based on a linear color of the pixel in a first color space. The method then continues to step S1 in FIG. 1, where the determined desired linear luminance is used to determine the at least one bound.

This linear color of the pixel in the first color space is preferably the color of the pixel as input to the pre-processing. In a particular embodiment, this linear color is an RGB color in the RGB color space. This linear color is sometimes denoted $R_o G_o B_o$ herein to indicate that it represent the original color of the pixel.

The desired linear luminance value in the third color space can then be determined by application of a color transform to the linear color in the first color space, preferably an RGB-to-XYZ color transform, such as the color transform in equation 1 when RGB originates from BT.2020 or equation 2 when RGB originates from BT.709, also referred to as Rec709:

$$X=0.636958R+0.144617G+0.168881B$$
$$Y=0.262700R+0.677998G+0.059302B$$
$$Z=0.000000R+0.028073G+1.060985B \quad \text{(equation 1)}$$

$$X=0.412391R+0.357584G+0.180481B$$
$$Y=0.212639R+0.715169G+0.072192B$$
$$Z=0.019331R+0.119195G+0.950532B \quad \text{(equation 2)}$$

In fact, only the second line in equation 1 or 2 need to be calculated to obtain the desired linear luminance value ($Y_o$) from the linear color ($R_o G_o B_o$) in the first color space; $Y_o=0.262700R_o+0.677998G_o+0.059302B_o$ or $Y_o=0.212639R_o+0.715169G_o+0.072192B_o$.

In a first embodiment, step S1 of FIG. 1 comprises determining an upper bound for the luma component value and thereby for the interval based on, preferably as, $tf(Y_o)$. In this embodiment $tf(.)$ is a concave transfer function and $Y_o$ denotes the desired linear luminance value.

The transfer function $tf(.)$ is in this embodiment a concave transfer function, which means that the inverse of the transfer function $tf^{-1}(.)$ is a convex transfer function. The defining characteristic of a convex function $f(.)$ is the property that if $x_1$ and $x_2$ are two different values, and t is a value in the interval [0, 1], then $f(tx_1+(1-t)x_2) \leq tf(x_1)+(1-t)f(x_2)$.

The concave transfer function can be any concave transfer function defined on the interval [0, 1]. A particular example of such a concave transfer function is the gamma function $y=x^{(1/gamma)}$, wherein gamma is, for instance, 2.2.

Here below a particular implementation example of determining the upper bound $Y'_{highest}$ according to the first embodiment is described in more detail. In this implementation example, luma and chroma component values in the second color space are exemplified as Y' and CbCr values, respectively, in the Y'CbCr color space. Correspondingly, the linear luminance value in the third color space is exemplified as a Y value in the XYZ color space.

In order to see how $Y'_{highest}$ can be calculated, we first study how the linear luminance Y is calculated from a combination of Y'CbCr quantized to 10 bits, i.e. Y'10bit, Cb10bit and Cr10bit.

1. First convert from Y'10bit, Cb10bit and Cr10bit to values Y' in the interval [0, 1] and Cb, Cr in the interval [−0.5, 0.5]:

$$Y'=(Y'10bit/4.0-16.0)/219.0$$
$$Cb=dClip((Cb10bit/4.0-128.0)/224.0,-0.5,0.5)$$
$$Cr=dClip((Cr10bit/4.0-128.0)/224.0,-0.5,0.5)$$

The clipping function dClip(x, a, b) clips the value x to the interval [a, b], i.e. outputs a if x<a, outputs b if x>b and otherwise outputs x.

2. The Y', Cb, Cr values are then converted into R'G'B' using a color transform, such as defined in equation 3:

$$R'=Y'+a_{12}*Cb+a_{13}*Cr$$
$$G'=Y'+a_{22}*Cb+a_{23}*Cr$$
$$B'=Y'+a_{32}*Cb+a_{33}*Cr \quad \text{(equation 3)}$$

In equation 3, the constants $a_{12}=0$ and $a_{33}=0$, whereas the other constant values depend on the color space. Thus, for color space Rec.709 we have $a_{13}=1.57480$, $a_{22}=-0.18733$, $a_{23}=-0.46813$, $a_{32}=1.85563$ and for BT.2020 we have $a_{13}=1.47460$, $a_{22}=-0.16455$, $a_{23}=-0.57135$, $a_{32}=1.88140$.

The non-linear color R'G'B' is then clipped within the interval [0, 1]:

$$R'_{01}=dClip(R',0,1)$$
$$G'_{01}=dClip(G',0,1)$$
$$B'_{01}=dClip(B',0,1)$$

The subscript 01 is to mark that the values have been clipped to the interval [0,1].

3. The non-linear color R'G'B' is then converted to linear light RGB by applying the electro-optical transfer function EOTF, which is defined in equation C1 in Annex C.

$$R=tf^{-1}(R'_{01})$$
$$G=tf^{-1}(G'_{01})$$
$$B=tf^{-1}(B'_{01})$$

4. Finally the resulting linear luminance value or light $Y_{result}$ is calculated from the RGB using $$Y_{result}=w_R*R+w_G*G+w_B*B,$$

where $w_R=0.212639$, $w_G=0.715169$, $w_B=0.072192$ for Rec.709 and where $w_R=0.262700$, $w_G=0.677998$, $w_B=0.059302$ for BT.2020.

The resulting linear luminance $Y_{result}$ that is obtained by following steps 1 through 4 above can, thus, be written as a function of $R'_{01}$, $G'_{01}$ and $B'_{01}$:

$$Y_{result}=w_R R+w_G G+w_B B=w_R tf^{-1}(R'_{01})+w_G tf^{-1}(G'_{01})+w_B tf^{-1}(B'_{01}) \quad \text{(equation 4)}$$

Now comes a crucial observation. The transfer function $tf(.)$ is, in this embodiment, concave, which means that the inverse $tf^{-1}(.)$ is convex. This can easily be seen by plotting $tf^{-1}(x)$ for the valid range of x from [0, 1], as is done in FIG.

3. The defining characteristic of a convex function $f(.)$ is the property that if $x_1$ and $x_2$ are two values, and t is a value in the interval [0, 1], then $f(tx_1+(1-t)x_2) \leq tf(x_1)+(1-t)f(x_2)$. This can be generalized to three values, see Annex A. Assume $x_1$, $x_2$ and $x_3$ are three values, and that we have three values $w_1$, $w_2$ and $w_3$ such that $w_1+w_2+w_3=1$. If $f(.)$ is convex the following inequality holds $f(w_1x_1+w_2x_2+w_3x_3) \leq w_1f(x_1)+w_2f(x_2)+w_3f(x_3)$.

We will prove this statement in Annex A, but for now we just assume it holds. We can use this on the value for Y from equation 4. Since $tf^{-1}(x)$ is convex, we get $$Y_{result}=w_R tf^{-1}(R'_{01})+w_G tf^{-1}(G'_{01})+w_B tf^{-1}(B'_{01}) \geq tf^{-1}(w_R R'_{01}+w_G G'_{01}+w_B B'_{01}) \quad \text{(equation 5)}$$

Inserting the values for R', G' and B' from step 2 above and ignoring for a while the clipping, i.e. assuming that $R'_{01}=R'$, and the same applies to the G and B color components, we get $$Y_{result} \geq tf^{-1}(w_R R'+w_G G'+w_B B') \quad \text{(equation 6)}$$

Now we can compare this with the definition of Y' for BT.2020 in 2.4.6.3 in [4], replicated here for the convenience of the reader, $Y'=0.2627R'+0.6780G'+0.0593B'$.

Remember that for BT.2020, $w_R=0.262700$, $w_G=0.677998$, $w_B=0.059302$. This is no coincidence, the Y'CbCr color conversion uses the same coefficients to calculate Y' as is used to calculate Y in XYZ. This means that, modulo rounding errors which do not matter, the expression $w_R R'+w_G G'+w_B B'$ is equal to Y'. We can therefore conclude that $Y_{result} \geq tf^{-1}(Y')$, and by applying the transfer function $tf(.)$ on both sides, we get that $Y' \leq tf(Y_{result})$.

We can therefore say, that if we want a certain result $Y_{result}$, our Y' must be smaller than $tf(Y_{result})$. In particular, if we want the result to be the desired linear luminance $Y_o$, we must make sure that Y' is smaller than $tf(Y_o)$. Hence we have $Y' \leq tf(Y_o)=Y'_{highest}$.

We have therefore come up with an upper bound on Y', i.e. a highest value that Y' can take, namely $Y'_{highest}$, and we also have a convenient way of calculating it—just compute the desired linear luminance $Y_o$ of the pixel and feed it through the transfer function.

In a second embodiment, step S1 of FIG. 1 comprises determining an upper bound for the luma component value and for the interval as a maximum of $tf(Y_o)-a_{13}Cr$, $tf(Y_o)-a_{22}Cb-a_{23}Cr$ and $tf(Y_o)-a_{32}Cb$. In this embodiment, the transfer function $tf(.)$ is a monotonously increasing transfer function, $Y_o$ denotes the desired linear luminance value, Cb denotes the first chroma component value in the second color space, and Cr denotes the second chroma component value in the second color space. The constants $a_{13}=1.57480$, $a_{22}=-0.18733$, $a_{23}=-0.46813$ and $a_{32}=1.85563$ for Rec.709 and $a_{13}=1.47460$, $a_{22}=-0.16455$, $a_{23}=-0.57135$ and $a_{32}=1.88140$ for BT.2020.

Hence, in this embodiment the upper bound is equal to $\max(tf(Y_o)-a_{13}Cr, tf(Y_o)-a_{22}Cb-a_{23}Cr, tf(Y_o)-a_{32}Cb)$, wherein max(a, b, c) outputs the largest of a, b and c.

Here below another particular implementation example of determining the upper bound $Y'_{highest}$ according to the second embodiment is described in more detail. In this implementation example, luma and chroma component values in the second color space are exemplified as Y' and CbCr values, respectively, in the Y'CbCr color space. Correspondingly, the linear luminance value in the third color space is exemplified as a Y value in the XYZ color space.

If we follow steps 1 through 4 described in the foregoing, equation 4 states that we get a resulting linear luminance or light value $Y_{result}$ according to $$Y_{result}=w_R R+w_G G+w_B B=w_R tf^{-1}(R'_{01})+w_G tf^{-1}(G'_{01})+w_B tf^{-1}(B'_{01}) \quad \text{(equation 4)}$$

Now we set $M'_{01}=\min(R'_{01}, G'_{01}, B'_{01})$. Since the transfer function $tf^{-1}(.)$ is monotonically increasing this means that $tf^{-1}(M'_{01})=\min(tf^{-1}(R'_{01}), tf^{-1}(G'_{01}), tf^{-1}(B'_{01}))$. We can then write $Y_{result} \geq w_R tf^{-1}(M'_{01})+w_G tf^{-1}(M'_{01})+w_B tf^{-1}(M'_{01})$, which can be simplified to $Y_{result} \geq (w_R+w_G+w_B)tf^{-1}(M'_{01})$, and, since $(w_R+G+w_B)=1$, to $Y_{result} \geq tf^{-1}(\min(R'_{01}, G'_{01}, B'_{01}))$.

Now, we want to replace $R'_{01}, G'_{01}, B'_{01}$ with the non-clipped variables R', G', B'. We do so in two steps, by first replacing $R'_{01}, G'_{01}, B'_{01}$ with $R'_1, G'_1, B'_1$ and then replacing $R'_1, G'_1, B'_1$ with R', G', B' according to the following explanation. Let us assume the clipping is done according to the following steps, in which equation 3a corresponds to equation 3 but where the terms equal to zero due to $a_{12}=0$ and $a_{33}=0$ have been omitted:

$$R'=Y'+a_{13}*Cr$$

$$G'=Y'+a_{22}*Cb+a_{23}*Cr$$

$$B'=Y'+a_{32}*Cb$$

$$R'_1=\min(R',1)$$

$$G'_1=\min(G',1)$$

$$B'_1=\min(B',1)$$

$$R'_{01}=\max(R'_1,0)$$

$$G'_{01}=\max(G'_1,0)$$

$$B'_{01}=\max(B'_1,0) \quad \text{(equation 3a)}$$

Here $R'_1$ is the value after we have clipped against 1, but before we have clipped against 0. This means that $R'_1 \leq R'_{01}$, since if $R'_1$ is larger than 0 they are the same, and if $R'_1$ is smaller than 0, it is smaller. By analogous reasoning, $G'_1 \leq G'_{01}$ and $B'_1 \leq B'_{01}$, which means that $\min(R'_1, G'_1, B'_1) \leq \min(R'_{01}, G'_{01}, B'_{01})$ and, thus, $Y_{result} \geq tf^{-1}(\min(R'_{01}, G'_{01}, B'_{01})) \geq tf^{-1}(\min(R'_1, G'_1, B'_1))$.

The next step is to replace $R'_1, G'_1, B'_1$ with the non-clipped variables R', G', B'. We now make a crucial observation, namely that there exists no combination of Y', Cr and Cb so that all three variables R', G' and B' are simultaneously larger than 1. To see this, notice the signs of the variables $a_{13}, a_{22}, a_{23}$ and $a_{32}$: $a_{13}$ and $a_{32}$ are positive, and both $a_{22}$ and $a_{23}$ are negative. We can therefore write equation 3a as $$R'=Y'+|a_{13}|*Cr$$

$$G'=Y'-|a_{22}|*Cb-|a_{23}|*Cr$$

$$B'=Y'+|a_{32}|*Cb$$

where |a| denotes the absolute value of a. Multiply each equation with −1, $$R'=-Y'-|a_{13}|*Cr$$

$$G'=-Y'+|a_{22}|*Cb+|a_{23}|*Cr$$

$$B'=-Y'-|a_{32}|*Cb$$

Add 1 to each side of each equation, $$1-R'=1-Y'-|a_{13}|*Cr$$

$$1-G'=1-Y'+|a_{22}|*Cb+|a_{23}|*Cr$$

$$1-B'=1-Y'-|a_{32}|*Cb$$

Now write this equation as, $$R''=1-Y'-|a_{13}|*Cr$$

$$G''=1-Y'+|a_{22}|*Cb+|a_{23}|*Cr$$

$$B''=1-Y'-|a_{32}|*Cb$$

where $R''=1-R'$, $G''=1-G'$ and $B''=1-B'$. Showing that there exists no combination of Y', Cr and Cb so that all three variables R', G' and B' are simultaneously larger than 1, is the same as showing that there exists no combination of Y', Cr and Cb so that all three variables R'', G'', and B'' are simultaneously smaller than 0. Since Y' lies within the range [0, 1], we know that 1−Y' is never smaller than 0. Examining the signs of Cr and Cb, we see that
If Cb>0 and Cr>0, then G''>0
If Cb>0 and Cr<0, then R''>0
If Cb<0 and Cr>0, then B''>0
If Cb<0 and Cr<0, then R'' and B''>0

Hence at least one of R'', G'', B'' must be positive, and hence at least one of R', G', B' is smaller than 1. This further means that the minimum, min(R', G', B'), is guaranteed to be smaller than 1. In particular, if min(R', G', B')=R', we know that R'<1 and hence $R'=R'_1$. The same goes for G' and B', if they are the minimum of R', G' and B' they must equal their clipped version $G'_1$ and $B'_1$. Hence, we know that min(R', G', B')=min($R'_1$, $G'_1$, $B'_1$) and we can write $Y_{result} \geq tf^{-1}(\min(R'_1, G'_1, B'_1))=tf^{-1}(\min(R', G', B'))$.

We still do not know which one of R', G', and B' is the minimum, but assume for a moment that it is R'. We can then write $Y_{result-red-is-min} \geq tf^{-1}(R')$. We can then insert the value of R' from equation 3a, $R'=Y'+a_{13}*Cr$ and apply tf( ) on both sides, $tf(Y_{result-red-is-min}) \geq Y'+a_{13}Cr$. Thus, if the red component really is the minimum value for the values R', G', B' produced by the optimum Y', we know that $Y' \leq f(Y_{result-red-is-min})-a_{13}$.

We can do likewise with green and blue, yielding $Y' \leq tf(Y_{result-green-is-min})-a_{22}Cb-a_{23}Cr$, and $Y' \leq tf(Y_{result-blue-is-min})-a_{32}Cb$.

Now, for the optimal Y' value, one of R' G' and B' must be the minimum. We don't know which one, but we can find a conservative bound for Y' by taking the maximum of the three possible bounds:

$$Y' \leq \max(tf(Y_{result})-a_{13}Cr, tf(Y_{result})-a_{22}Cb-a_{23}Cr, tf(Y_{result})-a_{32}Cb).$$

We thus have an upper bound on Y'; if we want $Y_{result}$, we have to use a Y' that is smaller than the right hand expression. In particular, if we want $Y_{result}$ to be equal to $Y_o$, we need to use Y' smaller than $Y' \leq \max(tf(Y_o)-a_{13}Cr, tf(Y_o)-a_{22}Cb-a_{23}Cr, tf(Y_o)-a_{32}Cb)=Y'_{largest}$.

FIG. 4 illustrates a flow diagram of a third embodiment of step S1. In this embodiment, the method starts in step S20, which comprises determining a first bound as $tf(Y_o)$. In this step S20, tf(.) is a concave transfer function and $Y_o$ denotes the desired linear luminance value. This step S20 thereby basically corresponds to the previously described first embodiment of step S1.

The method also comprises determining, in step S22 and if a test value (TV) calculated based on the first bound is larger than one, a second bound as a maximum of $tf(Y_o)-a_{13}Cr$, $tf(Y_o)-a_{22}Cb-a_{23}Cr$ and $tf(Y_o)-a_{32}Cb$. In this step S22, tf(.) is a monotonously increasing transfer function, Cb denotes the first chroma component value in the second color space, Cr denotes the second chroma component value in the second color space, and the constants $a_{13}=1.57480$, $a_{22}=-0.18733$, $a_{23}=-0.46813$ and $a_{32}=1.85563$ for Rec.709 and $a_{13}=1.47460$, $a_{22}=-0.16455$, $a_{23}=-0.57135$ and $a_{32}=1.88140$ for BT.2020. This step S22 basically corresponds to the previously described second embodiment of step S2. The method also comprises selecting, in step S21, an upper bound for the luma component value and for the interval as the second bound if the test value is larger than one and otherwise selecting the first bound.

In a particular embodiment, the check or selection in step S21 involves calculating three test values and verifying whether any of them is larger than one. These three test values are R', G' and B' defined as:

$$R'=bound1+a_{13}Cr$$

$$G'=bound1+a_{22}Cb+a_{23}Cr$$

$$B'=bound1+a_{32}Cb$$

bound1 denotes the first bound determined in step S20, i.e. $tf(Y_o)$. If one or more of R', B' and B' is larger than one, this indicates that the first bound may clip these values. In this case, the bound is not guaranteed to hold. Accordingly, the second bound should be determined and used as upper bound. However, if none of R', G' and B' is larger than one, then the first bound is used as upper bound.

In another embodiment, step S1 of FIG. 1 comprises determining a lower bound for the luma component value and for the interval. In this embodiment, the lower bound is determined based on, preferably as, $tf(Y_o)$, wherein tf(.) is, in this embodiment, a monotonously increasing transfer function and $Y_o$ denotes the desired linear luminance value.

A transfer function tf(.) is monotonously increasing if, for all x and y where x≤y, then tf(x)≤tf(y).

In a particular embodiment, determining the lower bound in step S1 comprises determining the lower bound as a minimum of $tf(Y_o)-a_{13}Cr$, $tf(Y_o)-a_{22}Cb-a_{23}Cr$ and $tf(Y_o)-a_{32}Cb$. In this embodiment, Cb denotes the first chroma value in the second color space, Cr denotes the second chroma value in the second color space, and the constants $a_{13}=1.57480$, $a_{22}=-0.18733$, $a_{23}=-0.46813$ and $a_{32}=1.85563$ for Rec.709 and $a_{13}=1.47460$, $a_{22}=-0.16455$, $a_{23}=-0.57135$ and $a_{32}=1.88140$ for BT.2020.

The following particular implementation example discloses investigation of a lower bound $Y'_{lowest}$ on the ideal Y'. In this implementation example, luma and chroma component values in the second color space are exemplified as Y' and CbCr values, respectively, in the Y'CbCr color space. Correspondingly, the linear luminance value in the third color space is exemplified as a Y value in the XYZ color space.

If we follow steps 1 through 4, equation 4 states that we get a resulting linear light value $Y_{result}$ according to $$Y_{result}=w_RR+w_GG+w_BB=w_Rtf^{-1}(R'_{01})+w_Gtf^{-1}(G'_{01})+w_Btf^{-1}(B'_{01}) \quad \text{(equation 4)}$$

Now set $M'_{01}=\max(R'_{01}, G'_{01}, B'_{01})$. Since the transfer function $tf^{-1}(.)$ is monotonically increasing this means that $tf^{-1}(M'_{01})=\max(tf^{-1}(R'_{01}), tf^{-1}(G'_{01}), tf^{-1}(B'_{01}))$. We can then write $Y_{result} \leq w_Rtf^{-1}(M'_{01})+w_Gtf^{-1}(M'_{01})+w_Btf^{-1}(M'_{01})$, which can be simplified to $Y_{result} \leq (w_R+w_G+w_B)tf^{-1}(M'_{01})$, and, since $(w_R+w_G+w_B)=1$, to $Y_{result} \leq tf^{-1}(\max(R'_{01}, G'_{01}, B'_{01}))$.

Now, we want to replace $R'_{01}, G'_{01}, B'_{01}$ with the non-clipped variables R', G', B'. We do so in two steps, by first replacing $R'_{01}, G'_{01}, B'_{01}$ with $R'_0, G'_0, B'_0$ and then replacing $R'_0, G'_0, B'_0$ with R', G', B' according to the following explanation: Let us assume the clipping is done according to the following steps:

$$R' = Y' + a_{13}*Cr$$

$$G' = Y' + a_{22}*Cb + a_{23}*Cr$$

$$B' = Y' + a_{32}*Cb$$

$$R'_1 = \min(R', 1)$$

$$G'_1 = \min(G', 1)$$

$$B'_1 = \min(B', 1)$$

$$R'_{01} = \max(R'_1, 0)$$

$$G'_{01} = \max(G'_1, 0)$$

$$B'_{01} = \max(B'_1, 0) \quad \text{(equation 3a)}$$

Here $R'_0$ is the value after we have clipped against 0, but before we have clipped against 1. This means that $R'_0 \geq R'_{01}$, since if $R'_0$ is smaller than 1 they are the same, and if $R'_0$ is larger than 1, it is bigger. By analogous reasoning, $G'_0 \geq G'_{01}$ and $B'_0 \geq B'_{01}$, which means that $\max(R'_0, G'_0, B'_0) \geq \max(R'_{01}, G'_{01}, B'_{01})$ and, thus, $Y_{result} \leq tf^{-1}(\max(R'_{01}, G'_{01}, B'_{01})) \leq tf^{-1}(\max(R'_0, G'_0, B'_0))$.

The next step is to replace $R'_0, G'_0, B'_0$ with the non-clipped variables $R', G', B'$. We now make a crucial observation, namely that there exists no combination of Y', Cr and Cb so that all three variables R', G' and B' are simultaneously negative. To see this, notice the signs of the variables $a_{13}$, $a_{22}, a_{23}$ and $a_{32}$, see step 2 above: $a_{13}$ and $a_{32}$ are positive, and both $a_{22}$ and $a_{23}$ are negative. We can therefore write equation 3a as $$R' = Y' + |a_{13}|*Cr$$

$$G' = Y' - |a_{22}|*Cb - |a_{23}|*Cr$$

$$B' = Y' + |a_{32}|*Cb$$

where |a| denotes the absolute value of a. Examining the signs of Cr and Cb, we see that
If Cb>0 and Cr>0, then R' and B'>0
If Cb>0 and Cr<0, then B'>0
If Cb<0 and Cr>0, then R'>0
If Cb<0 and Cr<0, then G'>0

Hence at least one of R', G', B' must be positive, and hence the maximum max(R', G', B') is guaranteed to be positive. In particular, if max(R', G', B')=R', we know that R'>0 and hence $R' = R'_0$. The same goes for G' and B', if they are the maximum of R', G' and B' they must equal their clipped version $G'_0$ and $B'_0$. Hence we know that max(R', G', B')=max($R'_0, G'_0, B'_0$) and we can write $Y_{result} = tf^{-1}(\max(R'_0, G'_0, B'_0)) = tf^{-1}(\max(R', G', B'))$.

We still don't know which one of R', G', and B' is the maximum, but assume for a moment that it is R'. We can then write $Y_{result-red-is-max} \leq tf^{-1}(R')$. We can then insert the value of R' from equation 3a $R' = Y' + a_{13}*Cr$ and apply tf( ) on both sides: $tf(Y_{result-red-is-max}) \leq Y' + a_{13}Cr$. Thus, if red really is the maximum value for the values R', G', B' produced by the optimum Y', we know that $Y' \geq tf(Y_{result-red-is-max}) - a_{13}Cr$. We can do likewise with green and blue, yielding $Y' \geq tf(Y_{result-green-is-max}) - a_{22}Cb - a_{23}Cr$, and $Y' \geq tf(Y_{result-blue-is-max}) - a_{32}Cb$.

Now, for the optimal Y' value, one of R' G' and B' must be the maximum. We do not know which one, but we can find a conservative bound for Y' by taking the minimum of the three possible bounds:

$$Y' \geq \min(tf(Y_{result}) - a_{13}Cr, tf(Y_{result}) - a_{22}Cb - a_{23}Cr, tf(Y_{result}) - a_{32}Cb)$$

We thus have a lower bound on Y'; if we want $Y_{result}$, we have to use a Y' that is larger than the right hand expression. In particular, if we want $Y_{result}$ to be equal to $Y_o$, we need to use Y' larger than $$Y' \geq \min(tf(Y_o) - a_{13}Cr, tf(Y_o) - a_{22}Cb - a_{23}Cr, tf(Y_o) - a_{32}Cb) = Y'_{lowest}$$

In an embodiment, step S2 in FIG. 1 comprises selecting, within the interval, a luma component value that minimizes a difference between the desired luminance value and a linear luminance value in the third color space calculated based on the luma component value, the first chroma component value and the second chroma component value in the second color space.

In this embodiment, the luma component value Y' that, together with the first and second chroma component values Cb, Cr results in a luminance component value Y=function (Y', Cb, Cr) that minimizes a difference between the desired linear luminance value $Y_o$ and the luminance component value Y is selected.

The linear luminance value Y is preferably calculated based on a function g(Y', Cb', Cr'), which comprises application of a first color transform, preferably Y'CbCr-to-R'G'B' color transform, to obtain a non-linear color in the first color space, preferably an R'G'B' color in the RGB color space, for instance using equation 3 or 3a.

A first transfer function, such as the transfer function in equation C1 in Annex C, is applied to the non-linear color in the first color space to obtain a linear color in the first color space, preferably an RGB color in the RGB color space.

A second color transform, preferably an RGB-to-XYZ color transform, is then applied to the linear color in the first color space to obtain the linear luminance value in the third color space, preferably a Y value in the XYZ color space, see equation 1 or 2. In fact, only the second line in equation 1 or 2 needs to be calculated in order to obtain the linear luminance value Y in the XYZ color space.

An embodiment of selecting the luma component value within the interval in step S2 is to see the selection as an optimization problem and minimizing the error $E = (Y - Y_o)^2$ or $E = |Y - Y_o|$, with respect to Y' within the interval. This can be done by gradient descent, by calculating the gradient of E with respect to Y', dE/dY, and update Y a small amount in the opposite direction of the gradient: $Y'_{n+1} = Y'_n - \alpha dE/dY'$, where α is a small constant.

Gradient descent can be slow, so a quicker way may be to use a second-order optimization algorithm that calculates or approximates the second order derivates $d^2E/dY^2$, such as Gauss-Newton.

Another embodiment of selecting the luma component value in step S2 comprises performing a binary search to select the luma component value within the interval.

Traditionally, a binary search involves first trying a Y' value in the middle of the available range of Y' values, for instance 512 if the minimum Y' value is 0 and the maximum Y' value is 1023. If the Y value calculated based on this Y' value and the Cb'Cr' values is larger than the desired luminance value $Y_o$, we should continue the search in the interval [0, 512]. If the calculated Y value instead is smaller than the desired luminance value $Y_o$, we should continue the search for optimal Y' value in the interval [512, 1023]. The procedure is continued by calculating a new Y' value in the middle of the selected interval and proceeds until the calculated linear luminance value Y is equal to the desired linear luminance value $Y_o$, or does not differ from the desired linear luminance value $Y_o$ value with more than a defined value, or the interval contains a single value or two values, such as [345, 345] or [345, 346]. This is guaranteed to only take $\log_2(N)$ steps, where N is the number of possible test Y' values, which in this example is 1024. Hence, the binary search takes only $\log_2(1024)=10$ steps.

This traditional approach of performing the binary search could be represented by the following pseudocode:
a=0
b=1023
[a, b]=performBinarySearch(a, b, $Y_o$, Cb10bit, Cr10bit, 10)
Ya=calcY(a, Cb10bit, Cr10bit)
Yb=calcY(b, Cb10bit, Cr10bit)
e1=$(Ya-Y_o)^2$
e2=$(Yb-Y_o)^2$
if (e1<e2)
use Y'=a
else
use=b
end As is seen here, the binary search is called with N=10, i.e. we perform interval halving ten times. This is because the starting interval is [a, b]=[0, 1023], and we need ten steps to get the interval down to the form [k, k+1]. As an example, if the best value is 345.23, the interval halving would try the following intervals:
1. 512 too big→new interval=[0, 512]
2. 256 too small→new interval [256, 512]
3. 384 too big→new interval [256, 384]
4. 320 too small→new interval [320, 384]
5. 352 too big→new interval [320, 352]
6. 336 too small→new interval [336, 352]
7. 344 too small→new interval [344, 352]
8. 348 too big→new interval [344, 348]
9. 346 too big→new interval [344, 346]
10. 345 too small→new interval [345, 346]

We have now narrowed it down to two values, 345 and 346, and both can be tested to see which one is the best.

However, one problem with this is that these iterations are quite expensive. Out of the 16 seconds it takes to process a picture with 1920×1080 pixels, about 10 seconds are spent on the iterations. This means that if we could somehow reduce this from 10 to 9 iterations, we could save a considerable amount of computation.

The embodiments rely on the notion that we can calculate in advance a maximum possible value, i.e. the upper bound, and/or a minimum possible value, i.e. the lower bound, for Y' directly from $Y_o$, i.e. the desired linear luminance, Cb10bit and Cr10bit. For instance, if the upper bound is smaller than 512, then we do not need to carry out the first iteration step, since we know that the correct interval is [0, 512]. If the upper bound is smaller than 256, then we can skip the first two steps. In the first case we can remove 10% of the iteration computation, and 6% of the pre-processing computation, 0.06×3.5/13.5=1.6% of the total computation, in the second case we can remove 20% of the iteration computation.

Figure 5:
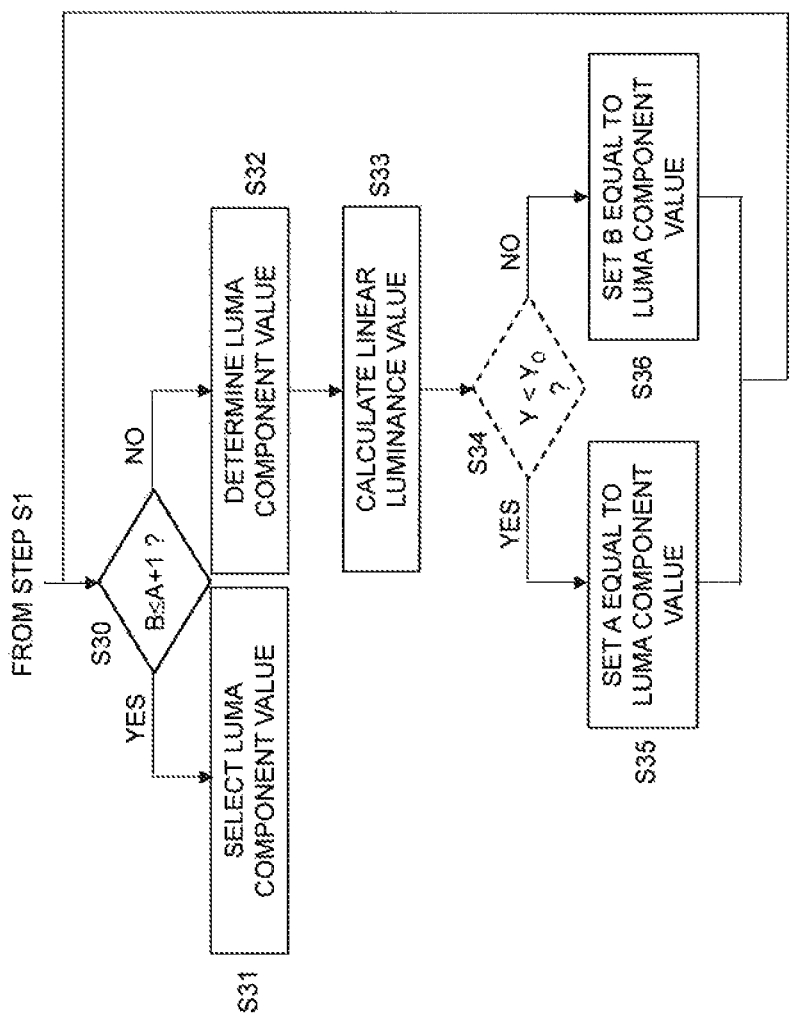
FIG. 5 is a flow chart illustrating an embodiment of the selecting step in FIG. 1.

FIG. 5 schematically illustrates a flow chart of an embodiment involving performing a binary search. The method continues from step S1 in FIG. 1. In FIG. 5, the lower bound is represented by "A" and the upper bound is represented by "B". Optional step S30 comprises determining whether the upper bound is equal to or smaller than the lower bound plus one. This decision corresponds to checking whether the end of the binary search has been reached, i.e. arriving in a search interval of [p, p+1] for some value p. If the step S30 determines that the end of the binary search has been reached, the method continues to step S31. This step S31 comprises selecting the luma component value as either the upper bound or the lower bound. This is further described in connection with FIG. 6.

However, if the upper bound is larger than the lower bound plus one as determined in step S30, the method continues to step S32. Step S32 comprises determining a luma component value in the middle of an interval bounded by the lower bound and the upper bound. In a particular embodiment, this luma component value is determined as floor((lower bound+upper bound)/2). The method then continues to step S33, which comprises calculating a linear luminance value Y in the third color space based on the luma component value determined in step S32, the first chroma component value and the second chroma component value in the second color space.

An optional step S34 compares the calculated linear luminance value Y with the desired linear luminance component value $Y_o$. If the calculated linear luminance value Y is smaller than the desired linear luminance component value $Y_o$ the method continues to step S35, otherwise the method continues to step S36.

Step S35 comprises setting the lower bound equal to the determined luma component value, whereas step S36 comprises setting the upper bound equal to the determined luma component value.

The method continues from step S35 or S36 to step S30. This means that the loop of steps S30, S32, S33, S34, S34, S35 or S36 halves the search interval.

The embodiments will speed up the binary search by determining an upper bound and/or a lower bound for the search interval, thereby potentially leading to a reduction of the number of cycles of the loop as compared to using the maximum allowable range for the luma component value.

This means that we do not need to set the upper bound b to 1023 and/or the lower bound a to 0 in the pseudo code for performing a binary search:
a=0
b=1023
[a, b]=performBinarySearch(a, b, $Y_o$, Cb10bit, Cr10bit, 10)

In clear contrast, we can convert $Y'_{highest}$ and/or $Y'_{lowest}$ to, in this example, a 10 bit integer and set b and/or a to that using $$b=\text{ceil}(Y'_{10bit\_highest})=\text{ceil}(4(219*Y'_{highest}+16))$$

$$a=\text{floor}(Y'_{10bit\_lowest})=\text{floor}(4(219*Y'_{lowest}+16))$$

where ceil(.) rounds to the nearest larger integer and floor(.) rounds to the nearest smaller integer. In the above equations, we used the restricted range, which means that 64 maps to 0.0 and 940 maps to 1.0. If another range is wanted we need to adjust the equation. As an example, if we use the range [0, 1023] we can use $$b=\text{ceil}(Y'_{10bit\_highest})=\text{ceil}((1023*Y'_{highest}))$$

$$a=\text{floor}(Y'_{10bit\_lowest})=\text{floor}((1023*Y'_{lowest}))$$

Assume in a first example, that the upper bound is determined for the luma component value. If the interval length b−a<512, we have saved ourselves one iteration. If b−a<256, we have saved two iterations, etc. If we only use an upper bound, we can, thus, instead use the following pseudo code:
a=0
$Y'_{highest\_10bits}$=calcYpHighest(Yo, Cb10bit, Cr10bit)
b=min (1023, $Y'_{highest\_10bits}$)

```
if (b-a>512)
N=10
else if (b-a>256)
N=9
else if (b-a>128)
N=8
else if (b-a>64)
N=7
else if (b-a>32)
N=6
else if (b-a>16)
N=5
else if (b-a>8)
N=4
else if (b-a>4)
N=3
else
N=2
end
[a, b]=performBinarySearch(a, b, Y_o, Cb10bit, Cr10bit, N)
Ya=calcY(a, Cb10bit, Cr10bit)
Yb=calcY(b, Cb10bit, Cr10bit)
e1=(Ya-Y_o)^2
e2=(Yb-Y_o)^2
if (e1<e2)
use Y'=a
else
use Y=b
end
```

Here, calcYpHighest performs the following actions:

```
Y'_highest_10bits=calcYpHighest(Y_o, Cb10bit, Cr10bit)
{
Y'_highest=tf(Y_o);
return(ceil(4.0*(219.0*Y'_highest+16)))
}
```

Note that if we use the restricted interval [64, 940], we can set a=64 and b=min(940, $Y'_{highest\_10bits}$). In the above function we have assumed the interval is the full [0, 1023].

Assume in a second example, that the both the upper and lower bounds are determined for the luma component value. We can then change the pseudo code from
a=0
$Y'_{highest\_10bits}$=calcYpHighest(Y', Cb10bit, Cr10bit)
b=min(1023, $Y'_{highest\_10bits}$)
to
$Y_{lowest\_10bits}$=calcYpLowest(Y_o, Cb10bit, Cr10bit)
$Y_{highest\_10bits}$=calcYpHighest(Y_o, Cb10bit, Cr10bit)
a=max(0, $Y'_{lowest\_10bits}$)
b=min(1023, $Y'_{highest\_10bits}$)
where calcYpLowest is described below:

```
Y_lowest_10bits=calcYpLowest(Y_o, Cb10bit, Cr10bit)
{
Cb=dClip(((1.0*Cb10bit)/4.0-128.0)/224.0, -0.5, 0.5);
Cr=dClip(((1.0*Cr10bit)/4.0-128.0)/224.0, -0.5, 0.5);
tf_var=tf(Y_o);
Y'_lowest=tf_var-a_13*Cr;
Y'_lowest=min(Y'_lowest, tf_var-a_22*Cb-a_23*Cr);
Y'_lowest=min(Y'_lowest, tf_var-a_32*Cb);
Y'_lowest_10bits=(ceil(4.0*(219.0*Y'_lowest+16)))
end
return (Y'_lowest_10bits)
}
```

An alternative version of calcYpHighest, which we call calcYpHighestAlternative can used:
$Y'_{lowest\_10bits}$=calcYpLowest(Y_o, Cb10bit, Cr10bit)
$Y'_{highest\_10bits}$=calcYpHighestAlternative(Y_o, Cb10bit, Cr10bit)
a=max(0, $Y'_{lowest\_10bits}$)
b=min(1023, $Y'_{highest\_10bits}$)
where calcYpHighestAlternative is described below:
$Y'_{highest\_10bits}$=calcYpHighestAlternative(Y_o, Cb10bit, Cr10bit)

```
{
Cb=dClip(((1.0*Cb10bit)/4.0-128.0)/224.0, -0.5, 0.5);
Cr=dClip(((1.0*Cr10bit)/4.0-128.0)/224.0, -0.5, 0.5);
tf_var=tf(Y_o);
Y'_highest=tf_var-a_13*Cr;
Y'_highest=max(Y_highest, tf_var-a_22*Cb-a_23*Cr);
Y'_highest=max(Y_highest, tf_var-a_32*Cb);
Y_highest_10bits=(floor(4.0*(219.0*Y'_highest+16)))
return(Y'_highest_10bits)
}
``` where floor(a) rounds the number a to the closest lower integer. This makes it possible to further decrease the size of the interval, thus, reducing the number of iterations needed and hence reducing the running time and complexity.

In yet an alternate embodiment, both calcYpHighest and calcYpHighestAlternative are used, and the tightest, i.e. lowest, bound is used:

calcYpHighestTightest($Y_o$,Cb10bit,Cr10bit)=min(calcYpHighest($Y_o$,Cb10bit,Cr10bit),calcYpHighestAlternative($Y_o$,Cb10bit,Cr10bit)).

This makes it possible to further decrease the size of the interval, thus, reducing the number of iterations needed and hence reducing the running time and complexity.

Figure 6:
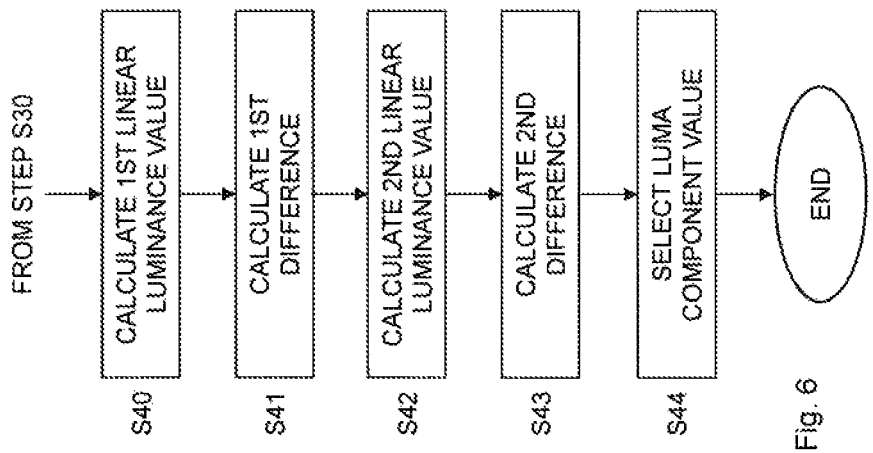
FIG. 6 is a flow chart illustrating an embodiment of the selecting step in FIG. 5.

In an embodiment, the method comprises the additional steps S40 to S44 as shown in FIG. 6. These steps S40 to S44 illustrate a particular embodiment of step S31 shown in FIG. 5. Hence, the method continues from step S30 in FIG. 5 to step S40. This step S40 comprises calculating a first linear luminance value based on the lower bound and the first chroma component value and the second chroma component value in the second color space. Step S41 comprises calculating a first difference between the first linear luminance value and the desired linear luminance value. Step S42 correspondingly comprises calculating a second linear luminance value based on the upper bound and the first chroma component value and the second chroma component value in the second color space. The following step S43 comprises calculating a second difference between the second linear luminance value and the desired linear luminance value. Steps S40-S43 can be performed in any order or at least partly parallel as long as step S40 is performed prior to step S41 and step S42 is performed prior to step S43.

The method then continues to step S44, which comprises selecting the lower bound as the luma component value in the second color space if the first difference is smaller than the second difference and otherwise selecting the upper bound as the luma component value in the second color space.

The differences calculated in step S41 and S43 could be absolute differences $|Y-Y_o|$ or squared differences $(Y-Y_o)^2$. The differences, such as absolute differences or squared differences, could be differences between a function of the first or second linear luminance value and a function of the desired linear luminance value. The function could, for instance, be the perceptual quantizer transfer function.

In this embodiment, the binary search, such as performed as described above in connection with FIG. 5, could output, two values, the lower bound and the upper bound. These two values correspond to a and b in the pseudo code:
[a, b]=performBinarySearch(a, b, Y_o, Cb10bit, Cr10bit, N)

The calculation of the first and second linear luminance values Ya, Yb are represented, in the pseudo code by the lines:
Ya=calcY(a, Cb10bit, Cr10bit)
Yb=calcY(b, Cb10bit, Cr10bit)

Thereafter these two differences or error values are calculated between the first or second linear luminance values and the desired linear luminance value $Y_o$ to see which of them results in the smallest difference:

$$e1=(Ya-Y_o)^2$$

$$e2=(Yb-Y_o)^2$$

In this example, the squared difference is calculated. In another embodiment, the absolute difference could be calculated. Then the luma component value is set equal to the lower bound or the upper bound based on a comparison of the calculated errors:
if (e1<e2)
use Y'=a
else
use Y'=b
end In the previous examples, going from equation 5 to equation 6 above we assumed that there was no clipping of the R', G' and B' variables. We will now further investigate how clipping affects this. We start by dividing up the clipping in step 2 into three steps:

$$R'=Y'+a13*Cr$$

$$G'=Y'+a22*Cb+a23*Cr$$

$$B'=Y'+a32*Cb$$

$$R'_1=\min(R',1)$$

$$G'_1=\min(G',1)$$

$$B'_1=\min(B',1)$$

$$R'_{01}=\max(R'1,0)$$

$$G'_{01}=\max(G'1,0)$$

$$B'_{01}=\max(B'1,0)$$

The first step calculates unclipped values, the second sets all values larger than 1 to 1, and the third step sets all values smaller than 0 to 0. Repeating equation 4 again:

$$Y_{result}=w_R tf^{-1}(R'_{01})+w_G tf^{-1}(G'_{01})+w_B tf^{-1}(B'_{01}) \quad \text{(equation 4)}$$

Figure 3:
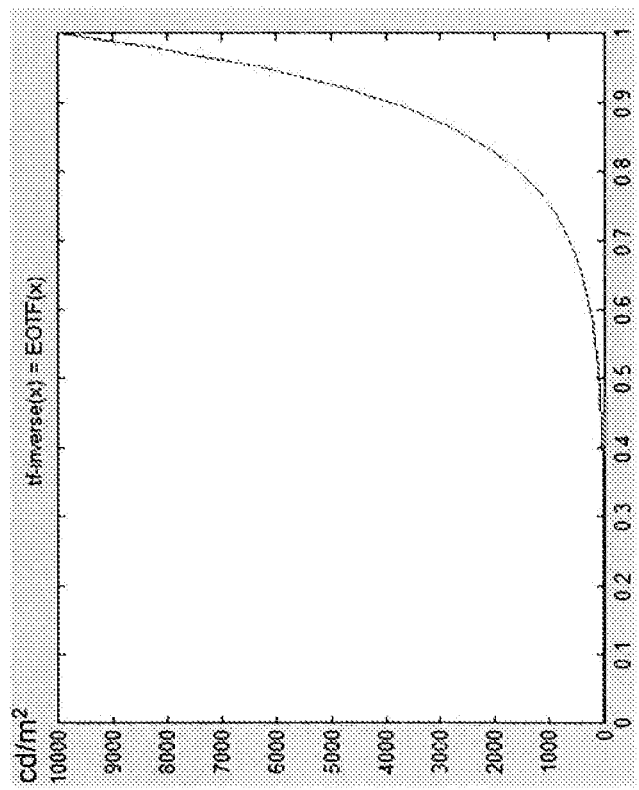
FIG. 3 is a diagram plotting the convex function $tf^{-1}(x)$.

Now the function $tf^{-1}(x)$ is not defined for negative values x, but it is easy to extend it to negative values. As an example, we can extend it so that $tf^{-1}(x)=0$ if x<0. It is easy to see from FIG. 3 that the extended function is still convex. But with the extended function, there is no difference between that $R'_{01}$ and $R'_1$. Hence, $Y_{result}=w_R tf^{-1}(R'_1)+w_G tf^{-1}(G'_1)+w_B tf^{-1}(B'_1)$ where we have used boldface for $tf^{-1}(x)$ to signal that we use the extended version of the function. Since the extended function is still convex, we can use the convexity and write $Y_{result}=w_R tf^{-1}(R'_1)+w_G tf^{-1}(G'_1)+w_B tf^{-1}(B'_1) \geq tf^{-1}(w_R R'_1+w_B B'1+w_G G'_1)$.

Now assume we will use a Y' that is small enough so that none of the values R', G' or B' is larger than 1. In that case $R'_1=R'$, $G'_1=G'$ and $B'_1=B'$. This means we can write $Y_{result} \geq tf^{-1}(w_R R'+w_G G'+w_B B')$ and continue with equation 6 above to calculate the highest possible Y' value $Y'_{highest}$, $Y'_{highest}=tf(Y_o)$.

We can now test this bounding value and see if it results in R', G' or B'-values higher than 1:

$$R'=Y'_{highest}+a13*Cr$$

$$G'=Y'_{highest}+a22*Cb+a23*Cr$$

$$B'=Y'_{highest}+a32*Cb \quad \text{(equation 3b)}$$

If one or more of R', G' and B' is larger than 1 in equation 3b, this indicates that the optimal value for Y', i.e. the Y' which will result in a linear Y value as close as possible to $Y_o$, may also clip these values. In this case, the bound is not guaranteed to hold and it is safest not to say anything about the highest possible value, so we set b to 1023, or alternatively to 1019 or 940.

Actually, even if $Y'_{highest}$ does not cause any of R', G' and B' to exceed 1 in equation 3b, it is still theoretically possible that the optimal value for Y', when inserted into equation 3a would result in R', G' and B' values larger than 1. This is due to the fact that if the optimal value clips, then the derivation of $Y'_{highest}$ is no longer valid, and we may get a $Y'_{highest}$ that is too low, low enough for R', G' and B' not to clip in equation 3b. So in either case, we cannot be sure that $Y'_{highest}$ is a true bound for the optimal value for Y'.

However, in practice we have not been able to find a single combination of variables where the optimal Y' clips but $Y'_{highest}$ does not. In fact, it seems likely that if $Y'_{highest}$ does not result in R', G' and B' larger than one when inserted into equation 3b, then it is also a true bound for the optimal Y'.

To account for clipping against 1, it is therefore sufficient to test if equation 3b results in values larger than one. We therefore modify our function calcYpHighest($Y_o$) according to:
$Y'_{highest\_10bits}$=calcYpHighest($Y_o$, Cb10bit, Cr10bit)
{
Cb=dClip(((1.0*Cb10bit)/4.0−128.0)/224.0, −0.5, 0.5);
Cr=dClip(((1.0*Cr10bit)/4.0−128.0) 224.0, −0.5, 0.5);
$Y'_{highest}$=tf($Y_o$);
R'=$Y'_{highest}$+a13*Cr;
G'=$Y'_{highest}$+a22*Cb+a23*Cr;
B'=$Y'_{highest}$+a32*Cb;
if (R'>1 OR G'>1 OR B'>1)
$Y'_{highest\_10bits}$=1023;
else
$Y'_{highest\_10bits}$=ceil(4.0*(219.0*$Y'_{highest}$+16))
end
return($Y'_{highest\_10bits}$)
}

In an alternative embodiment we use the other, more conservative upper bound to test if the tighter upper bound can be used. Thus we first use the following pseudo code to calculate
$Y'_{highest\_conservative}$:
$Y'_{highest\_conservative}$=calcYpHighestConservative($Y_o$, Cb10bit, Cr10bit)
{
Cb=dClip(((1.0*Cb10bit)/4.0−128.0)/224.0, −0.5, 0.5);
Cr=dClip(((1.0*Cr10bit)/4.0−128.0)/224.0, −0.5, 0.5);
tf_var=tf($Y_o$);
$Y'_{highest\_conservative}$=tf_var−a13*Cr;
$Y'_{highest\_conservative}$=max($Y'_{highest\_conservative}$, tf_var−a22*Cb−a23*Cr);
$Y'_{highest\_conservative}$=max($Y'_{highest\_conservative}$, tf_var−a32*Cb);
$Y_{highest\_conservative}$=min($Y'_{highest\_conservative}$, 1.0);
return($Y'_{highest\_conservative}$)
}

Now, we can use this value to calculate the tighter bound safely:

$Y'_{highest\_10bits}$=calcYpHighestSafe($Y_o$, Cb10bit, Cr10bit, $Y'_{highest\_conservative}$)
{
 Cb=dClip(((1.0*Cb10bit)/4.0−128.0)/224.0, −0.5, 0.5);
 Cr=dClip(((1.0*Cr10bit)/4.0−128.0)/224.0, −0.5, 0.5);
 $Y'_{highest}$=tf($Y_o$);
 R'=$Y'_{highest\_conservative}$+a13*Cr;
 G'=$Y'_{highest\_conservative}$+a22*Cb+a23*Cr;
 B'=$Y'_{highest\_conservative}$+a32*Cb;
 if (R'>1 OR G'>1 OR B'>1)
1. $Y'_{highest\_10bits}$=ceil(4.0*(219.0*$Y'_{highest\_conservative}$+16));
 else
1. $Y'_{highest\_10bits}$=ceil(4.0*(219.0*$Y'_{highest}$+16))
 end
 return(min($Y'_{highest\_10bits}$, 940))
}

This way of calculating the upper bound is safe, since if the highest possible value for Y', which is $Y'_{highest\_conservative}$, does not clip against 1 for R, G and B, then Y' cannot clip either against 1 and it is, thus, safe to use the tighter bound $Y'_{highest}$. However, if the upper bound $Y'_{highest\_conservative}$ clips against 1 it may be the case that the optimal Y' also clips against 1, which in turn means that the tighter upper bound $Y'_{highest}$ may not be correct.

In practice, however, it is likely sufficient to do the clipping test using $Y'_{highest}$ instead of using $Y'_{highest\_conservative}$, as is done in calcYpHighest( ). This has two advantages. First, it is not necessary to calculate $Y'_{highest\_conservative}$ to do the test, and second, since $Y'_{highest}$<$Y'_{highest\_conservative}$ it will also result in fewer instances where the looser bound is used, which provides a tighter bound in more cases thus avoiding iterations.

Note that it may not be free to execute calcYpHighest(.). Therefore it makes sense to make it as quick as possible. One idea is to create a lookup table (LUT) for the calculation of the transfer function tf(.), which is otherwise likely the slowest part of calcYoHighest( ). Since this LUT is one-dimensional, it will not take up a lot of space. As an example, if 1024 values are used in the LUT, and each value is a double, taking 8 bytes, only 8 kB will be necessary for the LUT.

In order to improve the accuracy of the LUT, it may be advantageous to fetch the two nearest LUT values and perform linear interpolation between them. The LUT can also be constructed so that it is conservative—the linear approximation of the transfer function can be made to always be above the transfer function, instead of being as close as possible to the transfer function. This way we are assured the $Y'_{highest}$ will be a true bound, something which would not be possible if some interpolated LUT values were below the actual transfer function. Another way to get a conservative value is to not use linear interpolation, but always round up. As an example, if the value of $Y_o$ indicates that we should look for a value that is between the LUT position 114 and 115, we can always take the value 115. Since the transfer function is monotonically increasing, all the values of the transfer function between 114 and 115 must be smaller than the LUT value in position 115.

As an example, if we have a LUT of size 1023, we may exchange the line $Y'_{highest}$=tf($Y_o$);

with $Y'_{highest}$=TF_LUT[ceil($Y_o$*1023)];

where ceil rounds up to the nearest integer.

Likewise, when we are using the lower bound, we may use a LUT conservative the other way, i.e. all the interpolated values from the LUT are always lower or equal to the actual value of the transfer function for that point.

Figure 7:
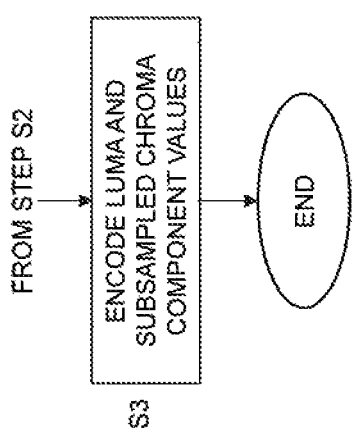
FIG. 7 is a flow chart illustrating an additional step of the method shown in FIG. 1 to form a method of encoding a pixel according to an embodiment.

FIG. 7 illustrates when combined with FIG. 1 a method of encoding a pixel in a picture. The method comprises pre-processing the pixel in steps S1 and S2 according to any of the embodiments to obtain a luma component value in the second color space for the pixel. The method then continues to step S3 in FIG. 7. This step S3 comprises encoding the luma component value, a subsampled first chroma component value and a subsampled second chroma component value in the second color space.

The two subsampled chroma component values are the Cb'Cr' values subsampled into the 4:2:0 or 4:2:2 format. Subsampling can be performed according to known subsampling techniques. For instance, a filtering operation or a nearest neighbor operation can be used. An example of subsampling technique that can be used according to the embodiments is disclosed in section B.1.5.5 Chroma downsampling from 4:4:4 to 4:2:0 in document [5].

The output of the pre-processing, i.e. Y'Cb'Cr', such as in the 4:2:0 or 4:2:2 format, is then input to a video encoder, such as a H.264 video encoder, a High Efficiency Video Encoder (HEVC) or H.265 video encoder, or another video encoder. The encoding as performed by the video encoder can include traditional video encoding steps, such as inter prediction, intra prediction, mode decision, transformation of residual, quantization and encoding of the transformed and quantized residuals, such as in an entropy encoder.

An advantage of the pre-processing of the embodiments is that it can be applied to any video or picture encoding process without the need for performing any adjustments in the video or picture encoder or any adjustments in the corresponding video or picture decoder.

The pre-processing of pixels in pictures, such as of a video sequence, may also be used in other applications besides video encoding. For instance, the embodiments can be used as a pre-processing that is applied before transferring video over an interface, such as high-definition multimedia interface (HDMI), DisplayPort or Thunderbolt. For example, in HDMI 2.0a the only way to convey 4K resolution at 50 or 60 frames per second (fps) is to use 4:2:0 or 4:2:2 YCbCr subsampling. If the video data is in full chroma sampling format (4:4:4) then a subsampling pre-processing step must be applied before sending the video data over the HDMI cable. The 4:2:0 or 4:2:2 video data is then transferred over the interface without further compression. By applying the pre-processing of the embodiments, the video quality is improved compared to conventional 4:2:0 or 4:2:2 subsampling in the non-linear domain, i.e. subsampling of Cb'Cr' values.

According to an embodiment, a method is provided for an encoder or for a pre-process to an encoder, or for a conversion process, for calculating an upper bound for a suitable Y' value referred to as Y'-value to be used for HDR encoding. The suitable Y'-value can be thought of as a corrected Y' value compared to the Y' value traditional processing would give. The suitable Y' value will result in a linear luminance closer to the desired linear luminance $Y_o$. Further the upper bound of the Y'-value, i.e. $Y'_{highest}$, is determined as a function of the desired linear luminance $Y_o$. In more detail, the upper bound $Y'_{highest}$ may be calculated as $Y'_{highest}$=tf($Y_o$), wherein tf is a concave transfer function.

The desired linear luminance is calculated as $Y_o = w_R * R_o + w_G * G_o + w_B * B_o$, where $(R_o, G_o, B_o)$ are the original linear RGB values for the pixel.

The concave transfer function can be any concave transfer function defined on the interval [0, 1], such as a normal gamma $y = x^{(1/2.2)}$.

Further a lower bound of the Y'-value, $Y'_{lowest}$, is determined based on a function of the desired linear luminance $Y_o$. In more detail, the lower bound of the Y'-value, $Y'_{lowest}$, may be determined based on a function of $tf(Y_o)$, where $tf()$ is a monotonously increasing transfer function. In yet more detail, the lower bound of the Y'-value, $Y'_{lowest}$, may be determined as $Y'_{lowest} = \min(tf(Y_o) - a13*Cr, tf(Y_o) - a22*Cb - a23*Cr, tf(Y_o) - a32*Cb, 0)$.

It is possible to only determine the upper bound or only the lower bound or both the lower and the upper bounds.

Thus, according to a first aspect of the present invention a method is provided for an encoder, for a pre-process to an encoder, or for a conversion process, for calculating at least one bound for a suitable Y' value referred to as Y'-value to be used for HDR encoding, display, or further processing. The at least one bound is determined as or based on a function of a desired linear luminance $Y_o$, wherein the function is a transfer function.

The proposed solution allows a faster conversion from RGB 4:4:4 to Y'CbCr 4:2:0 than previous art.

The proposed solution allows a conversion from RGB 4:4:4 to Y'CbCr 4:2:0 that uses less memory than previous art.

The proposed solution allows a conversion from RGB 4:4:4 to Y'CbCr 4:2:0 that is of a higher quality than previous art.

In the foregoing, embodiments have been described with regard to Y' as luma component value, CbCr as chroma component values and Y'CbCr as the second color space.

The embodiments are, however, not limited thereto. ICtCp is an alternative color space, in which the I value carries luma information and the CtCp values carry chroma information. In an embodiment, LMS values in the LMS color space can be obtained from RGB values and a color transform according to below:

$$L = (1688*R + 2146*G + 262*B)/4096$$

$$M = (683*R + 2951*G + 462*B)/4096$$

$$S = (99*R + 309*G + 3688*B)/4096$$

A transfer function, such as the inverse of $EOTF_{PQ}$, can then be applied to the LMS values in order to obtain non-linear L'M'S' values. Finally, a color transform is applied to these L'M'S' value to obtain the ICtCp values:

$$I = 0.5*L' + 0.5*M'$$

$$Ct = (6610*L' - 13613*M' + 7003*S')/4096$$

$$Cp = (17933*L' - 17390*M' - 543*S')/4096$$

The embodiments can then be applied to this case with I representing luma component value and CtCp representing the first and second chroma component values and ICtCp being the second color space.

Another aspect of the embodiments relates to a device for pre-processing a pixel in a picture. The device is configured to determine at least one bound for a luma component value of the pixel in a second color space based on a function of a desired linear luminance value of the pixel in a third color space, wherein the function is a transfer function. The device is also configured to select a luma component value in the second color space for the pixel within an interval comprising multiple luma component values in the second color space and bounded by the at least one bound, wherein a color of the pixel is represented by the luma component value, a first chroma component value and a second chroma component value in the second color space.

In an embodiment, the device is configured to determine the desired linear luminance value based on a linear color of the pixel in a first color space.

In an embodiment, the device is configured to determine an upper bound for the luma component value and for the interval based on, preferably as, $tf(Y_o)$. $tf(.)$ is a concave transfer function and $Y_o$ denotes the desired linear luminance value.

In another embodiment, the device is configured to determine an upper bound for the luma component value and for the interval as a maximum of $tf(Y_o) - a_{13}Cr$, $tf(Y_o) - a_{22}Cb - a_{23}Cr$ and $tf(Y_o) - a_{32}Cb$. $tf(.)$ is a monotonously increasing transfer function, $Y_o$ denotes the desired linear luminance value, Cb denotes the first chroma component value in the second color space, Cr denotes the second chroma component value in the second color space, and the constants $a_{13} = 1.57480$, $a_{22} = -0.18733$, $a_{23} = -0.46813$ and $a_{32} = 1.85563$ for Rec.709 and $a_{13} = 1.47460$, $a_{22} = -0.16455$, $a_{23} = -0.57135$ and $a_{32} = 1.88140$ for BT.2020.

In a further embodiment, the device is configured to determine a first bound as $tf(Y_o)$. $tf(.)$ is a concave transfer function and $Y_o$ denotes the desired linear luminance value. The device is also configured to determine, if a test value calculated based on the first bound is larger than one, a second bound as a maximum of $tf(Y_o) - a_{13}Cr$, $tf(Y_o) - a_{22}Cb - a_{23}Cr$ and $tf(Y_o) - a_{32}Cb$. $tf(.)$ is a monotonously increasing transfer function, Cb denotes the first chroma component value in the second color space, Cr denotes the second chroma component value in the second color space, and the constants $a_{13} = 1.57480$, $a_{22} = -0.18733$, $a_{23} = -0.46813$ and $a_{32} = 1.85563$ for Rec.709 and $a_{13} = 1.47460$, $a_{22} = -0.16455$, $a_{23} = -0.57135$ and $a_{32} = 1.88140$ for BT.2020. The device is further configured to select an upper bound for the luma component value and for the interval as the second bound if the test value is larger than one and otherwise select the first bound.

In an embodiment, the device is configured to determine a lower bound for the luma component value and for the interval based on, preferably as, $tf(Y_o)$. $tf(.)$ is a monotonously increasing transfer function and $Y_o$ denotes the desired linear luminance value.

In a particular embodiment, the device is configured to determine the lower bound as a minimum of $tf(Y_o) - a_{13}Cr$, $tf(Y_o) - a_{22}Cb - a_{23}Cr$ and $tf(Y_o) - a_{32}Cb$. Cb denotes the first chroma value in the second color space, Cr denotes the second chroma value in the second color space, and the constants $a_{13} = 1.57480$, $a_{22} = -0.18733$, $a_{23} = -0.46813$ and $a_{32} = 1.85563$ for Rec.709 and $a_{13} = 1.47460$, $a_{22} = -0.16455$, $a_{23} = -0.57135$ and $a_{32} = 1.88140$ for BT.2020.

In an embodiment, the device is configured to select, within the interval, a luma component value that minimizes a difference between the desired linear luminance value and a linear luminance value in the third color space calculated based on the luma component value, the first chroma component value and the second chroma component value in the second color space.

In an embodiment, the device is configured to perform a binary search to select the luma component value within the interval.

In a particular embodiment, the device is configured to perform, as long as an upper bound for said luma component value is larger than a lower bound for said luma component value plus one, the following operations. The device is configured to determine a luma component value in the middle of an interval bounded by said lower bound and said upper bound. The device is also configured to calculate a linear luminance value in said third color space based on said determined luma component value, said first chroma component value and said second chroma component value in said second color space. The device is additionally configured to set said lower bound equal to said determined luma component value if said calculated linear luminance value is smaller than said desired linear luminance value or otherwise set said upper bound equal to said determined luma component value. Once the device determines that the upper bound is no longer larger the lower bound plus one, the device is configured to select said luma component value as said lower bound or said upper bound.

In an embodiment, the device is additionally configured to calculate a first linear luminance value based on the lower bound, the first chroma component value and the second chroma component value in the second color space. The device is also configured to calculate a first difference between the first linear luminance value, or a function thereof, and the desired linear luminance value, or the function thereof. The device is further configured to calculate a second linear luminance value based on the upper bound, the first chroma component value and the second chroma component value in the second color space. The device is additionally configured to calculate a second difference between the second linear luminance value, or the function thereof, and the desired linear luminance value, or the function thereof. The device is further configured to select the lower bound as the luma component value in the second color space if the first difference is smaller than the second difference and otherwise selecting the upper bound as the luma component value in the second color space.

Figure 8:
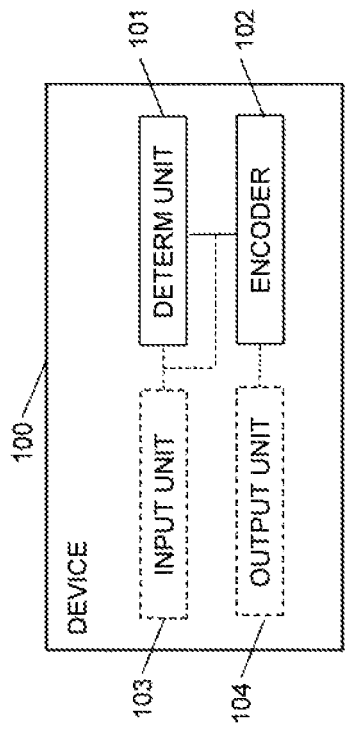
FIG. 8 is a schematic illustration of hardware implementations of a device according to the embodiments.

According to a second aspect of the present invention an arrangement or device 100 is provided, see FIG. 8. The arrangement or device 100 is exemplified by an encoder, a pre-process to an encoder, or a conversion process, for calculating at least one bound for a suitable Y' value referred to as the Y'-value to be used for HDR encoding, display or further processing is provided. The arrangement or device 100 is configured to determine the at least one bound based on a function of a desired linear luminance $Y_o$, wherein the function is a transfer function.

Hence the arrangement or device 100 may comprise a determining unit 101 for determining the at least one bound based on a function of a desired linear luminance $Y_o$, wherein the function is a transfer function.

Moreover, the arrangement or device 100 and the determining unit 101 may be configured to do the determination according to any of the embodiments below or a combination thereof.

According to one embodiment, the at least one bound is an upper bound and the transfer function is a concave transfer function.

According to a further embodiment the at least one bound is a lower bound and the transfer function is a monotonously increasing transfer function.

The arrangement or device 100 may in addition to the determining unit 101 further comprise an encoding unit or encoder 102 and an input unit 103 configured to receive the video to be encoded and an output unit 103 configured to output an encoded bitstream. The encoder 102 is preferably arranged for encoding the luma component value, the sub-sampled first chroma component value and the subsampled second chroma component value in the second color space.

The input unit 103 could be in the form of a general input unit, in particular in the case of a wired connection to external devices. Alternatively, the input unit 103 could be in the form of a receiver or transceiver, in particular in the case or a wireless connection to external devices. Correspondingly, the output unit 104 could be in the form of a general output unit, in particular in the case of a wired connection to external devices. Alternatively, the output unit 104 could be in the form of a transmitter or transceiver, in particular in the case or a wireless connection to external devices.

The input unit 103 may connected to the determining unit 103 and the encoding unit 102. The encoding unit 102 may be connected to the determining unit 101 and to the output unit 104 to forward the encoded bitstream to a decoder.

Figure 9:
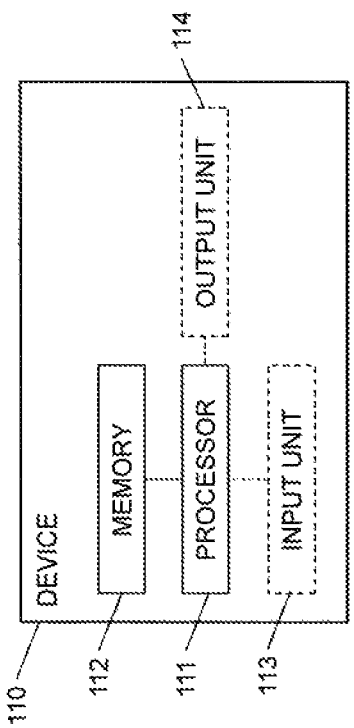
FIG. 9 is a schematic illustration of an implementation of a device according to the embodiments with a processor and a memory.

According to a further aspect, the device 110 comprises a processor 111 and a memory 112 comprising instructions executable by the processor 112, see FIG. 9. The processor 111 is operative to determine the at least one bound for the luma component value. The processor 111 is also operative to select the luma component value in the second color space for the pixel within the interval.

In an embodiment, the processor 111 is operative to determine the at least one bound based on a function of a desired linear luminance $Y_o$, wherein the function is a transfer function.

The device 110 may optionally comprise an input unit 113 and an output unit 114. In such a case, the input unit 113 is configured to receive pictures of a video sequence to the pre-processed by the device 110 and the processor 111 according to the instructions stored in the memory 112. The output unit 114 is then configured to output the pre-processed pictures, or if the device 110 additionally is configured to encode the pre-processed pictures, an encoded bitstream representing an encoded version of the pictures of the video sequence.

Yet another aspect of the embodiments relates to a device 110 for encoding a pixel in a picture. The device 110 comprises a processor 111 and a memory 112 comprising instructions executable by the processor 111. The processor 111 is operative to determine at least one bound for a luma component value of the pixel in a second color space based on a function of a desired linear luminance value of the pixel in a third color space. The function is a transfer function. The processor 111 is also operative to select a luma component value in the second color space for the pixel within an interval comprising multiple luma component value sin the second color space and bounded by the at least one bound. The processor 111 is further operative to encode the luma component value, a subsampled first chroma component value and a subsampled second chroma component value in the second color space.

Figure 10:
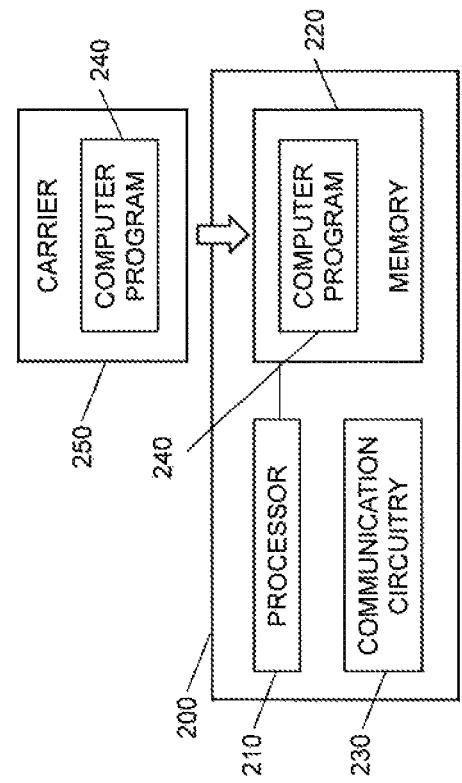
FIG. 10 is a schematic illustration of a user equipment according to an embodiment.

Alternatively, at least some of the steps, functions, procedures, modules and/or blocks described herein may be implemented in software such as a computer program 240 for execution by suitable processing circuitry such as one or more processors or processing units 210 of a user equipment 200, see FIG. 10.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

In a particular embodiment, the processor 210 is operative, when executing the instructions stored in the memory 220 to perform the above described operations. The processor 210 is thereby interconnected to the memory 220 to enable normal software execution.

In one example, at least some of the steps, functions, procedures, modules and/or blocks described herein are implemented in a computer program 240, which is loaded into the memory 220 for execution by processing circuitry including one or more processors 210. The processor 210 and memory 220 are interconnected to each other to enable normal software execution. A communication circuitry 230 is also interconnected to the processor 210 and/or the memory 220 to enable input and/or output of video data.

In an embodiment, the computer program 240 comprises instructions, which when executed by a processor 210, cause the processor 210 to determine at least one bound for a luma component value of the pixel in a second color space based on a function of a desired linear luminance value of the pixel in a third color space. The function is a transfer function. The processor 210 is also caused to select a luma component value in the second color space for the pixel within an interval comprising multiple luma component value sin the second color space and bounded by the at least one bound.

In an embodiment, the computer program 240 further comprises instructions, which when executed by the processor 210, cause the processor 210 to encode the luma component value, a subsampled first chroma component value and a subsampled second chroma component value in the second color space.

The user equipment 200 can be any device or apparatus that can receive and process video data. For instance, the user equipment 200 could be a computer, either stationary or portable, such as laptop, a smart phone, a tablet, a set-top box, etc.

The term 'processor' should be interpreted in a general sense as any system or device capable of executing program code or computer program instructions to perform a particular processing, determining or computing task.

The processing circuitry including one or more processors is thus configured to perform, when executing the computer program, well-defined processing tasks such as those described herein.

The processing circuitry does not have to be dedicated to only execute the above-described steps, functions, procedure and/or blocks, but may also execute other tasks.

The proposed technology also provides a carrier 250 comprising the computer program 240. The carrier 250 is one of an electronic signal, an optical signal, an electromagnetic signal, a magnetic signal, an electric signal, a radio signal, a microwave signal, or a computer-readable storage medium.

By way of example, the software or computer program 240 may be realized as a computer program product, which is normally carried or stored on a computer-readable medium 250, preferably non-volatile computer-readable storage medium 250. The computer-readable medium may include one or more removable or non-removable memory devices including, but not limited to a Read-Only Memory (ROM), a Random Access Memory (RAM), a Compact Disc (CD), a Digital Versatile Disc (DVD), a Blue-ray disc, a Universal Serial Bus (USB) memory, a Hard Disk Drive (HDD) storage device, a flash memory, a magnetic tape, or any other conventional memory device. The computer program 240 may thus be loaded into the operating memory of a computer or equivalent processing device, represented by the user equipment 200 for execution by the processor 210 thereof.

The flow diagram or diagrams presented herein may therefore be regarded as a computer flow diagram or diagrams, when performed by one or more processors. A corresponding device may be defined as a group of function modules, where each step performed by the processor corresponds to a function module. In this case, the function modules are implemented as a computer program running on the processor. Hence, the device may alternatively be defined as a group of function modules, where the function modules are implemented as a computer program running on at least one processor.

The computer program residing in memory may thus be organized as appropriate function modules configured to perform, when executed by the processor, at least part of the steps and/or tasks described herein. An example of such function modules is illustrated in FIG. 11.

Figure 11:
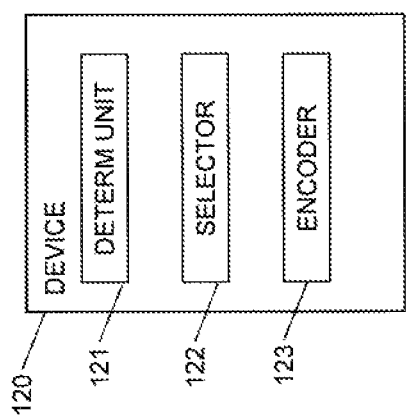
FIG. 11 is a schematic illustration of an implementation of a device according to the embodiments with function modules.

FIG. 11 is a schematic block diagram of a device 120 with function modules. The device 120 is, in an embodiment, a device for pre-processing a picture. The device 120 comprises a determining unit 121 for determining at least one bound for a luma component value of the pixel in a second color space based on a function of a desired linear luminance value of the pixel in a third color space. The function is a transfer function. The device 120 also comprises a selector 122 for selecting a luma component value in the second color space for the pixel within an interval comprising multiple luma component value sin the second color space and bounded by the at least one bound.

In another embodiment, the device 120 is a device for encoding a pixel in a picture. The device 120 comprises a determining unit 121 for determining at least one bound for a luma component value of the pixel in a second color space based on a function of a desired linear luminance value of the pixel in a third color space. The function is a transfer function. The device 120 also comprises a selector 122 for selecting a luma component value in the second color space for the pixel within an interval comprising multiple luma component value sin the second color space and bounded by the at least one bound. The device 120 further comprises an encoder 123 for encoding the luma component value, a subsampled first chroma component value and a subsampled second chroma component value in the second color space.

A further aspect of the embodiments relates to a user equipment comprising a device according to the embodiments, such as illustrated in any of FIG. 8, 9 or 11. The user equipment is selected from a group consisting of a computer, either stationary or portable, a laptop, a smart phone, a tablet, a set-top box, etc.

Yet another aspect of the embodiments relates to a signal representing an encoded version of a pixel in a picture. The encoded version comprises an encoded version of two subsample dchroma component values in a second color format and an encoded version of a luma component value in the second color format obtained according to any of the embodiments. In an embodiment, the signal is one of an electronic signal, an optical signal, an electromagnetic signal, a magnetic signal, an electric signal, a radio signal and a microwave signal.

It is becoming increasingly popular to provide computing services, such as hardware and/or software, in network devices, such as network nodes and/or servers, where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e. in the so-called cloud. This is sometimes also referred to as cloud computing, which is a model for enabling ubiquitous on-demand network access to a pool of configurable computing resources such as networks, servers, storage, applications and general or customized services.

Figure 12:
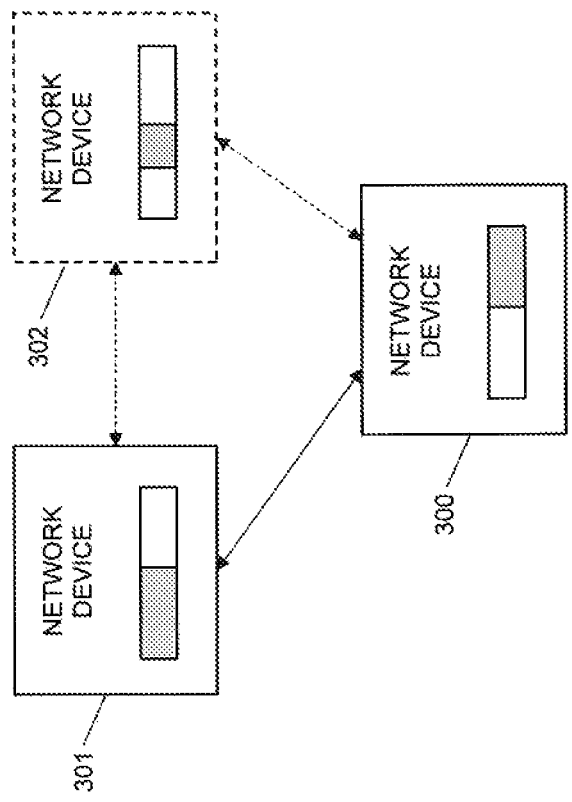
FIG. 12 schematically illustrate a distributed implementation of the embodiments among multiple network devices.

FIG. 12 is a schematic diagram illustrating an example of how functionality can be distributed or partitioned between different network devices 300, 301, 302 in a general case. In this example, there are at least two individual, but interconnected network devices 300, 301, which may have different functionalities, or parts of the same functionality, partitioned between the network devices 300, 301. There may be additional network devices 302 being part of such a distributed implementation. The network devices 300, 301, 302 may be part of the same wireless communication system, or one or more of the network devices may be so-called cloud-based network devices located outside of the wireless communication system.

FIG. 13 is a schematic diagram illustrating an example of a wireless communication system, including an access network 1 and/or a core network 2 and/or an Operations and Support System (OSS) 3 in cooperation with one or more cloud-based network devices 300. The figure also illustrates a network node 4 of the access network 1 and a user equipment 5 according to the embodiments.

ANNEX A

This Annex A provides proof of generalization of convex functions to three variables: Directly from the definition of a convex function, we have that (A1) holds:

$$f(tx_1+(1-t)x_2) \leq tf(x_1)+(1-t)f(x_2) \quad (A1)$$

This can be generalized to three values. Assume $x_1$, $x_2$ and $x_3$ are three values, and that we have three values $w_1$, $w_2$ and $w_3$ such that $w_1+w_2+w_3=1$. We now examine the following expression $$f(w_1x_1+w_2x_2+w_3x_3) \quad (A2)$$

by introducing a new variable $x_3'$, $$x_3' = \frac{w_1x_1 + w_2x_2}{(1-w_3)}. \quad (A3)$$

We can rewrite equation (A3) as $$w_1x_1+w_2x_2=(1-w_3)x_3' \quad (A4)$$

and insert into (A1), which will yield $$f((1-w_3)x_3'+w_3x_3) \leq (1-w_3)f(x_3')+w_3f(x_3). \quad (A5)$$

Here the inequality is just due to the convexity of $f(x)$ following (A1). We can now put the value for $x_3'$ back into the right hand side of the equation, and using the fact that $(1-w_3)=w_1+w_2$ we get $$f(w_1x_1+w_2x_2+w_3x_3) \leq (w_1+w_2)f\left(\frac{w_1x_1+w_2x_2}{w_1+w_2}\right) + w_3f(x_3) = \quad (A6)$$

-continued $$= (w_1+w_2)f\left(\frac{w_1}{w_1+w_2}x_1 + \frac{w_2}{w_1+w_2}x_2\right) + w_3f(x_3). \quad (A7)$$

Setting $$t = \frac{w_1}{w_1+w_2},$$

we get that $$(1-t) = \left(1 - \frac{w_1}{w_1+w_2}\right) = \left(\frac{w_1+w_2}{w_1+w_2} - \frac{w_1}{w_1+w_2}\right) = \frac{w_2}{w_1+w_2}$$

and we can rewrite the first part of equation (A7) as $$(w_1+w_2)f(tx_1+(1-t)x_2)+w_3f(x_3). \quad (A8)$$

By again making use of (A1), we get $$(w_1+w_2)f(tx_1+(1-t)x_2)+w_3f(x_3) \leq (w_1+w_2)[tf(x_1)+(1-t)f(x_2)]+w_3f(x_3). \quad (A9)$$

Now putting back our value for t and (1−t) we get $$(w_1+w_2)\left[\frac{w_1}{w_1+w_2}f(x_1) + \frac{w_2}{w_1+w_2}f(x_2)\right] + w_3f(x_3), \quad (A10)$$

which equals $$w_1f(x_1)+w_2f(x_2)+w_3f(x_3) \quad (A11)$$

and we have therefore just proven that $$f(w_1x_1+w_2x_2+w_3x_3) \leq w_1f(x_1)+w_2f(x_2)+w_3f(x_3) \quad (A12)$$

if $f(x)$ is convex.

ANNEX B

This Annex B describes the function performBinarySearch in pseudo code below:

```
[a_out, b_out]=performBinarySearch(a, b, Y_o, Cb10 bit, Cr10bit, N)
{
// First convert from integer representation to double
Cb_double=dClip(((1.0*Cb10bit)/4.0−128.0)/224.0, −0.5, 0.5);
Cr_double=dClip(((1.0*Cr10bit)/4.0−128.0)/224.0, −0.5, 0.5);
convertFromYprimeToYlin2020(Ya, Cb_double, Cr_double, a);
convertFromYprimeToYlin2020(Yb, Cb_double, Cr_double, b);
// Now search for the best Y', denoted Yprime or Yp herein;
for (int gg=0; gg<N; gg++)
{
// First calculate midpoint
Yp_mid=(a+b+1)>>1;
// Convert new midpoint to linear RGB
Ymid=convertFromYprimeToYlin2020(Yp_mid, Cb_double, Cr_double);
// Now, if Ymid is smaller than the correct one, we should increase Y', hence mid is the new
// low. Otherwise, mid is the new high.
if (Ymid<Yo)
{
``` a=Yp_mid;
Ya=Ymid;
}
else
{
b=Yp_mid;
Yb=Ymid;
}
}
a_out=a;
b_out=b;
}
and where convertFromYprimeToYlin2020 is defined as
[Ylin]=convertFromYprimeToYlin2020(Yp, Cb_double, Cr_double)
{
// First convert from integer representation to double
Yp_double=((1.0*Yp)/4.0−16.0)/219.0;
// Now convert to RGB
RGB_prime_pix[0]=dClip(Yp_double+1.47460*Cr_double, 0, 1);
RGB_prime_pix[1]=dClip(Yp_double−0.16455*Cb_double−0.57135*Cr_double, 0, 1);
RGB_prime_pix[2]=dClip(Yp_double+1.88140*Cb_double, 0, 1);
// Convert back to linear light using linear approximation of LUT
for (cc=0; cc<3; cc++)
RGB_pix[cc]=pq_eotf_jas(RGB_prime_pix[cc]);
// Finally, calculate the Y of XYZ from the linear RGB:
Ylin=0.262700 * RGB_pix[0]+0.677998 * RGB_pix[1]+ 0.059302 * RGB_pix[2];
}

Similar functions are available for the BT.709 color space, with different constants.

In the above function we have used a transfer function from ST.2084, here named pq_eotf_jas( ). It is reproduced here for the convenience of the reader:

$$\text{pq\_eotf\_jas}(V) = \left(\frac{\max[(V^{1/m} - c_1), 0]}{c_2 - c_3 V^{1/m}}\right)^{1/n}$$

$$n = \frac{2610}{4096} \times \frac{1}{4} \approx 0.15930176$$

$$m = \frac{2523}{4096} \times 128 = 78.84375$$

$$c_1 = c_3 - c_2 + 1 = \frac{3424}{4096} = 0.8359375$$

$$c_2 = \frac{2413}{4096} \times 32 = 18.8515625$$

$$c_3 = \frac{2392}{4096} \times 32 = 18.6875$$

Typically one says that the inverse of the EOTF function is the transfer function, hence
Typically one says that the inverse of the EOTF function is the transfer function, hence $tf(x)=pq\_eotf\_jas^{-1}(x)$, and $tf^{-1}(x)=pq\_eotf\_jas(x)$.

ANNEX C

The present Annex C comprises a description of the Ajusty method that can be used according to the embodiments in order to derive a non-linear luma component value in the second color space.

A combination of a highly non-linear transfer function, 4:2:0 or 4:2:2 subsampling and non-constant luminance ordering gives rise to severe artifacts in saturated colors. An example is described in Annex B, where changes between two colors of similar luminance can result in a reconstructed image with very different luminances.

In a digital video signal, each component of a sample, i.e. pixel, is represented by an integer or floating point value. A display, such as screen, TV or monitor, that renders the video omits optical lights based on the digital values of the video signal. The function that translates the digital value V to optical light Y is the Electro-Optical-Transfer-Function (EOTF). Traditionally the EOTF has been expressed as an exponential function called a gamma function where the gamma value. This is typically 2.4 (but can also be other values): $Y=V^\gamma$.

Using a gamma function works well for low luminance signals but when the luminance goes above 100 nits (cd/m$^2$) the gamma function is not well aligned with the contrast sensitivity of the human visual system. Therefore transfer functions that are more non-linear are defined, e.g.:

$$Y = L_p \left(\frac{\max[(V^{1/m} - c_1), 0]}{c_2 - c_3 V^{1/m}}\right)^{1/n} \quad \text{(equation C1)}$$

$$n = \frac{2610}{4096} \times \frac{1}{4} \approx 0.15930176$$

$$m = \frac{2523}{4096} \times 128 = 78.84375$$

$$c_1 = c_3 - c_2 + 1 = \frac{3424}{4096} = 0.8359375$$

$$c_2 = \frac{2413}{4096} \times 32 = 18.8515625$$

$$c_3 = \frac{2392}{4096} \times 32 = 18.6875$$

$$L_p = 10000 \frac{cd}{m^2}$$

This transfer function is more non-linear than the gamma function in the sense that the maximum value of its first derivative over the range from 0 to 1 is larger than that of the gamma function.

Chroma subsampling is typically done before compression as an initial step to reduce the amount of data. In 4:2:2 the chroma signal is reduced to half the resolution in the vertical direction. In 4:2:0 the chroma signal is reduced to half the resolution in both the vertical direction and the horizontal direction. This is typically done with some filtering operation to get a good quality signal but can also be done using nearest neighbor.

In order to display a 4:2:0 or 4:2:2 video, a decoder performs upsampling of the chroma signal, which can be done using bilinear filters or longer filters.

However, a combination of a highly non-linear transfer function, 4:2:0 or 4:2:2 subsampling and non-constant luminance ordering gives rise to severe artifacts to the video data, in particular for saturated colors, i.e. colors close to the color gamut edge.

There are several ways to get around this problem. One ways is to not use 4:2:0 or 4:2:2 subsampling, but use 4:4:4 instead. That, however, is expensive, since 4:2:0 halves the number of bits prior to compression, whereas 4:2:2 reduces the number of bits to two-thirds. Another way is to not use a highly non-linear transfer function. However, that means that it is hard to represent content of very high peak brightness without having banding in dark regions. A third way is to use constant luminance, i.e. apply the transfer function after conversion to the CIE1931 XYZ color space. However, such a solution is not aligned with common practice within the broadcasting industry and might in some scenarios be difficult and expensive to realize.

A typical compression chain is described below. The incoming linear light pixel (R, G, B) ranging from 0 to 10,000 is first fed to the transfer function, which results in a new pixel (R', G', B') between 0 and 1. After this, the pixel undergoes color transform resulting in Y'Cb'Cr'. Then the Cb' and Cr' components are subsampled to 4:2:0.

After decompression, the 4:2:0 sequences are upsampled to 4:4:4 again, inverse color space conversion gives (R', G', B') and finally inverse transfer function gives back the linear light pixel (R, G, B) that can be output on a monitor.

The trouble comes from the fact that the Cb' and Cr' components are interpolated, whereas the Y' component is not. Hence there can be a sharp shift in the Y' component in a pixel, but the Cb' and Cr' component cannot follow, since they are interpolated. For some colors, especially saturated colors, the result is a pixel of completely wrong intensity, and it is clearly visible.

It is proposed to change the Y' component in these cases so that the tuple (Y' Cb' Cr') generated from the interpolated colors is not so different from the original. Ideally the difference would be so small that it is not noticeable.

Basically it emanates to realizing that the Cb' and Cr' components are false, and then make also the Y' component false so that the (Y' Cb' Cr') are closer to the true colors. In other words, by introducing an error in Y' we can compensate for the errors already existing in Cb' and Cr' to come closer to the real pixel. It could be determined that the Cb' and Cr' components are false by comparing Cb'–Cb and Cr–Cr with a threshold by e.g. comparing the Cb' that you get from first subsampling chroma (4:2:0) then upsampling (to 4:4:4).

According to a first aspect an Ajusty method is provided. The method can be performed in an encoder or in a pre-process to the encoder. In the method, when it is determined that the Cb' and/or Cr' components include errors, a corrected Y' component is derived to compensate for the errors in the Cb' and/or the Cr' components.

According to a second aspect a unit, such as a pre-processor or an encoder, is provided. The unit is configured to determine that the Cb' and/or Cr' components include errors, and when it has determined that the Cb' and/or Cr' components include errors, it is configured to derive a corrected Y' component to compensate for the errors in the Cb' and the Cr' components.

The corrected Y' component can derived according to different embodiments as described below. Hence the corrected Y' component, Cb' and Cr' are then compressed resulting in that the image or video is perceived with a higher quality.

By changing the Y' component, i.e. deriving a corrected Y' component, we can compensate the resulting luminance value. The eye is much more sensitive to luminance changes than to chrominance changes, so the first rule must always be to make sure that the luminance does not deviate too much from the original value.

As described above, the non-linear luminance Y' is adjusted prior to compression so that the linear luminance Y of the pixel is closer to its correct value. This is further described below.

Assume a picture where the left part of the screen, e.g. pixels 0 to 96, has the value (2142, 0, 138) and that the right part, e.g. pixels 97 to 1920, has the value (2142, 4, 138). With a conventional processing chain we would get the results in Table C1.

TABLE C1

Data for the "worst" color for 4:2:0 subsampling

| Pixel no. 97 | RGB value | Y value | Y diff | relative error | Barten steps |
|---|---|---|---|---|---|
| original | 2142 4 138 | 573.5991 | 0 | 0 | 0 |
| RGB 4:4:4 | 2142.6617 3.9750 138.2966 | 573.7735 | 0.1745 | 0.0304% | 0.0691 |
| RGB 4:2:0* | 3993.733 2.4265 263.6030 | 1066.4311 | 492.8320 | 85.9192% | 195.2710 |

*This indicates values obtained by upsampling the subsampled color in 4:2:0 format Here, the Y value is the linear luminance. That is, the Y value of the original is the value you get when you take the original linear light RGB (2142, 4, 138) and convert it to XYZ. For example, if RGB is in the BT.2020 color space you can convert to XYZ using $$X = 0.636958 \times R + 0.144617 \times G + 0.168881 \times B$$

$$Y = 0.262700 \times R + 0.677998 \times G + 0.059302 \times B$$

$$Z = 0.000000 \times R + 0.028073 \times G + 1.060985 \times B \quad \text{(equation C2)}$$

This Y component is the luminance that the eye is most sensitive to. It should not be confused with the Y' component mentioned above, which depends nonlinearly on R, G and B.

As can be seen in Table C1, the Y value is grossly wrong for pixel 97 when using RGB 4:2:0 subsampling and upsampling. Note that in this example, no compression has taken place, only quantization to 10 bits, and yet the Y value has a relative error of 85%. Using Barten's model that predicts how large differences the eye can see, we see that this error is 195 Barten steps, or 195 times greater than what would be just noticeable. If we look at Table C2, we can see what happens.

TABLE C2

Pixel 97 is very different before and after color subsampling

| 4:4:4 10 bits | 94 | 95 | 96 | 97 | 98 | 99 |
|---|---|---|---|---|---|---|
| Linear RGB in | 2142 0 138 | 2142 0 138 | 2142 0 138 | 2142 4 138 | 2142 4 138 | 2142 4 138 |
| Y'Cb'Cr' 4:2:0 | 284 650 | 284 | 284 641 | 422 | 422 575 | 422 |

TABLE C2-continued

Pixel 97 is very different before and after color subsampling

| 4:4:4 10 bits | 94 | 95 | 96 | 97 | 98 | 99 |
|---|---|---|---|---|---|---|
| 10 bits Y'Cb'Cr' after upsampling Linear RGB out | 867 284 650 867 2151.71 0 138.2278 | 284 650 866 2119.42 0 138.2278 | 855 284 641 855 1794.94 0.0018 114.8210 | 422 607 812 3993.73 2.4265 263.6030 | 771 422 575 771 2142.66 3.9750 138.2966 | 422 571 766 1986.71 4.2102 127.3837 |

If we look at the Cb' component, it has the value 607, which is about halfway between 650, before the discontinuity, i.e. pixel 94, and 575, after the discontinuity, but the correct value is 575. The trouble is that the error not only affects the chrominance but also the luminance of the pixel, which becomes way too big. Our idea is to compensate this by changing the Y' component of the pixel. According to the embodiments we do not let the Y' component be 422 for the pixel, but selects the value 363 instead. In Table C3 we show the result.

TABLE C3

Pixel 97 is much more similar before and after color subsampling

| 4:4:4 10 bits | 94 | 95 | 96 | 97 | 98 | 99 |
|---|---|---|---|---|---|---|
| Linear RGB in | 2142 0 138 | 2142 0 138 | 2142 0 138 | 2142 4 138 | 2142 4 138 | 2142 4 138 |
| Y'Cb'Cr' 4:2:0 10 bits | 284 650 867 | 284 | 284 641 855 | 363 | 422 575 771 | 422 |
| Y'Cb'Cr' after upsampling | 284 650 867 | 284 650 866 | 284 641 855 | 363 607 812 | 422 575 771 | 422 571 766 |
| Linear RGB out | 2151.71 0 138.2278 | 2119.42 0 138.2278 | 1794.94 0.0018 114.8210 | 2145.11 0.7008 138.0825 | 2142.66 3.9750 138.2966 | 1986.71 4.2102 127.3837 |

We can now see that the new color is much more similar to its correct value. The green component has gone in the wrong direction, but only by 1.72 cd/m², but at the same time the red component has almost halved to its correct value, a movement of 1849 cd/m², and the blue component has changed in a similar fashion. In Table C4 we show what happens to the luminance.

TABLE C4

Data for the "worst" color for 4:2:0 subsampling after correction

| Pixel no. 97 | RGB value | Y value | Y diff | relative error | Barten steps |
|---|---|---|---|---|---|
| original | 212 4 138 | 573.5991 | 0 | 0 | 0 |
| RGB 4:4:4 | 2142.6617 3.9750 138.2966 | 573.7735 | 0.1745 | 0.0304% | 0.0691 |
| RGB 4:2:0* | 2145.11 0.7008 138.0825 | 572.1852 | 1.4139 | 0.2465% | 0.5602 |

*This indicates values obtained by upsampling the subsampled color in 4:2:0 format As is seen in Table C4, we get a much smaller error in the luminance Y. The relative error is 0.2465%, which is equivalent to 0.5602 Barten steps, i.e. not possible to see.

The error is now instead in the chrominance, but given the fact that the human visual system is less sensitive to errors in chrominance than in luminance, this is not much of a problem. In addition, there is going to be an error in chrominance anyway since it is subsampled. Also, one may change the Y' component to get a good trade-off between the error in luminance and the error in chrominance.

Furthermore, the change in chrominance may not even be noticeable—the only difference is that the green component is 0.7008 cd/m² instead of 3.9750 cd/m² but that is most likely dwarfed by the red component anyway, since it is 2145, almost a thousand times larger. Another way to see it is that the ratio between the green and the red components becomes 0.7008/2145.11=0.000327 instead of the correct 3.9750/2142.6617=0.001855. It is not clear that this slight shift in hue is possible to see for the human eye. Hence we have traded an error in luminance that is 200 times larger than what is just noticeable to an error in chrominance that is so small it might not be possible to see.

The nice thing is that the changed Y' value only affects the individual pixel. Hence no other pixel is sacrificed by changing the Y' component.

In an embodiment, the value Y' is not optimized for a specific value of Cb' and Cr'. Instead the Y' value is selected so that it minimizes the luminance error for some different values of Cb' and Cr' or for a range of Cb' and Cr' values. This can be done in scenarios where the chroma upsampling method is unknown.

One variant is to perform a specific number of chroma upsampling methods and then select the Y' value that minimizes the average squared error for the different upsampling methods. In another version, the Y' value is selected so that the worst case, i.e. largest error, is minimized.

Another variant is to use two or more neighboring values of Cb' and Cr' and use them directly to calculate the range of possible Cb' and Cr' values.

Figure 14:
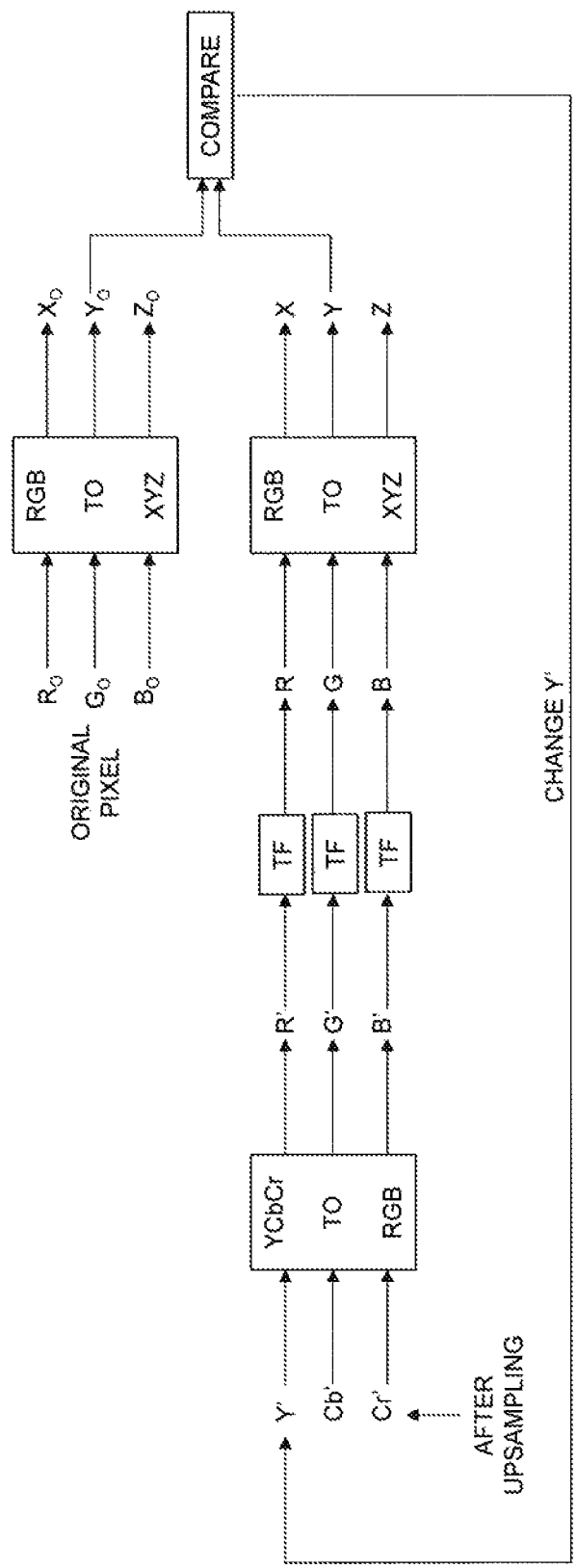
FIG. 14 illustrates an embodiment of deriving the corrected Y'.

There are several ways to find the best value for Y', we will go through a number of them. One way is shown in FIG. 14.

First we need to find the value $Y_o$ to optimize towards. The original pixel $R_o$, $G_o$, $B_o$ is transformed from RGB to XYZ as mentioned above. This results in $X_o$, $Y_o$, $Z_o$, of which we are only interested in $Y_o$. In fact, we do not need to calculate $X_o$ and $Z_o$. This $Y_o$ is the original luminance in linear light, and it is this that the eye is sensitive to. In our test case $Y_o$ is equal to 573.5991, see Table C1.

Second, we take our existing Y' value, together with the Cb' and Cr' values. In the case above, we would feed in (422, 607, 812), see Table C2. Now we would do a color transform from Y'Cb'Cr' to R'G'B'. This is done using $$R' = Y' + 1.47460 \times Cr'$$

$$G' = Y' - 0.16455 \times Cb' - 0.57135 \times Cr'$$

$$B' = Y' + 1.88140 \times Cb'. \quad \text{(equation C3)}$$

Next we invoke the transfer function. In this case we use the PQ-EOTF, which can be implemented using the following Matlab code, for instance:

function L=pq_eotf(c)
%%%
%%% c goes from 0.0 to 1.0
%%% L is output luminance in nits
%%%
c1=0.8359375;
c2=18.8515625;
c3=18.6875;
n=0.1593017578125;
m=78.84375;
c=max(c,0);
c=min(c,1);
L=10000*((max(c.^(1/m)−c1,0)./(c2−c3*c.^(1/m))).^(1/n));

The result is the color (R, G, B) in linear light. Now we convert this to XYZ as mentioned above, or really, we only need to calculate Y. This Y is the linear luminance of the pixel, and it is this luminance that we want to make as close as possible to $Y_o$. In our test case, Y starts out being 1066.4311, see Table C1.

Now we compare Y and $Y_o$. If Y is bigger than $Y_o$, we reduce our Y' value from 422 to something smaller. For instance, we can take one step and try 421. Then the entire calculation is carried out again, generating a new Y value. This is again compared to $Y_o$, and if it is still too big, we reduce Y' further. Finally, we will reach 363 and the resulting Y value, i.e. 572.1852 is now smaller than $Y_o$, i.e. 573.5991. The process now stops.

In the embodiment above it takes 422−363=59 iterations to reach the best value. This may be costly.

Therefore, an embodiment is to do a binary search to find the best Y' value. Optionally, first the maximum Y' value is tried, for instance 1023. Optionally, then the minimum Y' value is tried, for instance 0. Then a value in the middle is tried, for instance 512. If the Y value resulting from Y'=512 is larger than $Y_o$, we should search in the interval [0, 512]. If the Y-value is smaller than $Y_o$, we should instead search the interval [512, 1023]. We then proceed by calculating a new value in the middle of the selected interval, and proceeds until the interval only contains a single number, such as [363, 363], or [363, 364]. This is guaranteed to only take $\log_2(N)$ steps, where N is the number of possible values, which in this case is 1024. Hence only $\log_2(1024)=10$ steps are sufficient.

Figure 18:
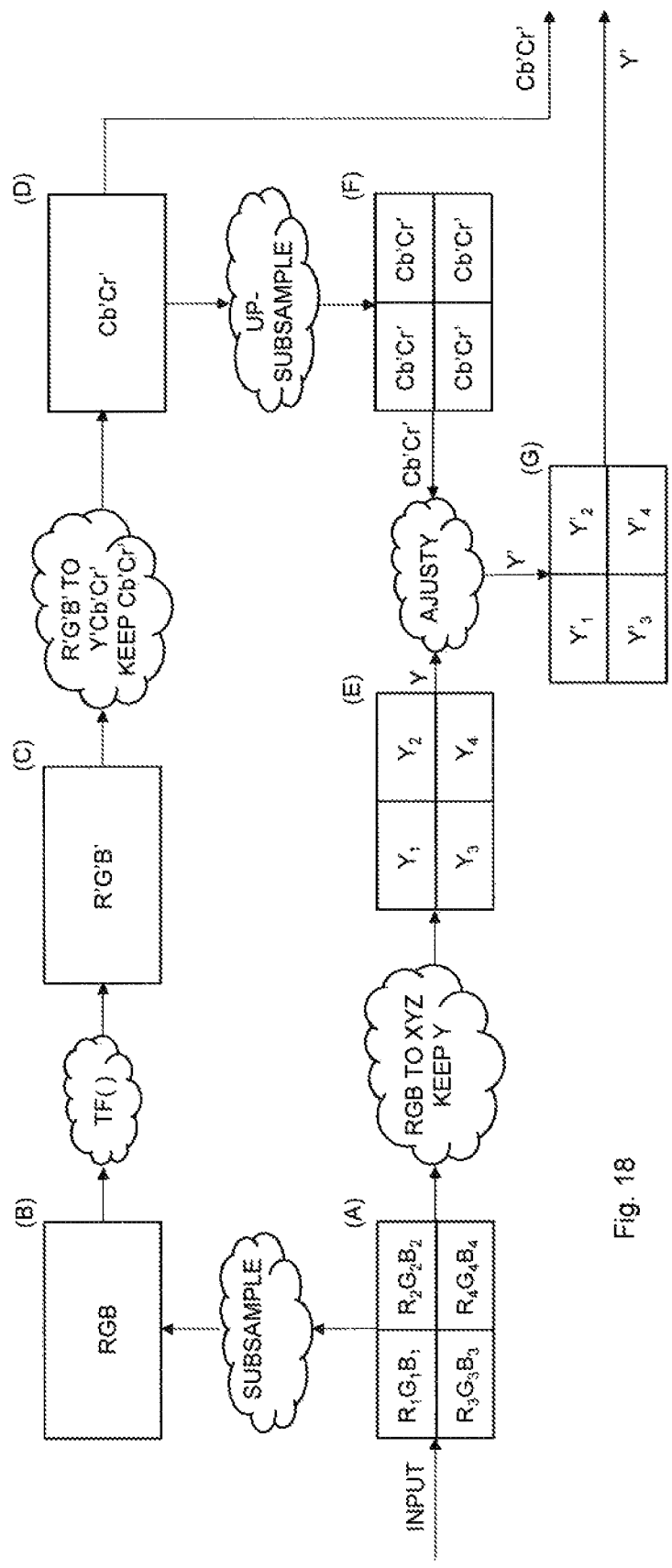
FIG. 18 illustrates an embodiment of obtaining Cb' and Cr' by subsampling in linear RGB and obtaining Y' by using Ajusty.

Yet another way to calculate the best value is to see FIG. 18 as an optimization problem and minimize the error $E=(Y-Y_o)^2$ with respect to Y'. This can be done by gradient descent, by calculating the gradient of E with respect to Y', i.e. dE/dY', and update Y' a small amount in the opposite direction of the gradient: $Y'_{n+1}=Y'_n-\alpha \times dE/dY'$, where $\alpha$ is a small constant.

Gradient descent can be slow, so a quicker way may be to use a second-order optimization algorithm that calculates or approximates the second order derivatives $d^2E/dY'^2$. Gauss-Newton is an example of such an algorithm.

In another embodiment the following process is applied in order to calculate Y': X, $Y_o$ and Z are converted with a XYZ to RGB conversion to produce new values R1, G1 and B1 R1, G1 and B1 are converted with an inverse transfer function to produce R1', G1' and B1'. R1', G1' and B1' are converted with an inverse color transform to produce Y'

In an embodiment, the Y' values of all pixels in an image or picture are corrected. In an alternate embodiment, only pixels that are at risk of having visible luminance errors are corrected. This may include pixels that are close to the color gamut edge, but exclude pixels closer to the middle of the color gamut triangle.

Looking at the bottom row in FIG. 14, the first step of processing is $$R' = Y' + 1.47460 \times Cr'$$

$$G' = Y' - 0.16455 \times Cb' - 0.57135 \times Cr'$$

$$B' = Y' + 1.88140 \times Cb'. \quad \text{(equation C3)}$$

But since Cr' and Cb' are fixed, they are interpolated, not sent, we can replace everything to the right of Y' with a constant $$R' = Y' + c1$$

$$G' = Y' + c2$$

$$B' = Y' + c3$$

The next step is taking the transfer function of the color components:

$$R = \text{TF}(R')$$

$$G = \text{TF}(G')$$

$$B = \text{TF}(B')$$

which then becomes $$R = \text{TF}(Y' + c1)$$

$$G = \text{TF}(Y' + c2)$$

$$B = \text{TF}(Y' + c3)$$

The last step of the processing is going from RGB to XYZ. This is done using $$X = 0.636958 \times R + 0.144617 \times G + 0.168881 \times B$$

$$Y = 0.262700 \times R + 0.677998 \times G + 0.059302 \times B$$

$$Z = 0.000000 \times R + 0.028073 \times G + 1.060985 \times B \quad \text{(equation C2)}$$

of this we are only interested in the Y component, so we use $$Y=0.262700 \times R+0.677998 \times G+0.059302 \times B.$$

Inserting the previous equations into this gives $$Y=0.262700 \times TF(Y'+c1)+0.677998 \times TF(Y'+c2)+0.059302 \times TF(Y'+c3),$$

or shortened to $$Y=f(Y')$$

We want the output value Y of this equation to match the original $Y_O$. Since the Y depends on Y' in three different places in a nonlinear way, there seems to be no easy way to invert the function so that we can get $Y'=f^{-1}(Y)$.

However, it is possible to linearize the nonlinear TF(x)~kx+m. Doing this in the three different places gives $$Y \sim k1 \times Y'+m1+k2 \times Y'+m2+k3 \times Y'+m3$$

which is equivalent to $$Y \sim (k1+k2+k3) \times Y'+(m1+m2+m3).$$

This can be inverted to $$Y' \sim Y'k=(Y_o-(m1+m2+m3))/(k1+k2+k3).$$

Thus it is likely that Y'k will produce a value Yk closer to $Y_o$ than before. The function can be linearized again at this new point Y'k, resulting in a new value Y'k+1, etc.

It should be noted that for all these iterative techniques it is not necessary to find the absolutely best 10 bit value that generates the Y value closest to the $Y_O$ value. It may be sufficient to just use a few iterations or even one iteration. The corrected Y value resulting from a single iteration will most likely be much better than not correcting at all.

Figures 15, 16:
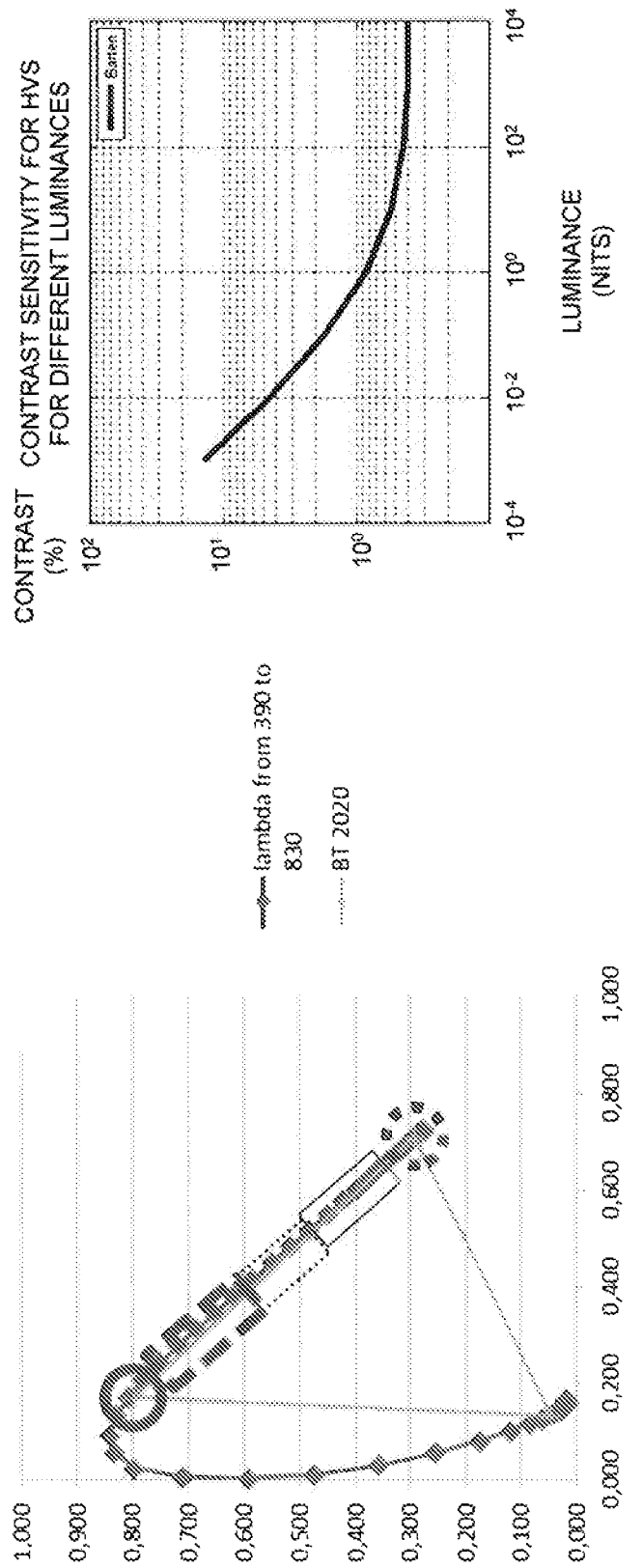
FIG. 15 is a diagram illustrating that there can be different linearizations in different color areas.
FIG. 16 illustrates Barten's curve for contrast sensitivity.

Some linearizations may also be done in advance. As noticed above, the worst problems occur on the gamut edge. Hence one could have one linearization for the line connecting the red primary to the green primary, one linearization for the line connecting the red primary to the blue primary and one linearization for the line connecting the green primary to the blue primary. Another way may be to have linearizations that will be used close to the red primary, another close to the green primary, and a third that is used close to the blue primary. Furthermore it is possible to have several linearizations along the line of the gamut, as shown in FIG. 15.

Thus, there can be different linearizations in different areas. If the color is inside the circle with a solid line, we are close to the green primary and we can use one linearization. If we are further along towards the red primary, i.e. inside the dashed box, we can use a second linearization. If we are close to the edge of the gamut and roughly half way between the red and the green primary, i.e. inside the dotted box, a third linearization can be used. If we are even closer to the red primary, i.e. inside the box with a solid line, a fourth linearization can be used. If we are inside the dotted circle, i.e. close to the red primary, a fifth linearization can be used. The same partitioning of the other two lines in the triangle can also be used. Finally the area inside the triangle but in no box or circle can be partitioned into one or more areas, each area having a different linearization.

Another way is to create a look-up table (LUT). As can be seen from the above formulation, if we have Cb', Cr' and the wanted Y-value, it is possible to find the best Y' using any of the iterative techniques mentioned above. Hence we can create a look-up table for every possible combination of Cb', Cr' and Y. Assume for instance that Cb' and Cr' is quantized to 10 bits. Assume further that we also quantize Y to 10 bits.

We then need $2^{10} \times 2^{10} \times 2^{10}$ different values in our look-up table. That is equivalent to $2^{30}$ values. If each value is two bytes, this means $2^{31}$ bytes, or 2 Gb. That is big but maybe not infeasible, especially in the future.

Care may need to be taken when quantizing Y. Since Y is completely linear, it may be inefficient to just quantize it. It may instead be better to create Ynonlinear=TF(Y) and instead create a LUT for Y using Cb', Cr' and Ynonlinear as input variables. Given Cb', Cr' and Y, we would then first calculate Ynonlinear=TF(Y) and then find Y'=LUT(Cb', Cr', Ynonlinear).

It may also be possible to use a smaller LUT. For instance, it may be possible to quantize Y (or Ynonlinear), Cb' and Cr' to, say, 6 bits. Then the table size would be $2^{(6+6+6)}=2^{18}$ values or $2^{19}$ bytes, which is equal to 512 kbytes. That is a reasonable size even with today's hardware.

It may be possible to take the quantized values Cb', Cr' and Y closest to the true values and interpolate them. As an example, if the real value of Cb' is bigger than Cb' quantized to 6 bits but smaller than Cb' quantized to 6 bits+1, the following may be good approximation:

$$Y'=(LUT(Cb'6bit,Cr'6bit,Y6bit)+(LUT(Cb'6bit+1,Cr'6bit,Y6bit))/2$$

Interpolating between more than two values is also possible.

In an embodiment, a look-up table is used for deriving the value of Y'. In one version the look-up table contains every possible value of $Y_o$, Cb' and Cr'. For 10-bit video that will result in 1024×1024×1024 entries and in some applications this size is acceptable. In another version the look-up table (LUT) is pruned, for example through rounding one or more of $Y_o$, Cb' and Cr', e.g. to 8 bits. If a pruned look-up table is used the algorithm can be extended with a refinement step that finds the best Y' starting from the Y' that was retrieved from the LUT. In a version the LUT is only used when the Cb' value and/or the Cr' value is such that Y' can become too different from $Y_o$, i.e. when the initially calculated Y' gives a linear Y value that is too different from $Y_o$, and thereby the size of the LUT can be substantially reduced since many values of Cb' and Cr' will not cause any problems.

In an embodiment, a function of $Y_o$, Cb' and Cr', e.g. a linear combination, polynomial function, exponential function, logarithmic function, trigonometric function, etc., is used for deriving Y'. The function can be defined such that for any value of $Y_o$, Cb' and Cr' the difference between Y and $Y_o$ is below a certain threshold or the difference between the derived Y' and the optimal Y' is below a certain threshold.

In an embodiment several different functions of $Y_o$, Cb' and Cr' are defined for deriving Y'. The selection of which function to use is based on the value of $Y_o$, Cb' and Cr'.

For each embodiment described herein it could be the case that the method for deriving Y' is only invoked if the difference between Y' and $Y_o$ is above a certain threshold to begin with.

ANNEX D

This Annex D investigates color artifacts due to 4:2:0 subsampling. First, an attempt to cross-check is made, but the worst value cannot be reproduced, likely due to a bug in HDRTools that has already been fixed. Next, a search is performed for the worst relative error in luminance arising from 4:2:0 subsampling. It is found that a relative error of 86% (195 Barten steps) can occur even if displayed on a screen limited to 4000 nits. Even if data is restricted to Rec709 and held in a BT.2020 container, an error of 30

Barten steps is possible. For P3 content in a BT.2020 container, an error of 40 Barten steps is possible.

1. Introduction

It has been noted that small changes in color can introduce surprisingly large artifacts when 4:2:0 subsampling is used, even if no compression is happening.

1.1 Cross-Check Discrepancies

This investigation started as a cross-check of m35255 [5], trying to replicate the results on slide 13, reprinted in Table D1 below. The results are from a test image where the left part of the image up to pixel 95 has the color (3000, 0, 100) and the right part, pixel 96 and forward, has the color (3000, 4, 100).

TABLE D1 values of m35255

| 4:2:0 10 bits | 94 | 95 | 96 | 97 | 98 | 99 |
|---|---|---|---|---|---|---|
| EXR | 3000 | 3000 | 3000 | 3000 | 3000 | 3000 |
| RGB | 0 | 0 | 4 | 4 | 4 | 4 |
| in | 100 | 100 | 100 | 100 | 100 | 100 |
| YCbCr | 258 | 258 | 404 | 404 | 404 | 404 |
|  | 650 | 650 | 640 | 640 | 570 | 570 |
|  | 882 | 882 | 870 | 870 | 787 | 787 |
| implied | 258 | 258 | 401 | 404 | 404 | 404 |
| YCbCr | 650 | 649 | 642 | 604 | 570 | 566 |
|  | 882 | 881 | 862 | 828 | 787 | 782 |
| EXR | 3006 | 2958 | 10000 | 5860 | 2998 | 2764 |
| RGB | 0 | 0 | 1.57324 | 2.58008 | 3.99609 | 4.20313 |
| out | 99.1875 | 97.125 | 402.25 | 199 | 100.125 | 92.1875 |

When cross-checking using the same procedures as for the anchors (n14548, [2]) we got the result shown in Table D2. For downsampling, the filters described in Section 2.4.7 of [2] was followed (2 and 3 taps) and for upsampling Section 2.4.8 of [2] was followed (4 tap filters).

TABLE D2 values when trying to crosscheck

| 4:4:4 10 bits | 94 | 95 | 96 | 97 | 98 | 99 |
|---|---|---|---|---|---|---|
| EXR | 3000 | 3000 | 3000 | 3000 | 3000 | 3000 |
| RGB | 0 | 0 | 4 | 4 | 4 | 4 |
| in | 100 | 100 | 100 | 100 | 100 | 100 |
| YCbCr | 258 | 258 | 404 | 404 | 404 | 404 |
| 4:2:0 | 650 |  | 580 |  | 570 |  |
|  | 882 |  | 799 |  | 787 |  |
| YCbCr | 258 | 258 | 404 | 404 | 404 | 404 |
| after | 650 | 616 | 580 | 571 | 570 | 569 |
| upsampling | 882 | 841 | 799 | 788 | 787 | 786 |
| EXR | 3006 | 1551 | 3644 | 3048 | 2998 | 2950 |
| RGB | 0 | 0.0169 | 3.5293 | 3.9531 | 3.9961 | 4.0391 |
| out | 99.1875 | 48.2188 | 122.9375 | 102.2500 | 100.125 | 98.0625 |

As can be seen, this matches really poorly and only pixel nos. 94 and 98 matches, whereas no match is found for pixel nos. 95-97 or 99. However, moving the discontinuity to pixel 97 instead gives a much better match, as shown in Table D3.

TABLE D3 values when moving the discontinuity

| 4:4:4 10 bits | 94 | 95 | 96 | 97 | 98 | 99 |
|---|---|---|---|---|---|---|
| EXR | 3000 | 3000 | 3000 | 3000 | 3000 | 3000 |
| RGB | 0 | 0 | 0 | 4 | 4 | 4 |
| in | 100 | 100 | 100 | 100 | 100 | 100 |
| YCbCr | 258 | 258 | 258 | 404 | 404 | 404 |
| 4:2:0 | 650 |  | 640 |  | 570 |  |
|  | 882 |  | 870 |  | 787 |  |
| YCbCr | 258 | 258 | 258 | 404 | 404 | 404 |
| after | 650 | 649 | 640 | 604 | 570 | 566 |
| upsampling | 882 | 881 | 870 | 828 | 787 | 782 |
| EXR | 3006 | 2958 | 2476 | 5860 | 2998 | 2764 |
| RGB | 0 | 0 | 0.00142 | 2.58008 | 3.99609 | 4.20312 |
| out | 99.1875 | 97.125 | 80.5625 | 199 | 100.125 | 92.1875 |

In Table D3, only pixel no. 96 does not match. That is also the pixel with the strangest values (10000, 1.57, 402.25), the correct answer being (3000, 0, 100) or (3000, 4, 100) depending on where you put the discontinuity.

It seems as if the mismatch in the crosscheck is due to an error that has already been corrected in HDRtools. If reverting to revision 492, we can produce the same values as in m35255 [5]. To confirm that the newer version of HDRtools (revision 573) is correct we have independently implemented the processing chain in Matlab and we get the same results as in Table B3. The reason why we had to move the discontinuity to get a match is probably due to the faulty filtering in revision 492 which has been fixed in the current version.

1.2 Rounding Issue

When implementing the Matlab crosscheck, we realized that the conversion of float to EXR in HDRtools lacks rounding. Instead of rounding the 23 bits of the mantissa to 10 bits, they are just right-shifted, basically replacing a round( ) with a floor( ). This affects the end result. As an example a float of 3007.9 will be converted to 3006.0, even though 3008.0 is a much closer value. To get a match we made the Matlab code emulate the floor( )-type conversion in the current revision of HDRtools (revision 587 of [6]).

1.3 Color Outliers

Note that even if pixel 96 is no longer an extreme outlier, pixel 97 is still quite far from correct: (5860, 2.58, 199) instead of (3000, 4, 100). That raises the question; how bad outliers can 4:2:0 subsampling generate and where does this happen? To answer this question we first have to define what we mean by "bad". We concentrated on the luminance, since the human visual system is more sensitive to changes in luminance than in chrominance. Hence we transformed both the input ExR image and the output ExR image both linear light to XYZ, and formed the difference in Y. To get a relative error we then divided by the Y component of the original. We then wrote a small program maximizing this relative error for pixel 97 over all possible images of the type where the left part is of one color and the right part is the same color plus a small delta of length 4, just as was done in m35255 [5].

Running this program gave the answer that having the color (2142, 0, 138) in the left part and (2142, 4, 138) in the right part gives the largest visible error, as shown in Table D4. The optimization software that looks for the "worst" error is not guaranteed to find the global maximum, hence even worse positions in the color gamut may exist.

TABLE D4 data for the "worst" color for 4:2:0 subsampling

| pixel 97 | RGB value | Y value | Y diff | relative error | Barten steps |
|---|---|---|---|---|---|
| original | 2142<br>4<br>138 | 573.5991 | 0 | 0 | 0 |
| RGB 4:4:4 | 2142.6617<br>3.9750<br>138.2966 | 573.7735 | 0.1745 | 0.0304% | 0.0691 |
| RGB 4:2:0 | 3993.7333<br>2.4265<br>263.6030 | 1066.4311 | 492.8320 | 85.9192% | 195.2710 |

It should be noted that having a red component higher than 2142 would generate an even higher relative error. However, we assumed that RGB values above 4000 would be clipped to 4000 by the monitor, so we believe that the actual on-screen difference would start to diminish if higher values were used.

As can be seen in Table B4, the relative error for RGB 4:4:4 is 0.0304%. To put that in perspective, we compared that with Barten's curve, see FIG. 16 illustrating Barten's curve for contrast sensitivity. A contrast below the curve is not noticeable. Table D5 shows the values used for plotting the curve in FIG. 16.

TABLE D5 values used for plotting the Barten's curve

| Luminance in cd/m$^2$ | Contrast (%) |
|---|---|
| $10^{-3}$ | 13.8294 |
| $10^{-2}$ | 4.5454 |
| $10^{-1}$ | 1.7461 |
| $10^{0}$ | 0.8507 |
| $10^{1}$ | 0.5454 |
| $10^{2}$ | 0.4360 |
| $10^{3}$ | 0.4027 |
| $10^{4}$ | 0.3962 |

As can be seen in FIG. 16, the tolerance for relative errors decreases with increased luminance. At 100 nits, an error of 0.44% can be just noticeable, whereas at 1000 nits, an error of 0.40% can be just noticeable. Since 455 nits is right between these, we use the higher value of 0.44%. This gives a Barten step of 0.069, which means it is not noticeable.

For 4:2:0 subsampling, on the other hand, the relative error is 85.92%. This is equivalent to over 195 Barten steps, which should be clearly visible. It therefore seems reasonable to conclude that 4:2:0 subsampling can create clearly visible artifacts, at least together with non-constant luminance and a highly non-linear transfer function as is the case in the anchor generation.

Note that the worst error is right on the border of the color gamut; since the green color is zero, the color (2142, 0, 138) is on the line between the red and green color primaries. This is consistent with what was reported in m35255 [5], which also pointed out colors on the gamut edge as problematic.

1.4 when Input is 709 Data

The data presented in Table D1 was for BT.2020 primaries. If the input data is with Rec709 primaries, but the container is BT.2020, it will not be possible to reach the color gamut boundary. This is due to the fact that the Rec709 gamut triangle is inside the BT.2020 triangle, not touching the gamut boundary, as can be seen in FIG. 17. It is therefore reasonable to assume that the relative error will be smaller.

We have run the optimization software to find the Rec709 color that, after conversion to BT.2020, would result in the largest relative error. The resulting two colors are (0, 0, 50) for the left part of the screen and (2, 3, 49) in the right part. This is presented in Table D6.

TABLE D6 data for the "worst" color for 4:2:0 subsampling if input is Rec709 and container format is BT.2020

| pixel 97 | RGB value | Y value | Y diff | relative error | Barten steps |
|---|---|---|---|---|---|
| original<br>Rec709 color | 2<br>3<br>49 | | | | |

TABLE D6-continued data for the "worst" color for 4:2:0 subsampling if input is Rec709 and container format is BT.2020

| pixel 97 | RGB value | Y value | Y diff | relative error | Barten steps |
|---|---|---|---|---|---|
| original BT.2020 color | 4.3650 3.4535 44.1810 | 6.1082 | | | |
| RGB 4:4:4 | 4.3793 3.4293 43.7035 | 6.0672 | 0.0410 | 0.6711% | 1.2305 |
| RGB 4:2:0 | 4.4055 2.9939 63.5135 | 7.2163 | 1.1082 | 18.1422% | 33.2640 |

Here we have used the Barten curve at 10 nits, which equals 0.54%. For RGB 4:4:4 we then get an error that is just noticeable at 1.2305 Barten steps, whereas the error in RGB 4:2:0 equals 33 Barten steps, which should be clearly visible. It is also reasonable that the error is smaller (33 Barten steps vs. 195 Barten steps) since starting out with Rec709 data precludes the color from reaching all parts of the gamut edge of BT.2020.

Notice also how the optimization result has found that the worst error is available near the blue primary. This is likely because the blue Rec709 primary is closest to the BT.2020 gamut edge, as can be seen in FIG. 17.

1.5 when Input is P3 Data

The same test can be carried out for P3 source data contained in a BT.2020 container. The worst colors are then (2.48, 3.32, 4.63) and (3.29, 0, 6.71), as shown in Table D7.

TABLE D7 data for the "worst" color for 4:2:0 subsampling if input is P3 and container format is BT.2020

| pixel 97 | RGB value | Y value | Y diff | relative error | Barten steps |
|---|---|---|---|---|---|
| original P3 color | 3.29 0 6.71 | | | | |
| original BT.2020 color | 2.7993 0.2342 6.5960 | 1.2853 | | | |
| RGB 4:4:4 | 2.8099 0.2304 6.4838 | 1.2788 | 0.0065 | 0.5062% | 0.5951 |
| RGB 4:2:0 | 1.4911 0.3834 3.2402 | 0.8438 | 0.4416 | 34.3530% | 40.38 |

We would assume that the error would be somewhere between that of Rec709 and BT.2020, and this is also the case, we now get an error equivalent of 40.38 Barten steps. Note that since the Barten value changes, it is important to include it in the loop when searching for the worst value. We have used the Barten value for 1 cd/m$^2$, which equals 0.85%.

1.6 Conclusion

This Annex D has investigated the error in luminance due to 4:2:0 subsampling. Although we have not been able to match the worst outlier from m35255 [5], the worst case errors are still significant, reaching almost 200 Barten steps for general data. Even if the source data is constrained to Rec709 and put into a BT.2020 container, the error is still significant, over 30 Barten steps, and for P3 data in a BT.2020 container, over 40 Barten steps.

ANNEX E

The present Annex E comprises a description of the Ajustc method that can be used according to the embodiments in order to derive non-linear chroma component value(s) in the second color space.

A combination of a highly non-linear transfer function, 4:2:0 subsampling and non-constant luminance ordering gives rise to severe artifacts in saturated colors. An example is described in [5], where changes between two colors of similar luminance can result in a reconstructed image with very different luminances. In this Annex E we call this way of processing the video the "anchor" way, since it was used to create the anchors in the MPEG call for evidence, described in [2].

One way to get around the problem was described is described in Annex C, a method that we will refer to as Ajusty. In the Ajusty method, the Y'-value in every pixel is adjusted so that the resulting linear luminance Y is closer to its correct value. It is therefore possible to compensate for the fact that some of the luminance is also carried in the chroma components Cb' and Cr'.

In this Annex E we will use the following terminology:

RGB: Linear RGB values, where each value is proportional to the cd/m$^2$ ("number of photons").

XYZ: Linear XYZ values, where each value is a linear combination of RGB. Y is called "luminance" and loosely speaking reflects well what the eye perceives as "brightness.

pq(Y): A non-linear representation where the non-linear function pq(Y) has been applied to the linear luminance Y. pq(Y) is not to be confused with Y'. Since pq(.) resembles Barten's curve, pq(Y) a small step in pq(Y) is equivalent to a small step in perceived luminance.

R'G'B': Non-linear RGB values. R'=pq(R), G'=pq(G), B'=pq(B), pq(.) being a non-linear function. An example of a non-linear function is the PQ transfer function.

Y'Cb'Cr': A non-linear representation where each value is a linear combination of R', G' and B'. Y' is called "luma", and Cb' and Cr' are collectively called "chroma". This is to distinguish Y' from luminance, since Y' also contains some chrominance, and Cb' and Cr' also contains some luminance.

xy: A non-linear representation of chrominance, since it has been normalized for "brightness" through x=X/(X+Y+Z), y=Y/(X+Y+Z). A monochromatic laser will always have the same coordinates in xy no matter what intensity it has. This means that xy is a good measure of chrominance.

u'v': A non-linear representation of chrominance, that is a non-linear function of xy. It is supposed to be more perceptually uniform, meaning that a small step in u'v' will be equally perceptible regardless of which chrominance we are at.

pq(Y)xy: A representation of color where pq(Y) contains all the luminance and xy all the chrominance. From pq(Y) it is possible to extract Y, and from Y, x, and y it is possible to extract XYZ which can be transformed to RGB.

The problem with using the anchor processing chain is that apart from getting inaccurate luminance, we may also get inaccurate chrominance. This is due to the fact that the chroma samples Cb' and Cr' are subsampled in the Y'Cb'Cr' space. There is a problem with this, namely that the non-linearity of the Y'Cb'Cr' space will favor dark colors. This is not a desired outcome. This means that the chroma samples Cb' and Cr' will be inaccurate to start with.

Since the first part of subsampling is filtering, and since filtering is a kind of averaging, it is sufficient to see what happens when we average two colors. It is easier to see what happens when we average in the R'G'B' domain than in the Y'Cb'Cr', so first we will prove that averaging in these two domains amounts to the same thing. To do this, first note that Y'Cb'Cr' is just a linear combination of R'G'B':

$Y'=0.212600 \times R'+0.715200 \times G'+0.072200 \times B'$ $Cb'=-0.114572 \times R'-0.385428 \times G'+0.500000 \times B'$ $Cr'=0.500000 \times R'-0.454153 \times G'-0.045847 \times B'$ (equation E1)

Thus if the vector q holds the color in R'G'B'; q=(q1, q2, q3)=(R', G', B') and the vector p holds the same color in (Y', Cb', Cr'), p=(p1, p2, p3)=(Y', Cb', Cr'), we have $p=M\ q$, where M is the matrix above. Likewise $q=M^{-1}\ p$. Assume we have two vectors in Y'Cb'Cr, $p_1$ and $p_2$ that we want to average. We will now show that first going to R'G'B', then performing the averaging, and then going back is the same as just averaging $p_1$ and $p_2$ directly. We go to R'G'B' by using $q_1=M^{-1}\ p_1$, and $q_2=M^{-1}\ p_2$.

The average in the R'G'B' space is $q_a=\frac{1}{2}(q_1+q_2)$, but this is equal to $q_a=\frac{1}{2}(q_1+q_2)=\frac{1}{2}(M^{-1}\ p_1+M^{-1}\ p_2)=M^{-1}\ \frac{1}{2}(p_1+p_2)$.

Going back to Y'Cb'Cr' is done by multiplying with M, $p_a=M\ q_a=M\ M^{-1}\ \frac{1}{2}(p_1+p_2)=\frac{1}{2}(p_1+p_2)$, but this is the same thing as you would get if you averaged in Y'Cb'Cr' directly. We now only have to show that subsampling in R'G'B' favors dark colors.

Consider the two RGB colors (1000, 200, 0) and (10, 200, 0). The first color is very red, and the second color is very green. However, the first color is so much brighter than the second. If seen at a distance so that they blur into one, the net effect would be a reddish pixel since ½[(1000, 200, 0)+(10, 200, 0)]=(505, 200, 0), which is more red than it is green. However, in R'G'B', the two colors get the values (0.7518, 0.5791, 0) and (0.2997, 0.5791, 0). Their average will be ½[(0.7518, 0.5791, 0)+(0.2997, 0.5791, 0)]= (0.5258, 0.5791, 0), which when converted back to RGB is (119, 200, 0). Thus, the resulting color when averaged in the R'G'B' domain is almost twice as green as red. Thus, the dark color (10, 200, 0), which is green, has had an unduly big influence on the average.

To see how this can look in practice, consider a small image that is just 2×2 pixels, containing the following linear RGB colors:

| (3.41, 0.49, 0.12) | (0.05, 0.08, 0.02) |
| (0.05, 0.08, 0.02) | (0.05, 0.08, 0.02) |

Since this is an HDR image, it is hard to show it in a low-dynamic range medium such as this document. However it is possible to do several LDR-exposures by applying the function $LDR\_red=clamp(0,255*(HDR\_red*2^c)^{gam},255)$, where c goes from −3 to 1, gam=0.45 and clamp(a, t, b) makes sure the value t is between [a,b]. This can be called LDR-"exposures" of the HDR image.

The HDR pixel is quite dark—the highest coefficient is 3.41 out of 4000, so the darkest exposure is the most relevant here. The top left pixel is reddish and the surrounding pixels look black. Only in the brighter exposures is it possible to see that the dark pixels are actually a bit greenish.

However, when following the anchor processing chain to convert from RGB to Y'Cb'Cr'420 and back again, the resulting HDR image will be

| (1.14, 0.79, 0.38) | (0.12, 0.06, 0.01) |
| (0.12, 0.06, 0.01) | (0.12, 0.06, 0.01) |

The problem here is that the redness of the top left pixel has disappeared and has been replaced with a gray/white pixel. The reason is that averaging in the non-linear Y'Cb'Cr' domain favors dark colors, which will make the resulting pixel unduly green. Furthermore, since there are three green pixels and just one red pixel, the result will be yet greener. The result is not very similar to the original.

In contrast, the result of the solution proposed in this Annex E can be seen below. The colors are closer to the original, especially in the relevant first exposure and in the important top left pixel, which is now more reddish. Note that in general it is not possible to get a perfect color in all four pixels since the chrominance is subsampled, hence even the proposed Ajustc method will not generate a perfect color. Nevertheless, the color fidelity is greatly improved.

| (2.26, 0.90, 0.49) | (0.20, 0.02, 0.00) |
| (0.20, 0.02, 0.00) | (0.20, 0.02, 0.00) |

After having corrected the luma value Y', it is more or less possible to obtain the desired luminance Y. However, since some of the chrominance information is carried in the luma, changing Y' will also affect the chrominance of the pixel. This means that while the luminance value of the pixel improves with the correction of Y', its chrominance might deteriorate compared to the anchor processing chain, which was quite poor to start with. The end result may be a very poor chrominance.

The embodiments relate to video coding and processing of at least one pixel of a picture of a video sequence. The processing is a pre-process to encoding or part of the encoding step.

The embodiments propose a novel way of arriving at the subsampled chroma samples Cb' and Cr' when processing a pixel of the video sequence.

The anchor chain according to prior art uses the following process:

RGB 4:4:4-->R'G'B' 4:4:4-->Y'Cb'Cr' 4:4:4-subsampling-of-Cb'-and-Cr'-->Y'Cb'Cr' 4:2:0, where the subsampling from 4:4:4, i.e. full resolution for all color components, to 4:2:0, i.e. chroma components subsampled in both vertical and horizontal directions, is done in the last step of the chain.

According to embodiments the following process is proposed:

RGB 4:4:4-subsampling-of-RGB-->RGB 2:2:2→R'G'B' 2:2:2-->Y'Cb'Cr' 2:2:2 where the subsampling instead is the first part of the chain and is performed in the linear domain. Here we have used the term 2:2:2 to indicate that all three samples are at half resolution in both the x- and y-dimension. In this way, we do not get a full-resolution Y' component, since the Y' component in the last step is 2:2:2, i.e., half resolution in both directions. This problem is overcome by the following processing steps:

RGB 4:4:4-->XYZ 4:4:4-->Y 4:4:4--------------------+----->Y'=Ajusty(Y4:4:4, Cb'Cr'4:4:4)

Y'Cb'Cr' 2:2:2→Cb'Cr' 2:2:2-upsample-->Cb'Cr' 4:4:4-----/ where Y 4:4:4 is the luminance component of XYZ 4:4:4 and Cb'Cr' 4:4:4 are the chroma components of Y'Cb'Cr'. In short, the target luminance Y 4:4:4 is found by first converting RGB 4:4:4 to XYZ 4:4:4 and then using Y 4:4:4. We then get Cb'Cr' 4:4:4 by upsampling Y'Cb'Cr' 2:2:2 to 4:4:4 and using Cb'Cr' 4:4:4. Finally, the Ajusty method is used on Y 4:4:4 and Cb'Cr' 4:4:4 to find the best Y' 4:4:4.

In an alternate embodiment it is possible to do the following to obtain Y':

RGB 4:4:4-->R'G'B' 4:4:4-->Y'Cb'Cr' 4:4:4-->Y' 4:4:4.

However, this may produce the wrong Y-luminance in the general case.

Once having arrived at a Y'Cb'Cr'420-representation, as shown in FIG. 18, the Y' component is found in (G) and the Cb'Cr' components are found in (D), it is possible to further improve it. The reason is that the each Cb' value, not being full resolution, will be used for several Y' values. However, due to the non-linear nature of the Y'Cb'Cr' space, changing the Y' component will affect not only the luminance of the pixel, but also the chrominance. Only one Y'-value will give the correct chrominance, namely the Y' from Y'Cb'Cr' 2:2:2 that we threw away, and if we deviate from this the chrominance will shift slightly. Some pixels will be larger than the Y' 2:2:2 value, and in those pixels the chrominance will be shifted in one way. Some other pixels will be smaller than the Y' 2:2:2 value, and their chrominances will be shifted the opposite way. Due to the nonlinearities involved, these shifts may not cancel out. Therefore it may be advantageous to correct Cb' in a way opposite to the way the aggregate chrominance has shifted. Thus the second part is to perform such a correction.

By subsampling in a linear space before converting to Y'Cb'Cr, we can get chroma samples that better reflect the true chrominance in a scene, compared to the anchor process. However, subsampling early in the chain means that we need to come up with a Y'-component some other way. This is solved by using the Ajusty method to use Y' to match a given luminance Y given Cb' and Cr'.

In another aspect, the Cb' and Cr' samples are further refined to counteract the shifting that happens when the low-resolution Y' component is replaced by a high resolution Y' component. This further improves the color fidelity.

In yet another aspect, the Y' samples after the Ajusty method are modified towards the Y' values before the Ajusty method if that reduces the error in another metric than the luminance without causing any visual degradation of the luminance.

Figure 19:
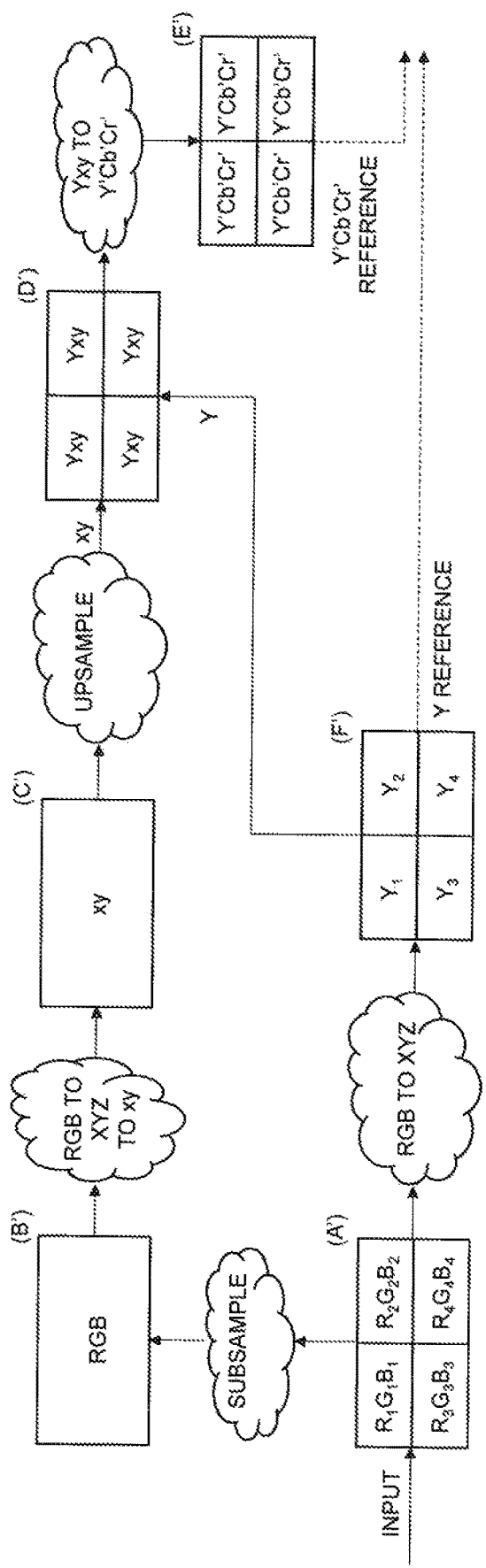
FIG. 19 illustrates an embodiment of creating references with chroma upsampling in a representation invariant to intensity.
Figure 20:
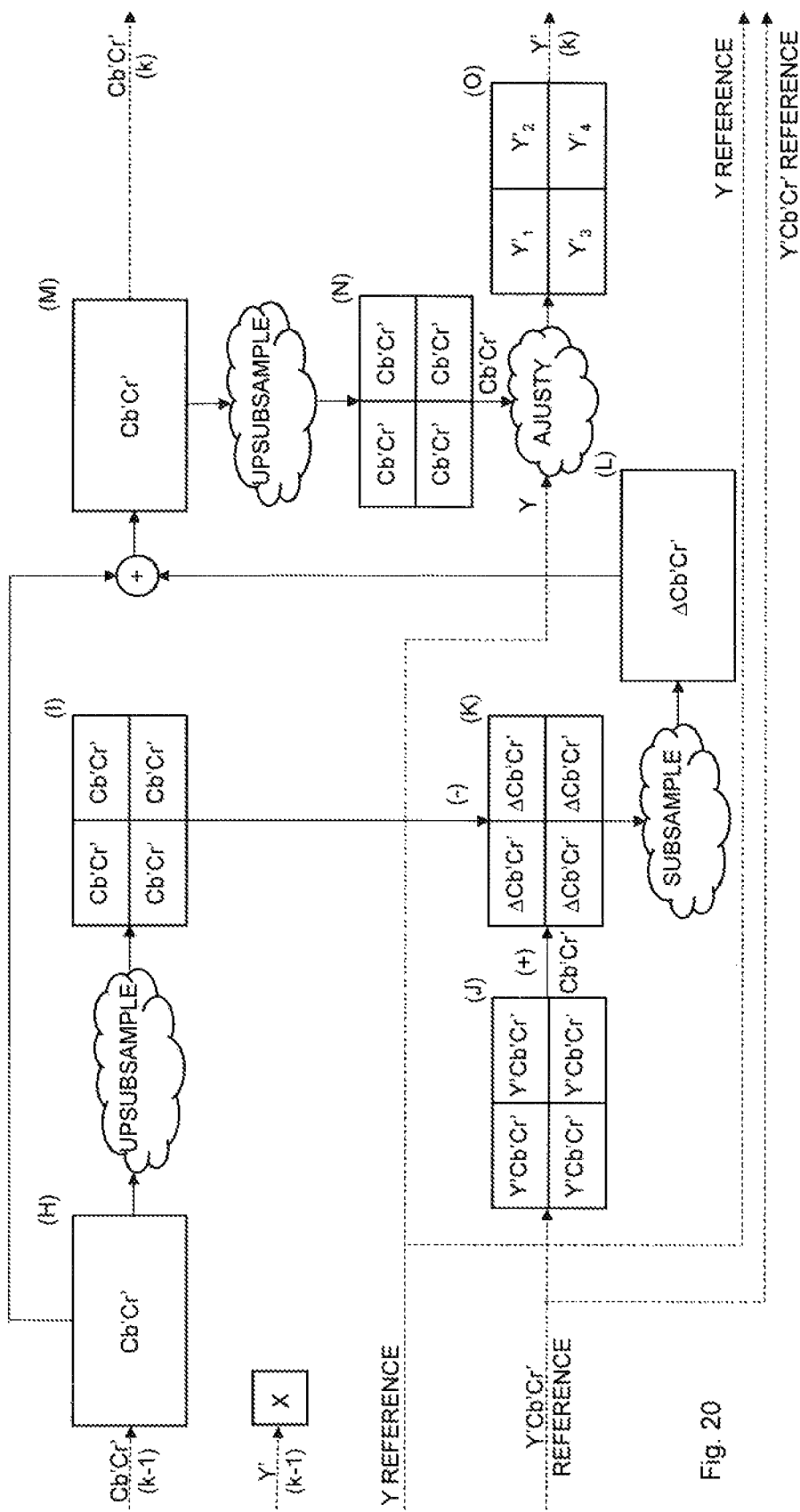
FIG. 20 illustrates an embodiment of iterative refinement of Cb' and Cr'.

The proposed method is described in FIGS. 18-20. The input is a high resolution image in linear RGB. In these diagrams we have an image of 2×2 pixels for illustration purposes, but a real image is of course much bigger.

The embodiments described below can be used in combination or separately.

First Embodiment—Find Good Values for Y' and Cb'Cr'

The first step is to subsample the RGB image (A) to obtain (B), subsampling in both the x- and y-dimension.

Next we create the first version of the Cb'Cr' coefficients by first applying the non-linear transfer function TF(.) to obtain R'G'B' (C) and then converting this to Y'Cb'Cr', keeping Cb'Cr' (D). Now we have Cb'Cr' in the correct, low, resolution.

To also get Y' in the correct, high, resolution, we need the reference linear luminance Y for each pixel. We get that by converting the full resolution RGB input (A) to XYZ and keeping Y (E).

We also upsample Cb'Cr' (F). We can now use AJUSTY on Y (E) and Cb'Cr' (F) to get Y' (G).

The output is now Cb'Cr (D) and Y' (G).

Second Embodiment—Improve Values for Y' and Cb'Cr'

In this embodiment the Cb'Cr' from the first embodiment are updated by the difference between the Cb'Cr' derived from upsampling in a representation invariant to intensity and the upsampled Cb'Cr' from the first embodiment. The updated Cb'Cr' is then used together with the linear luminance Y to derive new Y' values using ADJUSTY. All steps are shown below and are also indicated in FIGS. 18-20.

First Step:

1. To improve the values we first need to create some references. We start with the linear RGB input (A'), which is the same as (A). The first reference is simply the full resolution linear luminance Y, which is obtained by converting RGB (A') to XYZ and throwing away XZ and keeping Y (F'). This is the same as (E).
2. We then subsample the RGB (A') to (B'), which is the same as (B).
3. The next step is to convert from RGB (B') to XYZ and then to xyz, throwing away z and keeping xy (C').
4. The xy-values are then upsampled, and combined with Y (F') to form Yxy (D').
5. Each Yxy value (D') is then converted back to XYZ, then to RGB, then to R'G'B' and lastly to Y'Cb'Cr' (E'). This is the second reference.

Second Step: Iterating.

1. We take the Cb'Cr' data (H). If we are in the first iteration, this is the same as (D). If we are in iteration k, this is the same as (M) for iteration k−1. We upsample (H) to get (I).
2. We get the Y'Cb'Cr' reference (J), which is the same as (E'), and throw away the Y'keeping the Cb' and Cr' for each pixel. Then the Cb' and Cr' from (I) is subtracted, obtaining (K), which is a difference □Cb' □Cr' in each pixel.
3. The difference signal in (K) is then subsampled (L), and then added to the Cb'Cr' signal in (H), resulting in an updated version of Cb'Cr' (M).
4. We now only need the Y' in the correct resolution. We do this by upsampling Cb'Cr' (M) to the higher resolution (N). The upsampled Cb'Cr' (N) together with the Y reference (F') is used by AJUSTY to produce Y' (O). The output is now Cb'Cr' (M) and Y' (O).

It should be noted that when we say "convert RGB to XYZ and keep Y", it is often not necessary to convert all three components and then keeping only one. Typically in these cases it is possible to calculate only one the component that we want to keep. We have used this way of writing to emphasize that we mean Y from XYZ and not Y' from Y'Cb'Cr'.

In an alternative embodiment the "find good values for Y' and Cb' Cr'" is replaced by the anchor processing chain; RGB 4:4:4→R'G'B' 4:4:4→Y'Cb'Cr' 4:4:4→subsampling Y'Cb'Cr' 4:2:0. Then a new reference Y must be created each iteration by taking Y'Cb'Cr' 4:2:0-upsample-Cb'-and-Cr'→Y'Cb'Cr' 4:4:4→R'G'B' 4:4:4→RGB 4:4:4→XYZ 4:4:4→Y 4:4:4. This Y is then used in (D') instead of (F'). This will not create as good a luminance, but can be good under certain circumstances when you want to keep the anchor processing chain intact in the start, for instance for complexity reasons.

It should be clear that any target image can be used. In the above we use a target image that has a chrominance that is first subsampled in RGB and then converted to xy, together with a luminance Y that comes from the non-subsampled RGB converted to XYZ. However, it would be equally simple to use another target image. As an example, one may want to first convert the image from RGB to XYZ and then to xy, and then subsample this to get the subsampled xy. This could be combined with the same luminance Y. This particular embodiment would be good if you wanted to preserve the chrominance regardless of brightness. Also other target images could be used.

Adaptive Subsampling

In another embodiment the subsampling in above embodiment consists of an adaptive filter which is optimized to reduce the error in a representation space in accordance with human vision.

Cb' Cr' Iterative Refinement

In another embodiment one of or both of Cb' and Cr' are modified to get a better representation in the original representation space (or a representation space in accordance with human vision). The modification can be performed by iterative testing to modify a Cb' or Cr' value+1 or −1 and then upsample the modified value and unmodified values of Cb' and Cr', conversion to R'G'B', application of non-linear transfer function and converting to a representation space in accordance with human vision. If the modified Cb'/Cr' gives less absolute or squared error for a spatial region in a chroma specific color component representation space (not luminance) similar to Z for Cb' and X for Cr', the modification is selected. The spatial region is related to the size of the upsampling filter(s). If bi-linear filters are used for the upsampling of 4:2:0 Cb' or Cr' refinements to 4:4:4 the size of the region is 3 horizontally and 4 vertically. If 4-taps filters are used for the upsampling the size of the region is 7 horizontally and 8 vertically. The error can also be weighted according to how a modified value can influence each of the 3×4 or 7×8 neighboring samples in 4:4:4 or just simply include the central part (3×2) of the region.

Cb' Cr' Initialization

In another embodiment the magnitude of a Cb' or Cr' refinement is initialized to the magnitude of the average value of ajusty in the central 3×2 region around the sample to be modified. The sign of the Cb' or Cr' refinement is derived by taking the sign from the average of the error before the refinement in a chroma specific color component representation space (not luminance) similar to Z for Cb' and X for Cr'. Thus initial value of the Cb' refinement is Cb'+sign(error)×abs(average(Y' before adjust−Y' after adjust)/N). Where N is about 2. If the modified Cb' gives less absolute or squared error for a spatial region in a chroma specific color component representation space (not luminance) similar to Z for Cb', the modification is selected. Similar applies if the method is applied for Cr'. In another embodiment the magnitude of a Cb' or Cr' refinement is initialized to the average value of Cb' or Cr' in 4:4:4 in the central 3×2 region around the sample to be modified. Thus init value of the Cb' refinement is average(Cb' in 4:4:4). If the modified Cb' gives less absolute or squared error for a spatial region in a chroma specific color component representation space (not luminance) similar to Z for Cb', the modification is selected. Similar applies if the method is applied for Cr'.

Y' Refinement

In another embodiment the adjustment of Y' to Ymod' by the Ajusty method is modified by one step towards Y' if that reduces the error in a chroma specific color component representation space similar to Z in XYZ (a metric other than luminance) while not causing any visual degradation in luminance Y. This can besides improving performance in a chroma specific color representation space also in some cases make it easier to encode Y'.

Certain embodiments in this Annex E describe the conversion from RGB 4:4:4 to Y'Cb'Cr' 4:2:0 where the chroma components are subsampled in both vertical and horizontal direction. The methods of the embodiments would of course work equally well when converting from RGB 4:4:4 to another subsampled Y'Cb'Cr format, e.g. Y'Cb'Cr' 4:2:2 where the chroma components have been subsampled in the horizontal direction only. Moreover, it would also be possible to subsample only one of the chroma components.

ANNEX F

The present Annex F comprises a description of the Fajusty method that can be used according to the embodiments in order to derive non-linear luma component value in the second color space.

A combination of a highly non-linear transfer function, 4:2:0 subsampling and non-constant luminance ordering gives rise to severe artifacts in saturated colors in pictures of a video sequence. A non-linear transfer function converts linear samples to non-linear samples with the purpose to mimic human vision.

A simple example of a non-linear transfer function is $x^{(1/gamma)}$, where gamma is 2.2. An example of another transfer function is the one used in SMPTE specification ST 2084 [1]. Before display the inverse of the non-linear transfer function is typically used, but it is also possible to use a function that is not the inverse of the non-linear transfer function. In the gamma example $x^{gamma}$ can be used to go back to linear samples.

One example is the way to carry out conversion from RGB 4:4:4 to Y'CbCr 4:2:0 that is described in [5], which we will refer to as the "anchor" way of processing in this document. RGB 4:4:4 is the color format typically used by cameras to capture video and by displays to present the video. To compress the video with less perceptual artifacts, RGB 4:4:4 is typically converted to Y'CbCr 4:2:0 before compression. In this case, RGB 4:4:4 is transferred by a non-linear transfer function to R'G'B' 4:4:4 which then is converted to Y'CbCr 4:4:4 by a linear color transform. Finally, the chroma samples Cb and Cr are subsampled, by a factor two in both vertical and horizontal directions, to quarter resolution resulting in Y'CbCr 4:2:0. As described in Annex D, the anchor way of processing gives rise to situations where changes between two colors of similar luminance can result in a reconstructed picture or image with very different luminances.

One way to get around the problem is described in Annex C, a method that is referred to as the Ajusty method herein. In the Ajusty method, the Y'-value in, preferably, every pixel is adjusted so that the resulting linear luminance value Y is closer to the correct value $Y_o$. It is therefore possible to compensate for the fact that some of the luminance information is also carried in the chroma components Cb' and Cr'.

The Ajusty method may increase computational complexity. As an example, assume that the conversion from RGB 4:4:4 to Y'CbCr 4:2:0 takes x seconds using the anchor processing chain. Then compression using the High-Efficiency Video Coding (HEVC) reference encoder HM typically takes 10× seconds, resulting in a total processing time of 11× for the anchor processing chain. Using the Ajusty method with binary search as described in Annex C takes 5× seconds. Since the time to compress using HM stays roughly the same, this means that the total time becomes 15× seconds. In other words, the total encoding complexity rises a factor of 15/11=1.36, i.e. an increase of 36%.

Annex C states several methods to improve this. As an example, it is proposed to use a look-up table (LUT) to calculate the correct Y' in a single lookup Y'=LUT(TF($Y_o$), Cb, Cr). However, as stated in Annex C, the size of such a lookup will be 2 GB. This may be feasible in some situations, but in other situations such a lookup table will simply be too big.

To reduce the computational complexity, embodiments are provided that determine for which pixels the anchor processing chain can be used and for which pixels the Ajusty processing chain can be used. A plurality of different embodiments are provided below. To further improve the disclosure, descriptions on how to lower the size of the LUT tables needed for quick calculation of the Ajusty method are also provided.

An advantage is that at least some of the embodiments provide a faster conversion from RGB 4:4:4 to Y'CbCr 4:2:0 than previous art. A further advantage is that at least some of the embodiments provide a conversion from RGB 4:4:4 to Y'CbCr 4:2:0 that uses less memory than previous art. A yet further advantage is that at least some of the embodiments provide a conversion from RGB 4:4:4 to Y'CbCr 4:2:0 that is of a higher quality than previous art.

Particular Embodiments

In certain embodiments, it is proposed to take advantage of the fact that in most pixels the correction needed in Y' is not so big. As an example, if the Y' produced by the anchor processing chain, i.e. default processing chain, from hereon called Y'anchor, is 453, where 0 or 64 is the smallest possible value and 940 or 1023 is the largest possible value, and the Y' produced by the Ajusty processing chain, i.e. the auxiliary processing chain, from hereon called Y'ajusty, is 454, it may not be possible to see the difference in an actual image. In fact, the number of pixels where the Y'anchor and Y'ajusty differ by more than two steps is very small, typically less than 5%. Therefore, the proposed solution is to detect these pixels and apply the Ajusty processing chain only on them. In case only 5% of the pixels need correction, the conversion time may be reduced to (0.05*5×+0.95*×)=1.2×. The total complexity thus rises from 11× to 11.2×, a factor of 11.2/11=1.0182, i.e., an increase of 1.8%. That is much better than an increase of 36%.

In a first embodiment, a pixel with colors (R, G, B) is selected for the Ajusty processing chain if a function h(R, G, B) exceeds a threshold. An example of such a function is h(R, G, B)=max(R, G, B)/(min(R, G, B)+s), where min(a, b,c) calculates the minimum of the three inputs a, b, c and max(a, b, c) calculates the maximum of the three inputs a, b, c, and s is a constant, such as 0.1.

In a second embodiment we use another function h(.) according to h(R, G, B)=max(w1*R, w2*G, w3*B)/(min (w1*R, w3*G, w3*B)+s).

In third embodiment, a pixel with the Y'CbCr components (Y', Cb, Cr) is selected for the Ajusty processing chain if a function g(Y', Cb, Cr) exceeds a threshold. An example of such a function is g(Y', Cb, Cr)=h(RGBptoRGB(YpCbCr-ToRGBp(Y', Cb, Cr)), where h(.) is the function above, RGBptoRGB(.) converts a color from R'G'B' to RGB using a transfer function TF(.), i.e. R'=TF(R), G'=TF(G), and B'=TF(B), and where YCbCrToRGBp(.) converts a color from Y'CbCr to R'G'B', for instance using:

$$R'=Y'+1.47460\times Cr$$

$$G'=Y'-0.16455\times Cb-0.57135\times Cr$$

$$B'=Y'+1.88140\times Cb. \quad \text{(equation F1)}$$

A transfer function, such as PQ used in Annex C (see equation C1) can be used.

In a 4th embodiment, a LUT, such as a 1-bit LUT, is employed and calculations according to the first and the second embodiments are stored in the LUT in order to fast determine if the Ajusty processing chain should be invoked or not, e.g. if the value of the LUT for a specific combination of R, G, B is equal to 1, the Ajusty processing chain should be used on the pixel to get Y'.

if 1 bitLUT(R'10bit, G'10bit, B'10bit)==1
   use Ajusty processing chain on pixel to get Y'
else
   use Y' from anchor processing chain
end where R'10bit is a 10bit quantization of R'; R'10bit=round(1023×R'), and ditto for G'10bit and B'10bit. The 1-bit lookup-table can be created by trying all possible combinations of R'10bit, G'10bit, B'10bit, and see which ones would likely result in a big difference between Y'anchor and Y'ajusty. For example, the table can calculate RGB from R'G'B' using $$R=TF^{-1}(R'10bit/1023),$$

$$G=TF^{-1}(G'10bit/1023),$$

$$B=TF^{-1}(B'10bit/1023),$$

where $TF^{-1}$ is the inverse to the transfer function TF(.). PQ described in Annex C (equation C1) is an example of a transfer function. After that, the function h(R, G, B) described above can be used. If h(R, G, B) is larger than a threshold, the bit is set to 1 for that table entry. If it is smaller than the threshold, the bit is set to 0 for that table entry.

Since R'10bit, G'10bit and B'10bit are all 10 bits, we need $2^{10+10+10}=2^{30}$ entries. However, since each entry is 1 bit we only need $2^{30}/8=2^{30-3}=2^{27}$ bytes, which equals 128 MB. Since R', G' and B' are readily available in the processing chain, they constitute the first thing that is calculated in the anchor processing chain, it may be quicker and hence more desirable to use such a 1-bit-LUT than to calculate h (.).

In a 5th embodiment, the values R'10bit, G'10bit, B'10bit may be quantized to, say 8-bits instead. This shrinks the size of the LUT by a factor of 2×2×2=8, meaning the LUT only takes about 16 MB.

In a 6th embodiment, the LUT uses R, G, B instead of R' G' B'.

In a 7th embodiment, the LUT uses Y', Cb, Cr instead of R' G' B'.

In an 8th embodiment, a 2-dimensional 1-bit look-up table is employed according to the following:
RGBmax=max(R'10bit, G'10bit, B'10bit)
RGBmin=min(R'10bit, G'10bit, B'10bit)
if (1 bit2DLUT(RGBmax, RGBmin)==1)
   use Ajusty processing chain on pixel to get Y'
else
   use Y' from anchor processing chain
end The two-dimensional 1-bit lookup table can be created by trying all possible combinations of R'10bit, G'10bit and B'10bit and see which ones would likely result in a big difference between Y'anchor and Y'ajusty. Assume we have such a function called likelyBigDifference(R'10bit, G'10bit, B'10bit) that returns 1 if the color (R'10bit, G'10bit B'10bit) is likely to result in a big difference between Y'anchor and Y'ajusty and 0 otherwise. The two-dimensional 1-bit lookup table can then be created using

```
1 bit2DLUT(x,y)=0 for all entries x,y
  for all R'10bit
    for all G'10bit
      for all B'10bit
        RGBmax=max(R'10bit, G'10bit, B'10bit)
        RGBmin=min(R'10bit, G'10bit, B'10bit)
        if (likelyBigDifference(RGBmax, RGBmin))
1.        1bit2DLUT(RGBmax, RGBmin)=1
        end
      end
    end
  end
```

This 2D-lut needs only $2^{10+10}$ one-bit entries, which means $2^{10+10}/8$ bytes, which equals $2^{10+10-3}=2^{17}$ bytes=128 KB.

An example of likelyBigDifference(RGBmax,RGBmin) is RGBmax/(RGBmin+s)>t, where s is a constant, such as 0.1, and t is a threshold.

In a 9th embodiment, a first round of processing may select some pixels as being marked for the Ajusty processing chain, with any of the methods presented herein. In a second round of processing, one may select pixels that are neighbors to pixels that were marked in the first round. The Ajusty processing chain will then be carried out for pixels selected in either the first or the second round.

In a 10th embodiment, a more exact value for Y' is obtained than is possible with the binary search version of the Ajusty processing chain described in Annex C. A binary search works by reducing the size of an interval, typically by cutting it in half. As a start, the interval is set to cover all possible values of Y', for instance [64, 940], or [0, 1023]. Next, a candidate Y' value is selected as the middle point of this interval, for instance Y'candidate=floor((0+1023)/2)=511. When we try this candidate value, we will get a Y value. If the Y-value obtained is larger than the target value $Y_o$, then Y'candidate was too big, and we can deduce that all values larger than 511 are ruled out. Hence the interval is reduced to [0, 511]. A new candidate value floor((0+511)/2)=255 is selected, and perhaps this time the Y produced is smaller than the target value $Y_o$. We can then deduce that the correct Y' must lie in the interval [255, 511]. And so the method proceeds until, after 10 steps, we have an interval that is only one step wide. Assume for instance that the optimal Y' with fractional precision is 347.03. Then the interval after 10 iterations will be [347, 348]. However, we still don't know if 347 is better than 348. Therefore in one embodiment of the proposed solution, both the numbers 347 and 348 are tried. Assume that setting Y' to 347 produces $Y_{347}$, and that setting Y' to 348 produces $Y_{348}$. We can then see which one is best by calculating the errors $e1=(Y_o-Y_{347})^2$ and $e2=(Y_o-Y_{348})^2$. If e1<e2, we use Y'=347, otherwise we use Y'=348. This way we can further reduce the error in Y compared to just using, say, the lowest value in the interval [a,b]. Note that this method is actually better than knowing the optimal Y' with fraction precision and rounding it to the closest integer. Due to the non-linearity of the equations used to produce a Y from Y', Cb and Cr, it may not be optimal to just round. As an example, even if the optimal Y' with fractional precision is 347.6, it may be advantageous to select 347 even though 348 is the closest integer. Using the above approach of calculating e1 and e2 will in this case select 347, which is correct.

In summary, assume Cb10bit is the Cb-value quantized to 10 bits, Cr10bit is ditto for Cr, and that $Y_o$ is the correct luminance value that we want to achieve. Then the above method can be carried out with the following pseudo code:

```
  a=0
  b=1023
  [a, b]=performBinarySearch(a, b, Y_o, Cb10bit, Cr10bit, 10)
  Ya=calcY(a, Cb10bit, Cr10bit)
  Yb=calcY(b, Cb10bit, Cr10bit)
  e1=(Ya-Y_o)^2
  e2=(Yb-Y_o)^2
  if (e1<e2)
    use Y'=a
  else
    use Y'=b
  end
``` where performBinarySearch(a, b, $Y_o$, Cb10bi, Cr10bit, N) performs binary search in the way described above in N steps, and outputs the final interval to [a,b]. After N=10 times b will be equal to a+1. calcY(Y', Cb, Cr) calculates the linear luminance Y from the values Y', Cb and Cr as described in the Ajusty processing chain in Annex C and reiterated here for the convenience of the reader:

$$R'=Y'+1.47460 \times Cr$$

$$G'=Y'-0.16455 \times Cb-0.57135 \times Cr$$

$$B'=Y'+1.88140 \times Cb. \quad\quad \text{(equation F1)}$$

$$R=TF(R')$$

$$G=TF(G')$$

$$B=TF(B')$$

$$Y=0.262700 \times R+0.677998 \times G+0.059302 \times B$$

In an 11th embodiment, the Ajusty processing chain is only calculated if the R, G, and B color components all fall within a certain criteria defined by a set of functions. These functions could be derived and illustrated by plotting the samples for which Y' would need to be calculated using the Ajusty processing chain in a cube where R, G and B are the axes of the 3D plot. The functions would then be planes, of the form aR+bG+cB>d, or non-linear surfaces through the cube dividing the samples that would not need to be calculated with Ajusty processing chain from the rest of the samples. In other versions of this embodiment other color representations are used, e.g. R'G'B' or Y'CbCr.

In a 12th embodiment, we take advantage of the fact that the ideal Y' for a color with chrominance Cb Cr and desired linear luminance $Y_O$ may not be so different from the ideal Y' of a color with a neighboring chrominance Cb+d1, Cr+d2 and neighboring desired luminance $Y_o$+d3. As an example, we may conclude that in a neighborhood (d1, d2, d3) to such a color, all ideal Y' lie in a small interval [a0, b0]. We can then do binary search in this small interval [a0, b0] instead of doing binary search in the much larger interval [0, 1023]. In this way we can reduce the number of binary search iterations.

In a 13th embodiment, we take advantage of this fact by creating two look-up tables for a0 and b0. The first LUT, called startLUT, is used to find the start of the interval to search, and the second LUT, called stopLUT, is used to find the stop of the interval to search. As an example, it is possible to quantize Cb, Cr and Ynonlinear to six bits. The startLUT can then be created by iterating over all triplets (Cb, Cr and $Y_O$) that quantize to the same LUT position, and store the minimum interval starting point in that position:

```
  startLUT(a, b, c)=1023 for all values a, b, c
  stopLUT(a, b, c)=0 for all values a, b, c
  for all Cb10bit from 0 to 1023
``` for all Cr10bit from 0 to 1023
for all Ynonlinear from 0 to 1023
$Y_o$=TF-1 (Ynonlinear/1023)
Cb=calcCbfromCb10bit(Cb10bit)
Cr=calcCrfromCr10bit(Cr10 bit)
Y'=calcY($Y_o$, Cb, Cr)
Y_6bits=Ynonlinear>>4
Cb_6bits=Cb10bits>>4
Cr_6bits=Cr10bits>>4
if (Y'<startLUT(Y_6bits, Cb_6bits, Cr_6bits)
1. startLUT(Y_6bits, Cb_6bits, Cr_6bits)=Y'
end
if (Y'>stopLUT(Y_6bits, Cb_6bits, Cr_6bits)
1. stopLUT(Y_6bits, Cb_6bits, Cr_6bits)=Y'
end
end
end
end Here calcCbfromCb10bit can be done according to B.1.5.7 in [4], and ditto for calcCrfromCr10bit.

After having created these two LUTs, the calculation of the best Y' can be carried out using the following pseudo code:

Y_6bits=(1023 * TF($Y_O$))>>4
Cb_6bits=Cb10bit>>4
Cr_6bits=Cr10bit>>4
a=startLUT(Y_6bits, Cb_6bits, Cr_6bits)
b=stopLUT(Y_6bits, Cb_6bits, Cr_6bits)
[a, b]=performBinarySearch(a, b, $Y_o$, Cb10bit, Cr10bit, ceil(log(b−a)/log(2)))
Ya=calcY(a, Cb10bit, Cr10bit)
Yb=calcY(b, Cb10bit, Cr10bit)
e1=$(Y_a-Y_o)^2$
e2=$(Y_b-Y_o)^2$
if (e1<e2)
use Y'=a
else
use Y'=b
end We see that instead of carrying out the binary search 10 times for every pixel, we carry out ceil(log(b−a)/log(2)) iterations, where ceil rounds a number to the next larger integer. As an example, if the interval found in the lookup tables is [a,b]=[340, 347], then b−a=347−340=7, and since log(7)/log(2)=2.81, ceil(log(b−a)/log(2))=3. We thus only need to do three iterations instead of 10. Assume that in the average case only three iterations are needed. In that case the conversion time will be roughly 5×*(3/10)=1.5×. The full conversion time is then a factor 11.5/11=1.045 larger than the anchor conversion time, or 4.5% more time, instead of 36% more time. This is a considerable savings.

Yet the size of the two LUTs are not so great. Since only 6 bits are used, each table only needs $2^{6+6+6}$=218 entries. Since we need two such tables and each entry is two bytes, we need $4 \times 2^{18}=2^{2+18}=2^{20}$=1 MB of data. That is considerably less than the 2 GB that were needed in the previous art.

It may be possible to use other sizes than 6 bits. It may also be possible to use different quantization on the different parameters. As an example, it may be possible to use 5 bits for Cb and Cr and 8 bits for Ynonlinear.

In a 14th embodiment, the estimation of the Ajusty processing chain is based on knowledge of the optimal Y' from a previous picture. For example the range of the possible Y' values can be estimated from a previous picture and used as in the current picture. If some of the end points is selected the search can be refined for the range below or the range above pending on the position of the best Y' from the search in the first range.

In a 15th embodiment, the estimation of the Ajusty processing chain is based on knowledge of the optimal Y' from one or more spatially neighboring samples. For instance, the average of the optimal Y' for one or more of the already processed neighboring samples could be used to determine a local starting range to perform a binary search for the current sample. A starting range [avg−$2^L$, avg+$2^L$+1] for the binary search could then be selected. If some of the end points is selected the search can be refined for the range below or the range above pending on the position of the best Y' from the search in the first range. L is preferably chosen to minimize the average number of iterations needed to find the optimal Y' for a current sample.

As an example, assume that for a 10bit picture the neighbors of the current sample with position x has the following optimal Y' values, $Y'_{x-1}$=341 and $Y'_{x+}$=353. The average of these optimal Y' values are avg=347. If for instance L=3 then L+1=4 iterations are needed to find the optimal Y' if the optimal Y' is within [340, 355]. If 339 or 356 is selected then the below or above range should be searched to find the optimal Y' for the sample.

In a 16th embodiment, the estimation of the Ajusty processing chain is performed in a first pass for a limited number of samples for example for every second sample horizontally and every second sample vertically, see FIG. 21A. Then the Ajusty processing chain is performed in a second pass for remaining samples inbetween the samples of the first pass based on knowledge of optimal Y' from one or several neighboring samples from the first pass and one or several neighboring samples from already determined optimal Y' in the second pass, see FIG. 21B.

As an example if the max value from the first pass is Y'max and the min value from the first pass in Y'min the first sample to be processed in the second pass can use Y'max and Y'min to determine the range for the search of the optimal Y' for that sample. If some of the end points is selected the search can be refined below or above the best Y' value pending on the position of the best Y'. Then the Y'max and Y'min is updated based on optimal Y' before next sample in the second pass is determined. This repeats until all second pass samples have been determined In a 17th embodiment, only the samples with linear luminance error, when the Ajusty processing chain is not used, larger than a threshold are adjusted by the Ajusty processing chain. The threshold can be based on knowledge from a previous picture.

In a 18th embodiment, only the samples with linear luminance error larger than a threshold are adjusted by the Ajusty processing chain, where the threshold is based on the average luminance error obtained by omitting the subsampling and upsampling of chroma components.

In a 19th embodiment, only the samples with linear luminance error larger than a threshold are adjusted by the Ajusty processing chain, where the threshold is based on the average luminance error for a previous picture after the Ajusty processing chain has been applied to that picture.

In a 20th embodiment, only the samples with a linear luminance larger than a threshold are adjusted by the Ajusty processing chain. If the pixels are too dark, the difference is simply not visible and there is no need to improve the quality using the Ajusty processing chain.

In a 21th embodiment, a computation cache is used. As an example, assume the first pixel in the image has the value Ynonlinear10bit=200, Cb=300 and Cr=400. The correct Y' is then calculated using the Ajusty processing chain. Also, the result is stored in a cache, and a hash-value is created, for example by performing bit-wise XOR on the last eight bits of the three values:

HASH=(200 AND 255)XOR(300 AND 255)XOR (400 AND 255)=116.

The hash-value is stored together with the parameter (Ynonlinear10bit=200, Cb=300 and Cr=400), and the calculated Y'-value in the cache. Assume that the next pixel also has the value Ynonlinear10bit=200, Cb=300 and Cr=400. First, the hash value is calculated:

HASH=(200 AND 255)XOR(300 AND 255)XOR (400 AND 255)=116.

We now check the cache to see if this hash value matches any entries. We see that it does match the value we just put in. Next we make sure that this is actually the correct value by checking that all three parameters match, which they do. Finally, we get the stored Y'-value from the cache. In this way, we do not need to calculate the Y'-value for the second pixel, which saves computation.

A person skilled in the art will realize that it is possible to combine one or more of the above described embodiments, even for cases where it says "only the samples with . . . ". For example, it would be possible to apply one threshold related to the linear luminance in combination with a threshold related to luminance error obtained by omitting the subsampling and upsampling of chroma components.

It should also be noted that it is possible that not all pixel values will be treated according to the same rules, e.g. pixels with large values in all RGB components might be excluded from further testing.

Even though the embodiments described above relate to a fast way of calculating the optimal Y' primarily using the Ajusty processing chain, a person skilled in the art would understand that it is possible to use some of the methods or variations of the methods described above to in a fast way derive other optimal pixel properties such as pixel values from de-noising, blur or sharpen or the output from other image filters or other pixel conversions.

Another example of optimal pixel properties that could be derived are the optimal Cb and Cr values after the optimal Y' has been found in the RGB 4:4:4 to Y'CbCr 4:2:0 conversion. How to find the best Cb and Cr using the Ajustc processing chain is described in Annex E. The Ajustc processing chain is here described in short for the convenience of the reader. Instead of doing the conversion as in the anchor processing chain:

RGB 4:4:4-->R'G'B' 4:4:4-->Y'CbCr 4:4:4-subsampling-of-Cb-and-Cr-->Y'CbCr 4:2:0, where the subsampling from 4:4:4 to 4:2:0 is done in the last step of the anchor processing chain, the Ajustc processing chain uses:

RGB 4:4:4-subsampling-of-R-G-and-B->RGB 2:2:2→R'G'B' 2:2:2-->Y'CbCr 2:2:2 where the subsampling instead is the first part of the Ajustyc processing chain. Here we have used the term 2:2:2 to indicate that all three samples are at half resolution in both the x- and y-dimension. In this way, we do not get a full-resolution Y' component, since the Y' component in the last step is 2:2:2, i.e. half resolution in both directions. This problem is overcome by the following processing steps:

RGB 4:4:4-->XYZ 4:4:4-->Y 4:4:4------------------------------+----->Y'=AJUSTY(Y 4:4:4, CbCr 4:4:4)

Y'CbCr 2:2:2→CbCr 2:2:2-upsample-->CbCr 4:4:4---------/

In short, the target luminance Y 4:4:4 is found by converting RGB 4:4:4 to XYZ 4:4:4 and then use Y and the chroma from Y'CbCr 2:2:2 after upsampling CbCr to same resolution as Y, with the Ajusty processing chain to find the best Y'. Alternatively, the anchor processing chain could instead be used to derive the luma component Y'.

Using for instance one of the LUT approaches in the embodiments above it could be possible to determine that the Cb and Cr values do not need to be calculated using the Ajustc processing for a certain sample. Moreover, in case it is determined that there is no need to find the optimal Y' for a certain sample according to any of the embodiments above, then the Ajustc processing chain is not needed either for that sample.

Figure 22A:
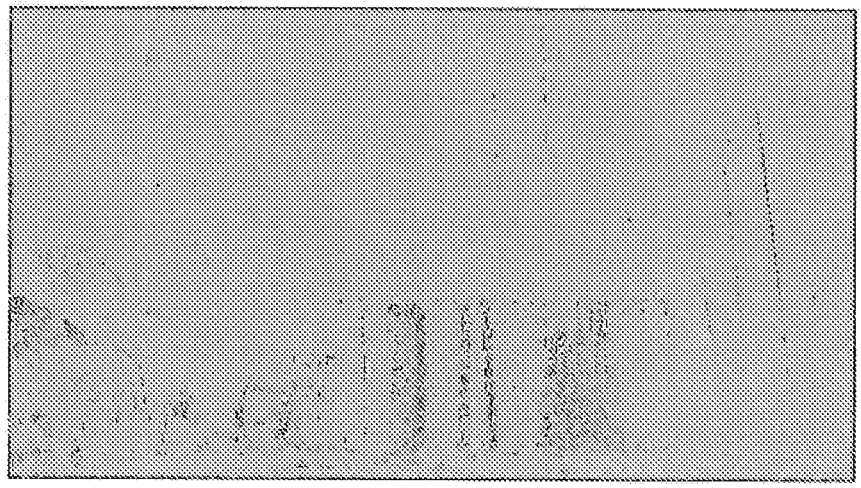
FIG. 22A illustrate differences between deriving luma component values according to the anchor processing chain and the Ajusty processing chain.

FIG. 22A depicts a case where we have calculated both Y'anchor and Y'ajusty, and calculated the difference between them. Gray equals zero difference, whereas white or black equals a great difference. As can be seen only a few pixels are far from zero. Only 4.4% of the pixels have a greater difference between Y'anchor and Y'ajusty than two steps.

Figure 22B:
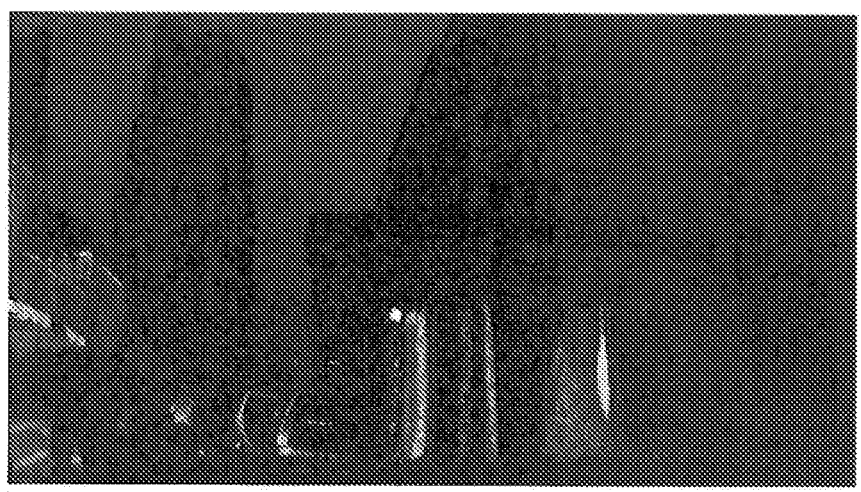
FIG. 22B schematically illustrate the quotient of maxRGB/(minRGB+s) for the picture shown in FIG. 22A.

FIG. 22B depicts an image where for each pixel, maxRGB=max(R, G, B) and minRGB=min (R, G, B) are calculated. Then an image is created using maxRGB/(minRGB+0.1) in each pixel. This image is then scaled between 0 and 1 by dividing by the largest value. Finally the value x for each pixel is replaced by $x^{0.25}$, to increase visibility. As can be seen in the image, the white areas in FIG. 22B, i.e. large value of maxRGB/(minRGB+0.1), correspond well with the areas where Y'anchor differ from Y'ajusty in FIG. 22A.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

REFERENCES

[1] Society of Motion Picture and Television Engineers (SMPTE) ST 2084:2014—High Dynamic Range Electro-Optical Transfer Function of Mastering Reference Displays
[2] International Organization for Standardization, ISO/IEC JTC1/SC29/WG11, Coding of moving pictures and audio, MPEG2014/N14548, July 2014, Sapporo, Japan, Luthra et al., Test sequences and anchor generation for HDR and Wide Gamut Content Distribution
[3] International Organization for Standardization, ISO/IEC JTC1/SC29/WG11, Coding of moving pictures and audio, MPEG2014/M35841, February 2015, Geneva, Switzerland, Strom, Color Subsampling
[4] International Organization for Standardization, ISO/IEC JTC1/SC29/WG11, Coding of moving pictures and audio, MPEG2014/N15083, February 2015, Geneva, Switzerland, Luthra et al., Call for Evidence (CfE) for HDR and WCG Video Coding
[5] International Organization for Standardization, ISO/IEC JTC1/SC29/WG11, Coding of moving pictures and audio, MPEG2013/M35255, October 2014, Strasbourg, France, Francois et al., About using a BT.2020 container for BT.709 content
[6] https://wg11.sc29.org/svn/repos/Explorations/XYZ/HDRTools/branches/0.9-dev

The invention claimed is:

1. A method of pre-processing a pixel in a picture, said method comprising:
    determining at least one bound for a luma component value of said pixel in a second color space based on a function of a desired linear luminance value of said pixel in a third color space, wherein said function is a transfer function; and
    selecting a luma component value in said second color space for said pixel within an interval comprising multiple luma component values in said second color space and bounded by said at least one bound, wherein a color of said pixel is represented by said luma component value, a first chroma component value and a second chroma component value in said second color space.

2. The method of claim 1, further comprising determining said desired linear luminance value based on a linear color of said pixel in a first color space.

3. The method of claim 1, wherein determining said at least one bound comprises determining an upper bound for said luma component value and for said interval as $tf(Y_o)$, wherein $tf(\ )$ is a concave transfer function and $Y_o$ denotes said desired linear luminance value.

4. The method of claim 1, wherein determining said at least one bound comprises determining a lower bound for said luma component value and for said interval as $tf(Y_o)$, wherein $tf(\ )$ is a monotonously increasing transfer function and $Y_o$ denotes said desired linear luminance value.

5. The method of claim 1, wherein selecting said luma component value comprises selecting, within said interval, a luma component value that minimizes a difference between said desired linear luminance value and a linear luminance value in said third color space calculated based on said luma component value, said first chroma component value and said second chroma component value in said second color space.

6. The method of claim 1, wherein selecting said luma component value comprises performing a binary search to select said luma component value within said interval.

7. The method of claim 6, wherein performing said binary search comprises:
    performing, as long as an upper bound for said luma component value is larger than a lower bound for said luma component value plus one, the following steps:
    determining a luma component value in the middle of an interval bounded by said lower bound and said upper bound;
    calculating a linear luminance value in said third color space based on said determined luma component value, said first chroma component value and said second chroma component value in said second color space; and
    setting said lower bound equal to said determined luma component value if said calculated linear luminance value is smaller than said desired linear luminance value or otherwise setting said upper bound equal to said determined luma component value; and
    selecting said luma component value as said lower bound or said upper bound.

8. The method of claim 7, wherein selecting said luma component value comprises:
    calculating a first linear luminance value based on said lower bound and said first chroma component value and said second chroma component value in said second color space;
    calculating a first difference between said first linear luminance value, or a function of said first linear luminance value, and said desired linear luminance value, or said function of said desired linear luminance value;
    calculating a second linear luminance value based on said upper bound and said first chroma component value and said second chroma component value in said second color space;
    calculating a second difference between said second linear luminance value, or said function of said second linear luminance value, and said desired linear luminance value, or said function of said desired linear luminance value; and
    selecting said lower bound as said luma component value in said second color space if said first difference is smaller than said second difference and otherwise selecting said upper bound as said luma component value in said second color space.

9. A device for pre-processing a pixel in a picture, wherein said device is configured to determine at least one bound for a luma component value of said pixel in a second color space based on a function of a desired linear luminance value of said pixel in a third color space, wherein said function is a transfer function; and
    said device is configured to select a luma component value in said second color space for said pixel within an interval comprising multiple luma component values in said second color space and bounded by said at least one bound, wherein a color of said pixel is represented by said luma component value, a first chroma component value and a second chroma component value in said second color space.

10. The device of claim 9, said device is configured to determine said desired linear luminance value based on a linear color of said pixel in a first color space.

11. The device of claim 9, wherein said device is configured to determine an upper bound for said luma component value and for said interval as $tf(Y_o)$, wherein $tf(.)$ is a concave transfer function and $Y_o$ denotes said desired linear luminance value.

12. The device of claim 9, wherein said device is configured to determine a lower bound for said luma component value and for said interval as $tf(Y_o)$, wherein $tf(.)$ is a monotonously increasing transfer function and $Y_o$ denotes said desired linear luminance value.

13. The device of claim 9, wherein said device is configured to select, within said interval, a luma component value that minimizes a difference between said desired linear luminance value and a linear luminance value in said third color space calculated based on said luma component value, said first chroma component value and said second chroma component value in said second color space.

14. The device of claim 9, wherein said device is configured to perform a binary search to select said luma component value within said interval.

15. The device of claim 14, wherein
    said device is configured to perform, as long as an upper bound for said luma component value is larger than a lower bound for said luma component value plus one:
    determine a luma component value in the middle of an interval bounded by said lower bound and said upper bound;
    calculate a linear luminance value in said third color space based on said determined luma component value, said first chroma component value and said second chroma component value in said second color space; and set said lower bound equal to said determined luma component value if said calculated linear luminance value is smaller than said desired linear luminance value or otherwise set said upper bound equal to said determined luma component value; and said device is configured to select said luma component value as said lower bound or said upper bound.

16. The device of claim 15, wherein said device is configured to calculate a first linear luminance value based on said lower bound, said first chroma component value and said second chroma component value in said second color space;

said device is configured to calculate a first difference between said first linear luminance value, or a function of said first linear luminance value, and said desired linear luminance value, or said function of said desired linear luminance value;

said device is configured to calculate a second linear luminance value based on said upper bound, said first chroma component value and said second chroma component value in said second color space;

said device is configured to calculate a second difference between said second linear luminance value, or said function of said second linear luminance value, and said desired linear luminance value, or said function of said desired linear luminance value; and said device is configured to select said lower bound as said luma component value in said second color space if said first difference is smaller than said second difference and otherwise selecting said upper bound as said luma component value in said second color space.

17. The device of claim 9,
further comprising:
a processor; and
a memory comprising instructions executable by said processor, wherein
said processor is operative to determine said at least one bound for said luma component value; and said processor is operative to select said luma component value in said second color space for said pixel within said interval.

18. A device for encoding a pixel in a picture, said device comprises:
a processor; and
a memory comprising instructions executable by said processor, wherein
said processor is operative to determine at least one bound for a luma component value of said pixel in a second color space based on a function of a desired linear luminance value of said pixel in a third color space, wherein said function is a transfer function;

said processor is operative to select a luma component value in said second color space for said pixel within an interval comprising multiple luma component values in said second color space and bounded by said at least one bound; and said processor is operative to encode said luma component value, a subsampled first chroma component value and a subsampled second chroma component value in said second color space.

19. A user equipment comprising a device of claim 9, wherein said user equipment is selected from a group consisting of a computer, a laptop, a smart phone, a tablet and a set-top box.

20. A computer program comprising instructions, which when executed by a processor, cause said processor to
determine at least one bound for a luma component value of a pixel in a second color space based on a function of a desired linear luminance value of said pixel in a third color space, wherein said function is a transfer function; and select a luma component value in said second color space for said pixel within an interval comprising multiple luma component values in said second color space and bounded by said at least one bound, wherein a color of said pixel is represented by said luma component value, a first chroma component value and a second chroma component value in said second color space.

* * * * *